(12) United States Patent
Tonouchi

(10) Patent No.: US 8,484,514 B2
(45) Date of Patent: Jul. 9, 2013

(54) FAULT CAUSE ESTIMATING SYSTEM, FAULT CAUSE ESTIMATING METHOD, AND FAULT CAUSE ESTIMATING PROGRAM

(75) Inventor: Toshio Tonouchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/258,879

(22) PCT Filed: May 14, 2010

(86) PCT No.: PCT/JP2010/058218
§ 371 (c)(1),
(2), (4) Date: Oct. 10, 2011

(87) PCT Pub. No.: WO2010/131746
PCT Pub. Date: Nov. 18, 2010

(65) Prior Publication Data
US 2012/0102371 A1   Apr. 26, 2012

(30) Foreign Application Priority Data

May 15, 2009   (JP) .................................. 2009-118271

(51) Int. Cl.
*G06F 11/00* (2006.01)
(52) U.S. Cl.
USPC .......................................... 714/26; 702/185
(58) Field of Classification Search
USPC .............................. 714/26; 702/182, 183, 185
See application file for complete search history.

(56) References Cited

U.S. PATENT DOCUMENTS

| | | | |
|---|---|---|---|
| 5,548,684 A * | 8/1996 | Wang et al. ..................... | 706/16 |
| 6,708,308 B2 * | 3/2004 | De Souza et al. .............. | 714/795 |
| 7,765,436 B2 * | 7/2010 | Bassin et al. .................. | 714/47.2 |
| 7,788,205 B2 * | 8/2010 | Chalasani et al. .............. | 706/48 |
| 8,000,931 B2 * | 8/2011 | Ichiyama et al. .............. | 702/181 |
| 8,015,134 B2 * | 9/2011 | Grichnik et al. ................ | 706/45 |
| 2009/0094484 A1 * | 4/2009 | Son et al. ......................... | 714/26 |
| 2009/0183029 A1 * | 7/2009 | Bethke et al. ................... | 714/26 |
| 2011/0202227 A1 * | 8/2011 | Zhang et al. .................... | 701/29 |

FOREIGN PATENT DOCUMENTS

| | | |
|---|---|---|
| JP | 8-255093 A | 10/1996 |
| JP | 10-143190 A | 5/1998 |
| JP | 2000122690 A | 4/2000 |
| JP | 201125593 A | 5/2001 |

(Continued)

OTHER PUBLICATIONS

International Search Report for PCT/JP2010/058218 mailed Jul. 20, 2010.

*Primary Examiner* — Yolanda L Wilson

(57) ABSTRACT

A fault cause estimating system includes: an initial model generating section which creates an initial fault derivation model indicating a derivation among faults and an initial event derivation model indicating a derivation among the faults and events, based on a basic model definition; an extended Baum-Welch calculating section which creates a fault derivation model which is a transition of a combination of device classes and faults and an event derivation model which is a transition of a combination of device classes and events, based on a instance definition, a class definition, the initial fault derivation model, the initial event derivation model and an event sequence for learning; an instance derivation probability calculating section which creates an instance deviation model of a derivation of an occurrence device based on the event sequence for learning; and an extended Viterbi calculating section which estimates an event cause fault based on the instance definition, the fault occurrence location class definition, the fault derivation model, the event derivation model, the instance derivation model, and the fault cause estimation event sequence.

21 Claims, 30 Drawing Sheets

FOREIGN PATENT DOCUMENTS

| | | |
|---|---|---|
| JP | 2002091480 A | 3/2002 |
| JP | 2003022093 A | 1/2003 |
| JP | 2003036092 A | 2/2003 |
| JP | 2004126641 A | 4/2004 |
| JP | 2005141459 A | 6/2005 |
| JP | 2005141601 A | 6/2005 |
| JP | 2006293033 A | 10/2006 |
| JP | 2007078943 A | 3/2007 |
| JP | 2007257184 A | 10/2007 |

* cited by examiner

Fig. 21

```
[states] #"FAULT CAUSE","OCCURRENCE DEVICE CLASS"
"ap_fault@AP^a","AP^a"
"ap_fault@AP^b","AP^b"
"hw_fault","Load Balancer"
"disk_full","DB"
"invalid_data","DB"

[observations] # EVENT LIST AND OCCURRENCE CAUSE
#"EVENT NAME","OCCURRENCE CAUSE"
"connection_error@AP^a","ap_fault@AP^a"
"ap_error@AP^a","ap_fault@AP^a"
"connection_error@AP^b","ap_fault@AP^b"
"ap_error@AP^b","ap_fault@AP^b"
"connection_error@LB","hw_fault@LB"
"hw_error@LB ","hw_fault@LB "
"disk_full@DB","disk_full@DB"
"db_error@DB ","disk_full@DB ","invalid_data@DB"
```

Fig. 22

|  | S0 | Sa1 | Sb1 | SL1 | Sd1 | Sd2 |
|---|---|---|---|---|---|---|
| S0 | 0.166667 | 0.166667 | 0.166667 | 0.166667 | 0.166667 | 0.166667 |
| Sa1 | 0.166667 | 0.166667 | 0.166667 | 0.166667 | 0.166667 | 0.166667 |
| Sb1 | 0.166667 | 0.166667 | 0.166667 | 0.166667 | 0.166667 | 0.166667 |
| SL1 | 0.166667 | 0.166667 | 0.166667 | 0.166667 | 0.166667 | 0.166667 |
| Sd1 | 0.166667 | 0.166667 | 0.166667 | 0.166667 | 0.166667 | 0.166667 |
| Sd2 | 0.166667 | 0.166667 | 0.166667 | 0.166667 | 0.166667 | 0.166667 |

Fig. 23

|  | S0 | Sa1 | Sb1 | SL1 | Sd1 | Sd2 |
|---|---|---|---|---|---|---|
| $e_{a1}$ | 0.125 | 0.5 | 0 | 0 | 0 | 0 |
| $e_{a2}$ | 0.125 | 0.5 | 0 | 0 | 0 | 0 |
| $e_{b1}$ | 0.125 | 0 | 0.5 | 0 | 0 | 0 |
| $e_{b2}$ | 0.125 | 0 | 0.5 | 0 | 0 | 0 |
| $e_{L1}$ | 0.125 | 0 | 0 | 0.5 | 0 | 0 |
| $e_{L2}$ | 0.125 | 0 | 0 | 0.5 | 0 | 0 |
| $e_{d1}$ | 0.125 | 0 | 0 | 0 | 0.5 | 0 |
| $e_{d2}$ | 0.125 | 0 | 0 | 0 | 0.5 | 1 |

Fig. 24

|     | S0  | Sa1 | Sb1 | SL1 | Sd1 | Sd2 |
|-----|-----|-----|-----|-----|-----|-----|
| S0  | 0.2 | 0   | 0   | 0   | 0   | 0   |
| Sa1 | 0.1 | 0.5 | 0.4 | 0.04 | 0.2 | 0.4 |
| Sb1 | 0.1 | 0.1 | 0.2 | 0.04 | 0.25 | 0.3 |
| SL1 | 0.1 | 0.3 | 0.3 | 0.9 | 0.05 | 0.05 |
| Sd1 | 0.2 | 0.05 | 0.05 | 0.01 | 0.2 | 0.05 |
| Sd2 | 0.3 | 0.05 | 0.05 | 0.01 | 0.3 | 0.2 |

Fig. 25

|     | S0    | Sa1 | Sb1 | SL1 | Sd1 | Sd2 |
|-----|-------|-----|-----|-----|-----|-----|
| $e_{a1}$ | 0.125 | 0.5 | 0.3 | 0   | 0.1 | 0.1 |
| $e_{a2}$ | 0.125 | 0.4 | 0   | 0   | 0.1 | 0.1 |
| $e_{b1}$ | 0.125 | 0   | 0.4 | 0   | 0.1 | 0.1 |
| $e_{b2}$ | 0.125 | 0   | 0.3 | 0   | 0   | 0   |
| $e_{L1}$ | 0.125 | 0.1 | 0   | 0.7 | 0   | 0   |
| $e_{L2}$ | 0.125 | 0   | 0   | 0.3 | 0   | 0   |
| $e_{d1}$ | 0.125 | 0   | 0   | 0   | 0.4 | 0   |
| $e_{d2}$ | 0.125 | 0   | 0   | 0   | 0.3 | 0.7 |

Fig. 26

| | NO-FAULT | AP$^a$1 | AP$^a$2 | AP$^b$1 | AP$^b$2 | LB1 | LB2 | DB1 | DB2 |
|---|---|---|---|---|---|---|---|---|---|
| NO-FAULT | 0.111111 | 0 | 0 | 0 | 0 | 0 | 0 | 0 | 0 |
| AP$^a$1 | 0.111111 | 0.3 | 0 | 0.2 | 0.2 | 0 | 0 | 0.2 | 0.2 |
| AP$^a$2 | 0.111111 | 0 | 0.3 | 0.2 | 0.2 | 0 | 0 | 0.2 | 0.3 |
| AP$^b$1 | 0.111111 | 0 | 0 | 0.1 | 0 | 0 | 0 | 0.3 | 0.2 |
| AP$^b$2 | 0.111111 | 0 | 0 | 0 | 0.1 | 0 | 0 | 0.2 | 0.2 |
| LB1 | 0.111111 | 0.7 | 0.7 | 0 | 0 | 1 | 0 | 0 | 0 |
| LB2 | 0.111111 | 0 | 0 | 0.6 | 0.6 | 0 | 1 | 0 | 0 |
| DB1 | 0.111111 | 0 | 0 | 0 | 0 | 0 | 0 | 0.1 | 0 |
| DB2 | 0.111111 | 0 | 0 | 0 | 0 | 0 | 0 | 0 | 0.1 |

Fig. 27

| # | FAULT (S) | EVENT (E) | CLASS (C) |
|---|---|---|---|
| 1 | S$_{a1}$ | e$_{a1}$ | AP$^a$ |
| 2 | S$_{a1}$ | e$_{a2}$ | AP$^a$ |
| 3 | S$_{b1}$ | e$_{b1}$ | AP$^b$ |
| 4 | S$_{b1}$ | e$_{b2}$ | AP$^b$ |
| 5 | S$_{L1}$ | e$_{L1}$ | LB |
| 6 | S$_{L1}$ | e$_{L2}$ | LB |
| 7 | S$_{d1}$ | e$_{d1}$ | DB |
| 8 | S$_{d1}$ | e$_{d2}$ | DB |
| 9 | S$_{d2}$ | e$_{d2}$ | DB |

Fig. 28

| # | FAULT (S) | CLASS (C) |
|---|---|---|
| 1 | $S_{a1}$ | $AP^a$ |
| 2 | $S_{b1}$ | $AP^b$ |
| 3 | $S_{L1}$ | LB |
| 4 | $S_{d1}$ | DB |
| 5 | $S_{d2}$ | DB |

Fig. 29

| # | DEVICE (M) | CLASS (C) |
|---|---|---|
| 1 | $AP^a 1$ | $AP^a$ |
| 2 | $AP^a 2$ | $AP^a$ |
| 3 | $AP^b 1$ | $AP^b$ |
| 4 | $AP^b 2$ | $AP^b$ |
| 5 | LB1 | LB |
| 6 | LB2 | LB |
| 7 | DB1 | DB |
| 8 | DB2 | DB |

| t | 0 | 1 | 2 |
|---|---|---|---|
| $e^a$ | | $e_{d2}$ | $e_{a1}$ |
| M | | DB1 | $AP^a2$ |
| C | | DB | AP |
| s | | $S_{d2}$ | $S_{a1}$ |
| $S_0$ | 1 | 0.0042 | 0.0003 |
| V $S_{a1}$ | 0 | 0.0000 | 0.0012 |
| $S_{b1}$ | 0 | 0.0000 | 0.0007 |
| $S_{L1}$ | 0 | 0.0000 | 0.0000 |
| $S_{d1}$ | 0 | 0.0100 | 0.0002 |
| $S_{d2}$ | 0 | 0.0233 | 0.0002 |

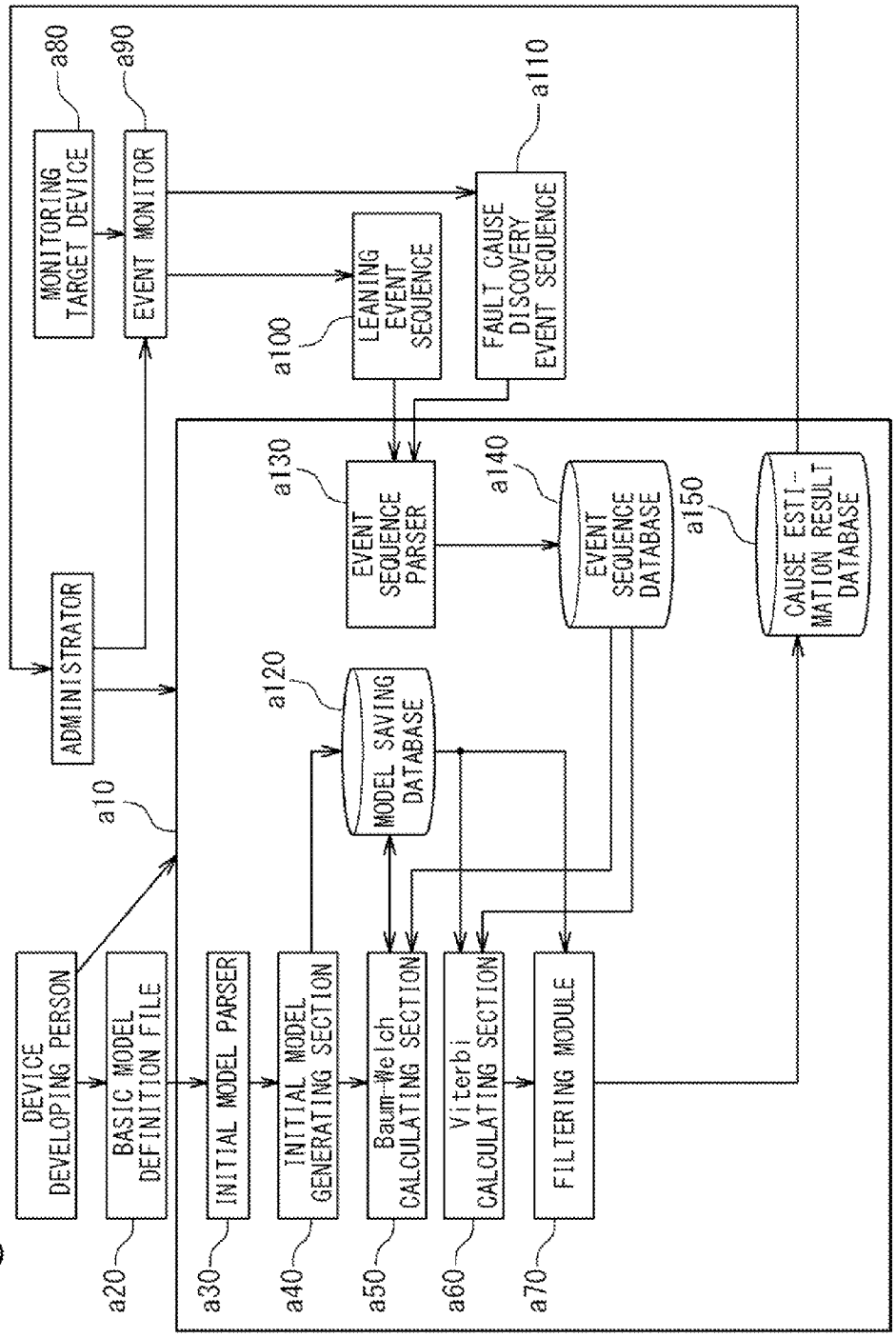

FAULT CAUSE ESTIMATING SYSTEM, FAULT CAUSE ESTIMATING METHOD, AND FAULT CAUSE ESTIMATING PROGRAM

TECHNICAL FIELD

The present invention relates to a fault cause estimating system, a fault cause estimating method, and a fault cause estimating program, and in particular, relates to a fault cause estimating system, a fault cause estimating method, and a fault cause estimating program for estimating a cause of a transitive fault which occurs in a computer system.

BACKGROUND ART

A fault cause estimating system for estimating a cause of a fault, which occurs in a computer system, is known. For example, Japanese Patent Publication JP-A-Heisei 8-255093 (Patent Literature 1) discloses a fault cause discovering device and a method thereof. FIG. 32 is a block diagram showing a configuration of the fault cause discovering device of Patent Literature 1. In the fault cause discovering device, each section operates as follows. A process information acquiring section 2101 acquires process information being run in a computer system. An environment file information acquiring section 2102 acquires system environment file information which is necessary for operation of the computer system. A device information acquiring section 2103 acquires information of device drivers provided in the computer system. A reference environment information acquiring section 2104 retrieves environment information from the process information acquiring section 2101, the environment file information acquiring section 2102, and the device information acquiring section 2103, when the computer system operates normally. A reference environment information storing section 2105 stores the environment information which the reference environment information acquiring section 2104 retrieves. A test environment information acquiring section 2106 retrieves environment information from the process information acquiring section 2101, the environment file information acquiring section 2102; and the device information acquiring section 2103, in order to detect whether or not an abnormality occurs in the computer system. A test environment information storing section 2107 stores the environment information which the test environment information acquiring section 2106 retrieves. An environment information comparing and judging section 2109 finds out state change by comparing content of the reference environment information storing section 2105 and the test environment information storing section 2107. A permissible range information storing section 2108 stores information which serves as judgment references of whether the state change exceeds a permissible range in the environment information comparing and judging section 2109. A reference environment information correcting section 2110 corrects the content of the reference environment information storing section 2105, with the state change found by the environment information comparison judging section 2109. An abnormality cause identifying section 2111 identifies a cause of abnormality occurrence in the computer system from the state change.

The fault cause discovering device (fault cause estimating system) having such a configuration, operates as follows. For example, suppose that "one nfs in the running process" is stored as reference environment, in the reference environment information storing section 2105. Additionally, suppose that "a maximum of 12 nfs in the running process" is stored as a permissible value in correspondence to "a situation where addition of a mount device is permitted", and "a maximum of 8 nfs in the running process" is stored as a permissible value in correspondence to "a situation where addition of a mount device is not permitted", in the permissible range information storing section 2108. Then, suppose that the system is in "a situation where addition of a mount device is permitted", and that the test environment information acquiring section 2106 detects a state of "11 nfs in the running process". In this case, the environment information comparing and judging section 2109 makes a judgment of normal since the nfs process number does not exceed "12", which is the maximum permissible value.

Suppose that "a failure in a SCSI board" causes a situation where "addition of a mount device is not permitted" thereafter. When the nfs process number remains to be 11 without being changed, the maximum permitted value of the nfs process in "a situation where addition of a mount device is not permitted" is 8 and the nfs process number exceeds the maximum value. Therefore, the abnormality cause identifying section 2111 identifies the fact that the nfs process number exceeds the permitted value as a fault cause. That is to say, the abnormality cause identifying section 2111, in spite of the fact that the original failure cause is "a failure in a SCSI board", estimates that the cause is addition of devices. In the above case, unless the cause of the fact that the nfs process number is out of a normal value is recognized to be "a failure in a SCSI board", a fault cannot properly be dealt with.

Japanese Patent Publication JP-P2004-126641A (Patent Literature 2) discloses a cause-effect relationship model generating device, a cause estimating device and so on. FIGS. 33A and 33B are block diagrams showing the cause-effect relationship model generating device and the cause estimating device of Patent Literature 2 respectively, and FIG. 33C is a schematic diagram showing a cause-effect system model. In the cause-effect relationship model generating device shown in FIG. 33A, a cause-effect data generating and storing section 2211 is a database of data showing cause-effect relationships. An effect-cause data generating and storing section 2212 is a database of data as the reverse mapping of the data showing cause-effect relationships. In a same result data set generating section 2213, a relationship for relating a plurality of events to a single event group, and a relationship for relating a plurality of causes to a single cause group are recorded. A partial cause-effect system model organizing section 2214 organizes a cause-effect system model for mapping relationships between cause groups and event groups.

The cause-effect system model organizing device stores an organized cause-effect system model in a cause-effect system model storing section 2224. In the effect-cause estimating device shown in FIG. 33B, an observation data recognizing section 2221 recognizes a fault from observation data and applies a mapping from an event to causes of the cause-effect system model stored in the cause-effect system model storing section 2224, to find out a cause of a fault. A reverse subsystem searching section 2222 and a related same result data set searching section 2223, by further applying a mapping from a cause to events, obtain an event that can occur from the cause. By applying the mapping from events to causes and the mapping from causes to events in a transitive manner, and obtaining transitive closure in this way, causes which include a possible root cause are obtained at a transitive timing. In Patent Literature 2 however, such mapping can be described by humans, and processing thereof is difficult. In Patent Literature 2, the mapping for every event and cause is not defined but the mapping for each group stored in the same result data set generating section 2213 is defined in order to facilitate mapping.

Japanese Patent Publication JP-P2007-257184A (Patent Literature 3) discloses a fault cause estimating system, a method, and a program. FIG. 34 is a block diagram showing a configuration of the fault cause estimating system of Patent Literature 3. In the fault cause estimating system, an initial model parser a30 reads a basic model definition file a20 in which a correspondence relationship between events occurring in a system and causes thereof is recorded. An initial model generating section a40 generates an initial model of a state transition model based on syntactic information acquired from the initial model parser a30, and stores the initial model in a model saving database a 120. A Baum-Welch calculating section a50 receives a leaning event sequence a100 which an event monitor a90 stores in an event sequence database a140, and learns a transition probability of the state transition model stored in the model saving database a 120. A Viterbi calculating section a60 applies managing target event sequences accumulated in the event sequence database a140 to the state transition model, and obtains state transition sequences with the highest occurrence probability. A filtering module a70 finds out a probable transition sequence from the state transition sequences with the highest occurrence probability, to estimate a start state of the transition sequence as a root cause and store the start state in a cause estimation result database a150. A root cause of transitive cause occurrence is thus discovered by learning a cause-effect relationship between causes showing faults at a real application system from a relatively-concise basic model definition file of only correspondence relationship between events and states showing faults given by a device developer. It is possible to define a simple event occurrence cause even by humans, by employing the above configuration and learning state transition sequences of event occurrence by giving a concise basic model definition and an event sequence, and it is also possible to estimate a root cause of a fault without description of rules of fault transition by an administrator, by learning difference due to system configuration and setting and learning transitive relation between causes which cannot be described by humans.

The following are disclosed as other related techniques: Japanese Patent Publication JP-P2007-078943A (SOUND SCORE CALCULATING PROGRAM: Patent Literature 4); Japanese Patent Publication JP-P2006-293033A (METHOD FOR CALCULATING OUTPUT PROBABILITY OF STATE OF MIXED DISTRIBUTION HMM, US2006229871 (A1): Patent Literature 5); Japanese Patent Publication JP-P2003-036092A (HMM OUTPUT PROBABILITY COMPUTING METHOD, U.S. Pat. No. 7,058,576 (B2): Patent Literature 6); Japanese Patent Publication JP-P2003-022093A (VOICE RECOGNITION METHOD: Patent Literature 7); Japanese Patent Publication JP-P2002-091480A (SOUND MODEL GENERATION APPARATUS: Patent Literature 8); Japanese Patent Publication JP-P2001-125593A (VOICE RECOGNITION DEVICE: Patent Literature 9); Japanese Patent Publication JP-P2000-122690A (PATTERN RECOGNITION METHOD: Patent Literature 10); and Japanese Patent Publication JP-A-Heisei 10-143190 (VOICE RECOGNITION DEVICE: Patent Literature 11).

The inventor has now newly discovered the following aspect as a result of research this time.

The above fault cause estimating systems have the following problems.

The first problem is that a fault, of which transitive relation is unknown, is difficult to be dealt with. This is because it is necessary in Patent Literature 1 to describe a precondition and a permitted value of the case. In the fault transition however, the relation is often unknown in advance. In such a case, it is difficult to describe rules. For example, it is generally difficult for a system administrator to know a relationship between software modules making up applications. Therefore, if a fault, which occurs in a certain software module having a certain fault event, undergoes transition to a fault in another software module, it is difficult to find out it. For example, suppose that a case where a certain module outputs data while outputting a warning based on an exceptional input. Since a value range of the data is different from that of an input data anticipated at the beginning, the data has an exceptional value. When a database write module writes the data into a database, a database writing error can occur due to the different value range. In such a derivation relationship, even though the database writing error and the warning at the module preparing the data are concerned with each other, it is difficult to preliminarily set a rule that the latter is the root cause.

The second problem is that it is difficult to describe fault transitive relation. This is because a relationship between a cause and a fault in general events is complicated. In the method of Patent Literature 2 for example, a correspondence relationship between causes and faults are registered in advance, and a cause of a fault is found out in a transitive manner. However, since there are many kinds of faults and states, it is difficult to describe a correspondence relationship. In order to reduce difficulty of such description, fault causes are grouped and mapping therebetween is described in Patent Literature 2. Even when mapping is defined in units of a group however, definition of mapping is necessary. In addition, defining groups is laborious, and precision of mapping between a cause and a fault may lower unless grouping is performed properly. In Patent Literature 2 for example, an example of the cause-effect system model as shown in FIG. 33C is disclosed. In the example of FIG. 33C, the cause-effect relationship is indicated by arrows. In a case of mapping g1 however, a domain of g1 may be X1 but other events can exist as a cause of an event x3 "increase in a fluctuation range". Suppose that the cause is an event y' (not shown). When mapping from the event x3 to the cause (event y') is h (not shown), it is possible that a domain of h is not the whole X1. For example, an event x2 "decompression setting failure (low)" is not necessarily caused. In the invention of Patent Literature 2 however, the event x3 is identified with the domain X1, and h is defined as h(X1)=y', in order to facilitate defining of mapping. Therefore, it is possible that h is applied even to the event x2 and that the unrelated cause y' is considered as a cause.

The first problem and the second problem are solved by a fault cause estimating system of Patent Literature 3. That is to say, existing fault events are preliminarily inputted to the fault cause estimating system of Patent Literature 3 as a learning log. Consequently, the fault cause estimating system automatically generates a state transition model which is a fault transition model, and stores the state transition model in a model saving database a 120. By using the state transition model, the fault cause estimating system makes it possible to analyze a cause of a transitive fault without writing transition rules by humans. Additionally, the fault cause estimating system can also analyze an implicit fault derivation relationship by learning a fault transition relationship, which an administrator does not know, from a learning log.

In the fault cause estimating system of Patent Literature 3 however, increase of kinds of faults lengthens a fault learning time and an analysis time in proportion to a square of the increase. That is to say, the third problem is that a time required for analytical processing becomes long when a large-scale system is a managed object. This is because a fault learning time and an analysis time are lengthened in proportion to a square of hidden states in the Viterbi algorithm and the Baum-Welch algorithm used in Patent Literature 3. In Patent Literature 3, fault transitive relation is learned by relating a fault to a hidden state. In the system on the other hand, a fault occurs in each device. When relating a pair of a device and a fault which occurs at the device, to a hidden state, increase in the number of devices increases the pair, and a calculation time is lengthened in proportion to a square of an increase in pairs.

CITATION LIST

Patent Literature

[PTL 1] Japanese Patent Publication JP-A-Heisei 8-255093
[PTL 2] Japanese Patent Publication JP-P2004-126641A
[PTL 3] Japanese Patent Publication JP-P2007-257184A
[PTL 4] Japanese Patent Publication JP-P2007-078943A
[PTL 5] Japanese Patent Publication JP-P2006-293033A
[PTL 6] Japanese Patent Publication JP-P2003-036092A
[PTL 7] Japanese Patent Publication JP-P2003-022093A
[PTL 8] Japanese Patent Publication JP-P2002-091480A
[PTL 9] Japanese Patent Publication JP-P2001-125593A
[PTL 10] Japanese Patent Publication JP-P2000-122690A
[PTL 11] Japanese Patent Publication JP-A-Heisei 10-143190

SUMMARY OF INVENTION

An object of the present invention is to provide a fault cause estimating system which can analyze a cause of a transitive fault even in a case of a fault of which transitive relation is unknown.

A fault cause estimating system of the present invention includes an instance definition database, a fault occurrence location class definition database, an event sequence database, a first storage section, a second storage section, a third storage section, an extended Viterbi calculating section, and a filtering module. The instance definition database stores an instance definition which defines a correspondence relationship between a plurality of devices as managed objects and classes of the plurality of devices. The fault occurrence location class definition database stores a fault occurrence location class definition which defines a correspondence relationship between a plurality of faults possibly occurring in the plurality of devices, and classes of the plurality of devices. The event sequence database stores an event sequence for fault cause estimation in which a plurality of events having occurred in the plurality of devices under monitoring are arranged in order of time of occurrence. The first storage section stores a fault derivation model which shows a fault transition probability concerned with combinations of the classes of the plurality of devices and faults at the classes of the plurality of devices. The second storage section stores an event derivation model which shows an event transition probability ($A^{S \to E}$) concerned with combinations of faults at the plurality of devices and events derived from the faults at the plurality of devices. The third storage section stores an instance derivation model which shows an occurrence device transition probability ($A^{M \to M}$) concerned with an occurrence device at which a fault occurs among the plurality of devices. The extended Viterbi calculating section independently obtains a first transition probability between a plurality of faults at the classes of the plurality of devices, and a second transition probability between the plurality of devices, based on: the instance definition and the fault occurrence location class definition; the fault derivation model, the event deriva-tion model and the instance derivation model; and the event sequence for fault cause estimation, and estimates a fault state transition sequence and a fault state transition probability which show a fault transition sequence and a fault transition probability which correspond to the event sequence for fault cause estimation, by multiplying the first transition probability and the second transition probability. The filtering module estimates a fault which is a root cause of an event occurring at a managed object, based on the fault state transition sequence and fault state transition probability.

A fault cause estimating method according to the present invention includes the following first and second steps. The first step includes a step of: independently obtaining a first transition probability between a plurality of faults at classes of a plurality of devices, and a second transition probability between the plurality of devices based on: an instance definition which defines a correspondence relationship between the plurality of devices as managed object and classes of the plurality of devices; a fault occurrence location class definition which defines a correspondence relationship between a plurality of faults possibly occurring in the plurality of devices and classes of the plurality of devices; a fault derivation model which shows a fault transition probability concerned with combinations of the classes of the plurality of devices and faults at the classes of the plurality of devices; an event derivation model which shows an event transition probability concerned with combinations of faults at the plurality of devices and events derived from the faults at the plurality of devices; an instance derivation model which shows an occurrence device transition probability concerned with an occurrence device at which a fault occurs among the plurality of devices; and an event sequence for fault cause estimation in which a plurality of events having occurred in the plurality of devices under monitoring are arranged in order of time of occurrence, and estimating a fault state transition sequence and a fault state transition probability which show a fault transition sequence and a fault transition probability which correspond to the event sequence for fault cause estimation, by multiplying the first transition probability and the second transition probability. The second step includes a step of estimating a fault which is a root cause of an event occurring at a managed object, based on the fault state transition sequence and the fault state transition probability.

A program according to the present invention includes the following first to eighth steps.

The first step includes a step of reading an instance definition which defines a correspondence relationship between a plurality of devices as managed objects and classes of the plurality of devices from an instance definition database. The second step includes a step of reading a fault occurrence location class definition which defines a correspondence relationship between a plurality of faults possibly occurring in the plurality of devices and classes of the plurality of devices from a fault occurrence location class definition database. The third step includes a step of reading an event sequence for fault cause estimation in which a plurality of events having occurred in the plurality of devices under monitoring are arranged in order of time of occurrence from an event sequence database. The fourth step includes a step of reading a fault derivation model which shows a fault transition probability concerned with combinations of the classes of the plurality of devices and faults at the class of the plurality of devices from a first storage section. The fifth step includes a step of reading an event derivation model which shows an event transition probability concerned with combinations of faults at the plurality of devices and events derived from the faults at the plurality of devices from a second storage section.

The sixth step includes a step of reading an instance derivation model which shows an occurrence device transition probability concerned with an occurrence device at which a fault occurs among the plurality of devices from a third storage section. The seventh step includes a step of an extended Viterbi calculating section independently obtaining a first transition probability among a plurality of faults at the classes of the plurality of devices, and a second transition probability among the plurality of devices based on: the read instance definition and fault occurrence location class definition; the read fault derivation model, the event derivation model and the instance derivation model; and the read event sequence for fault cause estimation, and estimating a fault state transition sequence and a fault state transition probability which shows a fault transition sequence and a fault transition probability which correspond to the event sequence for fault cause estimation, by multiplying the first transition probability and the second transition probability. The eighth step includes a step of a filtering module estimating a fault which is a root cause of an event occurring at a managed object, based on the fault state transition sequence and the fault state transition probability.

According to the present invention, it is possible to provide a fault cause estimating system which can analyze a cause of a transitive fault even in a case of a fault of which transitive relation is unknown.

BRIEF DESCRIPTION OF DRAWINGS

FIG. 21 is a view showing a basic model definition of the fault cause estimating system according to the exemplary embodiment of the present invention;

FIG. 22 is a view showing an initial fault derivation model of the fault cause estimating system according to the example of the present invention;

FIG. 23 is a view showing an initial event derivation model of the fault cause estimating system according to the example of the present invention;

FIG. 24 is a view showing a fault derivation model of the fault cause estimating system according to the example of the present invention;

FIG. 25 is a view showing an event derivation model of the fault cause estimating system according to the example of the present invention;

FIG. 26 is a view showing an instance derivation model of the fault cause estimating system according to the example of the present invention;

FIG. 27 is a view showing a fault definition DB of the fault cause estimating system according to the example of the present invention;

FIG. 28 is a view showing a fault occurrence location class definition DB of the fault cause estimating system according to the example of the present invention;

FIG. 29 is a view showing an instance definition DB of the fault cause estimating system according to the example of the present invention;

FIG. 30 is a view showing a result of fault learning of the fault cause estimating system according to the example of the present invention;

FIG. 34 is a block diagram showing a configuration of a fault cause estimating system of Patent Literature 3.

DESCRIPTION OF EXEMPLARY EMBODIMENTS

A fault cause estimating system, a fault cause estimating method, and a fault cause estimating program according to an exemplary embodiment of the present invention will be described below with reference to the attached drawings.

A fault cause estimating system, a fault cause estimating method, and a fault cause estimating program according to the present invention analyze a cause of a fault of a managed object device by using an extended HMM which is extension of a Hidden Morkov Model (HMM). That is to say, initial models (an initial fault derivation model, an initial event derivation model) are firstly generated from a basic model. Next, an extended Baum-Welch algorithm according to the present invention is applied to the initial models and an event sequence for learning (output sequence), to estimate extended HMMs (a fault derivation model, an event derivation model). In addition, a forward algorithm according to the present invention is applied to the event sequence for learning, to estimate an extended HMM (an instance derivation model) concerned with classes of devices. Then, an extended Viterbi algorithm according to the present invention is applied to the extended HMMs (the fault derivation model, the event derivation model, the instance derivation model) and the observed event sequence (output sequence), to estimate a maximum likelihood path of a fault sequence (state sequence) and estimate a fault cause therefrom. Here, it is assumed that hidden states (faults) can be narrowed down with a class of a device which is an event occurrence source, and that a probability of fault derivation is proportional to an event derivation probability of each device. Detailed description will be given below.

1. CONFIGURATION OF THE FAULT CAUSE ESTIMATING SYSTEM

Figure 1:
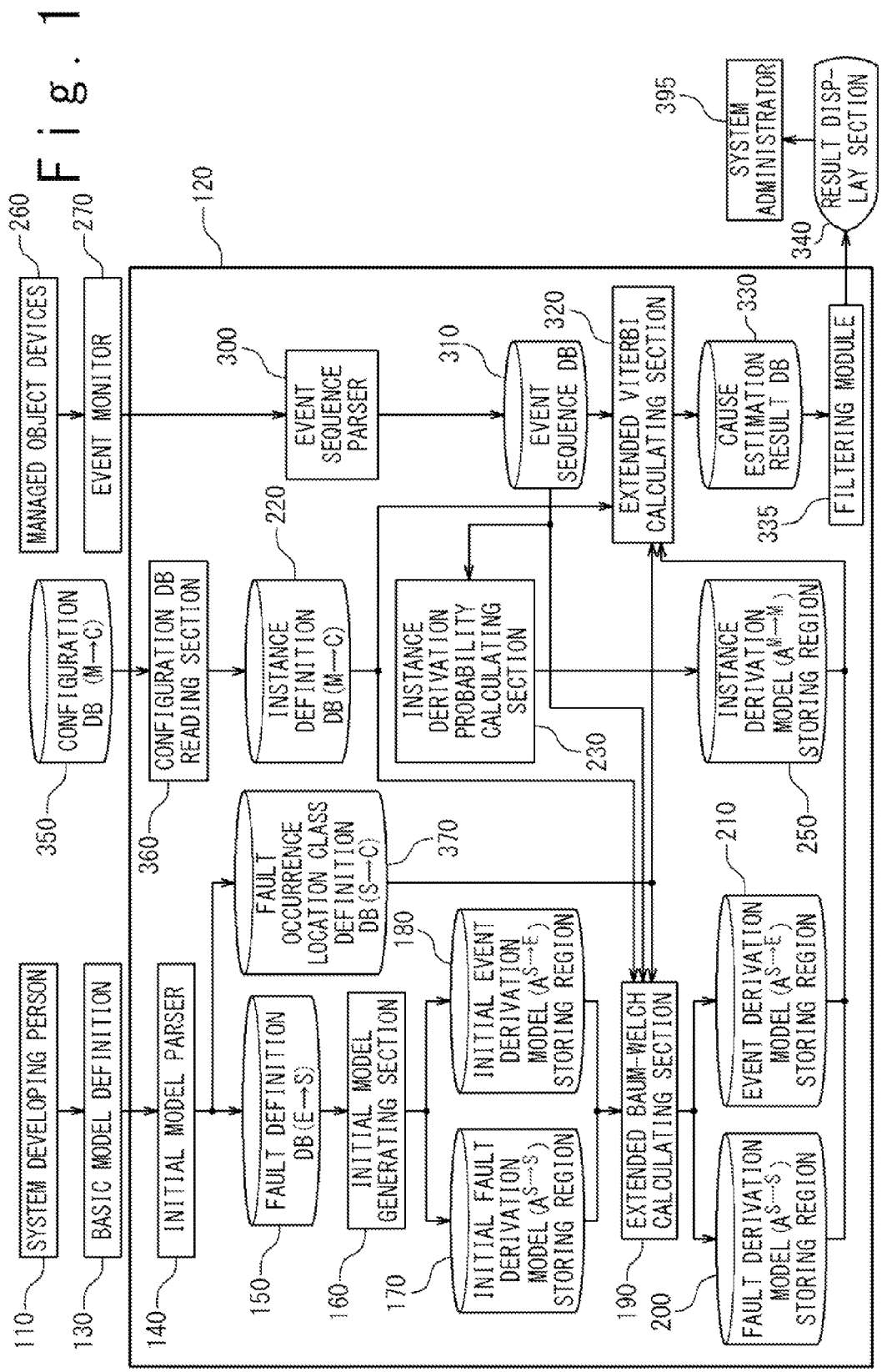
FIG. 1 is a block diagram showing a configuration of a fault cause estimating system according to an exemplary embodiment of the present invention.

First, a configuration of the fault cause estimating system according to the exemplary embodiment of the present invention will be described. FIG. 1 is a block diagram showing a configuration of the fault cause estimating system according to the exemplary embodiment of the present invention. The fault cause estimating system includes an initial model parser 140, a fault definition database (DB) 150, a fault occurrence location class definition database (DB) 370, an initial model generating section 160, an initial fault derivation model storing region 170, an initial event derivation model storing region 180, an extended Baum-Welch calculating section 190, a fault derivation model storing region 200, an event derivation model storing region 210, a configuration database (DB) reading section 360, an instance definition database (DB) 220, an instance derivation probability calculating section 230, an instance derivation model storing region 250, an event sequence parser 300, an event sequence database (DB) 310, an extended Viterbi calculating section 320, a cause estimation result database (DB) 330, and a filtering module 335.

The fault cause estimating system is an information processing device (hardware) such as a personal computer and a work station in which a fault cause estimating program (software) according to the present invention is installed. A function of each section, each region and the like of the fault cause estimating system can be realized by cooperating the software and the hardware to work together.

The initial model parser 140 receives a basic model definition 130 showing a basic model as an input from a computer 110 belonging to a system developer. The basic model definition 130 relates and defines an event which can occur in managed object devices 280 and a fault which causes the event. That is to say, the basic model definition 130 is defined with a set E of events, a set S of faults, device classes C, a function $h_{E \to S}: E \to S$ indicating a correspondence relationship between events and faults, and a function $h_{S \to C}: S \to C$ indicating a correspondence relationship between faults and device classes. Although the function h is a total function, the function h may also be a partial function. A specific example of the basic model definition 130 will be mentioned later (FIG. 21). The initial model parser 140 parses the basic model definition 130 and stores the result of the parsing in the fault definition DB 150. A specific example of the fault definition DB 150 will be mentioned later (FIG. 27). The initial model parser 140 also relates and defines (fault occurrence location class definition) a fault and a class of an occurrence device (occurrence location) of the fault, and stores the definition in the fault occurrence location class definition DB 370. That is to say, the set S of faults, the set C of classes of fault occurrence devices, and the function $h_{S \to C}: S \to C$ indicating a correspondence relationship between the set S and the set C are stored. A specific example of the fault occurrence location class definition DB 370 will be mentioned later (FIG. 28).

The initial model generating section 160 refers to the fault definition DB 150, and generates an initial fault derivation model $A^{S \to S}$ and an initial event derivation model $A^{S \to E}$. The initial fault derivation model $A^{S \to S}$ and the initial event derivation model $A^{S \to E}$ are stored in the initial fault derivation model storing region 170 and the initial event derivation model storing region 180, respectively. Here, $A^{X \to Y}$ is defined as a transition matrix where a probability $Pr(y|x)$ indicating y occurrence probability under an x condition is a matrix element $A[y, x]$ when $x \in X$ and $y \in Y$. Note that X and Y are finite sets, and integers $N(x)$ and $N(y)$ each beginning from 0 are assigned to the elements x and y. $A[y, x]$ is an abbreviation of $A[N(y), N(x)]$.

At this time, the initial fault derivation model $A^{S \to S}$ and the initial event derivation model $A^{S \to E}$ are expressed by the following formula (1) and formula (2).

[Equation 1]

$$A^{S \to S}[s_i, s_j] = \frac{1}{|S|} \quad (1)$$

-continued $$A^{S \to E}[e_i, s_j] = \begin{cases} \dfrac{1}{|\{e \in E \mid h_{E \to S}(e) = s_j\}|} & (h_{E \to S}(e) \neq \text{(empty set)}) \\ 0 & \text{(others)} \end{cases} \quad (2)$$

Note that: $s_i$, $s_j \in S$; and $e_i$, $e_j \in E$. $|S|$ shows the number of elements of the set S of faults. $|\{e \in E | h_{E \to S}(e) = s_j\}|$ shows the number of elements of the events e caused by the fault $s_j$, among the set E.

That is to say, the initial fault derivation model $A^{S \to S}$ shows a model of fault transition where another fault $s_i$ is derived from the fault $s_j$. In detail, $A^{S \to S}$ is a transition matrix where a probability (state transition probability) of transition from the state of the fault $s_j$ to the state of the fault $s_i$ is a matrix element $A[s_i, s_j]$. However, in initial setting (initial model), every matrix element (occurrence probability) is $1/|S|$ which is fixed. On the other hand, the initial event derivation model $A^{S \to E}$ shows a model of event transition where an event $e_i$ is derived from the fault $s_j$. In detail, $A^{S \to E}$ is a transition matrix where a probability (output probability) of an event $e_i$ being output under the state of the fault $s_j$ is a matrix element $A[e_i, s_j]$. However, in initial setting (initial model), with respect to $f_{E \to S}$ defined in the basic model definition 130, the matrix element $A[e_i, s_j]$ has a value of the above formulas when $e_i \in \text{dom}(h_{E \to S})$ (when an event $e_i$ occurs due to a certain fault $s_j$), but the matrix element $A[e_i, s_j]$ is 0 otherwise. Note that dom ($h_{E \to S}$) is a domain of the function $h_{E \to S}$.

A configuration database (DB) 350 stores a correspondence relationship (instance definition) between each of a plurality of devices (which can be fault occurrence device) in the managed object devices 260 and the class thereof. That is to say, a set M of devices (fault occurrence devices), a set C of classes of the devices, and a function $g_{M \to C}$:M→C showing a correspondence relationship between the set M and the set C are stored. The configuration DB reading section 360 acquires information of the configuration DB 350, and writes the information into the instance definition DB 220 in the fault cause estimating system 120. A specific example of the instance definition DB 220 will be mentioned later (FIG. 29).

Figure 18:
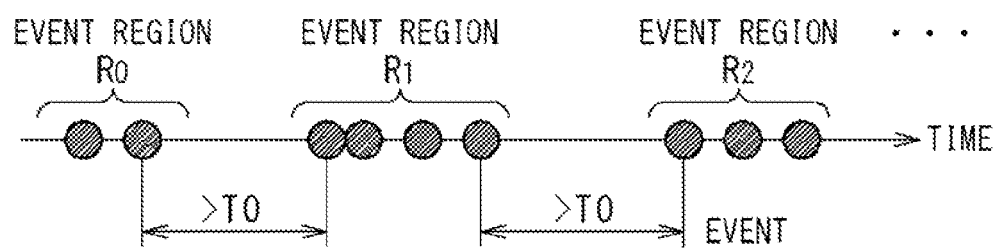
FIG. 18 is a view showing an operation of an event sequence parser of the fault cause estimating system according to the exemplary embodiment of the present invention.

The event sequence parser 300 acquires an event sequence (e (t), t=0, . . . , T) as a plurality of events arranged in order of time of occurrence, which has been obtained by an event monitor 270. The event sequence includes an event e(t) ($\in$E), and an occurrence device m(t) ($\in$M) in which the event e(t) occurs. As the event sequence, an event sequence for learning obtained during a test operation of the managed object devices 260, and an event sequence obtained by the event monitor 270 during actual monitoring of the managed object devices 260 are exemplified. The event sequence parser 300 divides the acquired event sequence to store them in the event sequence DB 310. That is to say, the event sequence DB 310 stores a plurality of event sequences divided by using a given division method. As the division method, a method for dividing an event sequence at the time when an event does not occur for a given length of time T is exemplified. A divided event sequence or a range thereof is referred to as an event region. Details will be mentioned later (FIG. 18).

The extended Baum-Welch calculating section 190 receives the event sequence (e(t), t=0, . . . , T) of the event sequence DB 310 as an input, refers to the instance definition DB 220, the fault occurrence location class definition DB 370, the initial fault derivation model storing region 170 and the initial event derivation model storing region 180, and applies the extended Baum-Welch algorithm according to the present invention in order to calculate the fault derivation model $A^{S \to S}$ and the event derivation model $A^{S \to E}$. A calculation method will be mentioned later. The calculated fault derivation model $A^{S \to S}$ and event derivation model $A^{S \to E}$ are stored in the fault derivation model storing region 200 and the event derivation model storing region 210, respectively.

Here, the fault derivation model $A^{S \to S}$ shows a fault transition model concerned with combinations of classes of a plurality of devices and faults at the classes of the plurality of devices. That is to say, the fault derivation model $A^{S \to S}$ shows a probability (state transition probability) of transition from a state of a fault which occurs at a class of a certain device (a device class, a fault), to a state of another fault which occurs at a class of another device (another device class, another fault). The event derivation model $A^{S \to E}$ shows an event transition model concerned with combinations of classes of a plurality of devices and events at the classes of the plurality of devices. That is to say, the event derivation model $A^{S \to E}$ shows a probability (output probability) that from a state of a fault (a device class, a fault) which occurs at a class of a device, an event (the device class, an event) which occurs at the class of the device is outputted. Here, in the above description, another fault and another device class may be the same fault and the same device class. Details of the extended Baum-Welch calculating section 190 will be mentioned later.

The instance derivation probability calculating section 230 receives an event sequence (e(t), t=0, . . . , T) of the event sequence DB 310 as an input and applies the forward algorithm according to the present invention to calculate the instance derivation model $A^{M \to M}$. The calculated instance derivation model $A^{M \to M}$ is stored in the instance derivation model storing region 250.

Here, the instance derivation model $A^{M \to M}$ shows transitive relation concerned with an occurrence device of an event. That is to say, the instance derivation model $A^{M \to M}$ shows a model showing transition of event occurrence devices, indicating a probability (state transition probability) of transition from a state where a certain event occurs at a certain time in a certain device, to a state where an event occurs at a next time in another device. Here, in the above description, another device may be the same device.

The extended Viterbi calculating section 320 receives the event sequence (e(t), t=0, . . . , T) of the event sequence DB 310 as an input, refers to the instance definition DB 220, the fault occurrence location class definition DB 370, the fault derivation model storing region 200, the event derivation model storing region 210, and the instance derivation model storing region 250, and applies the extended Viterbi algorithm according to the present invention, to calculate a fault transition sequence (s(t), (t=0, . . . , T)) and a probability $v_{s(t), m(t)}(t)$ of occurrence of a fault s(t) at a device m(t), for each time t. The calculated result is stored in the cause estimation result DB 330. The fault transition sequence (or derivation sequence) can be seen as a state transition sequence. The extended Viterbi calculating section 320 estimates that a start state of the fault transition sequence (or derivation sequence) is a root cause. The cause estimation result DB 330 relates and stores the estimated fault derivation sequence (s(t), (t=0, . . . , T)), the event sequence (e(t), (t=0, . . . , T)) and the occurrence probability ($v_{s(t), m(t)}(t)$, (t=0, . . . , T)). A specific example of the cause estimation result DB 330 will be mentioned later (FIG. 24 and FIG. 25). Details of the extended Viterbi calculating section 320 will be mentioned later.

The filtering module 335 reads the result of the cause estimation result DB 330 and displays it on the result display section 340. In addition, when a transition (state transition) with a low probability exists in the estimated fault derivation sequence (s(t), (t=0, . . . , T)), for example, when t' exists in which $v_{s(t'), m(t')}(t') (< P_0)$ is lower than a certain threshold value $P_0$, the filtering module 335 considers the transition from the fault s(t') to the fault s(t'+1) as an error. Then, the filtering module 335 divides the fault derivation sequence (s(t), (t=0, ..., T)) at the t' into fault derivation sequences considered to be different from each other. That is, in this example, s(t) is divided into $s_1$(t), (t=0, ..., t') and $s_2$(t), (t=t'+1, ..., T).

The filtering module 335 deletes an event with a low event occurrence probability (output probability), which is, for example, lower than a certain threshold P1, in the events e(t) occurring from the faults stored in the cause estimation result DB 330 because of considering it as an error.

Figure 31:
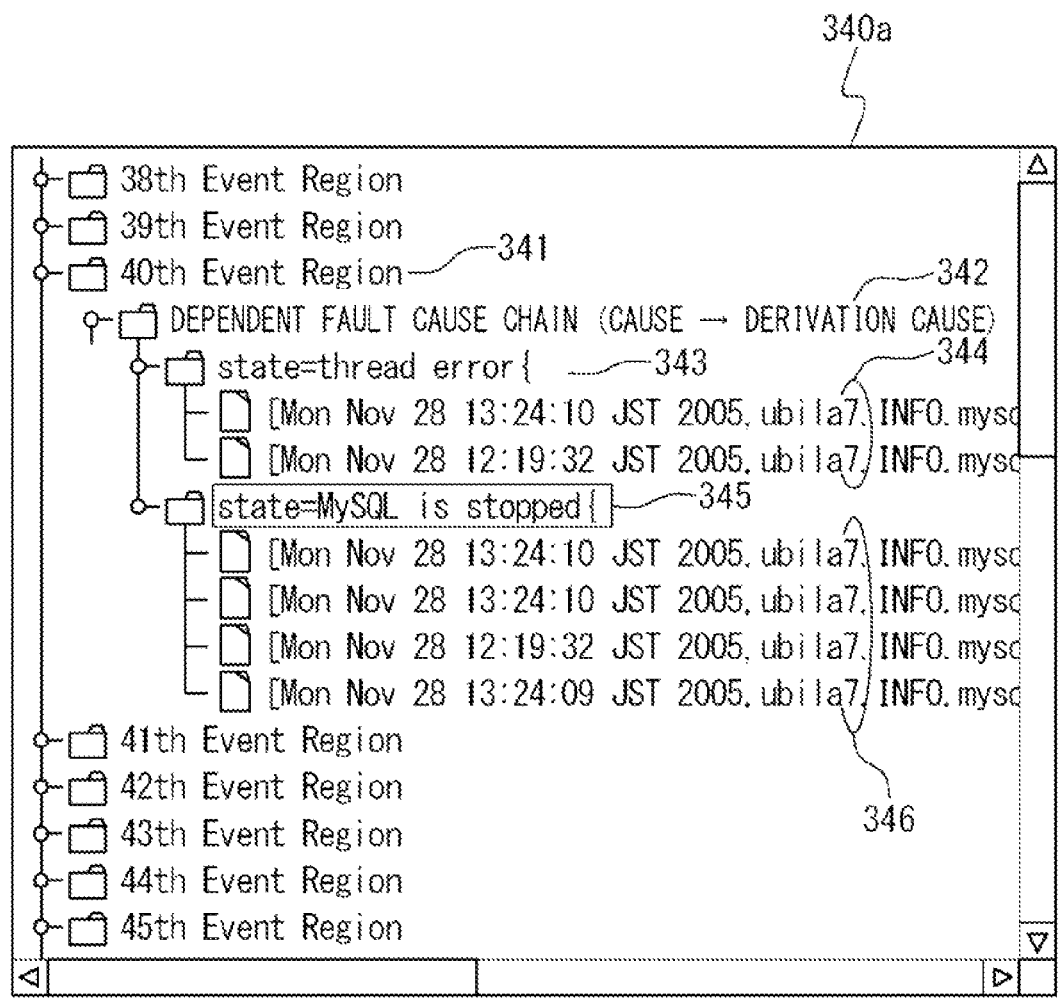
FIG. 31 is a view showing an example of a display result at a display result section of the fault cause estimating system according to the example of the present invention.
Figure 32:
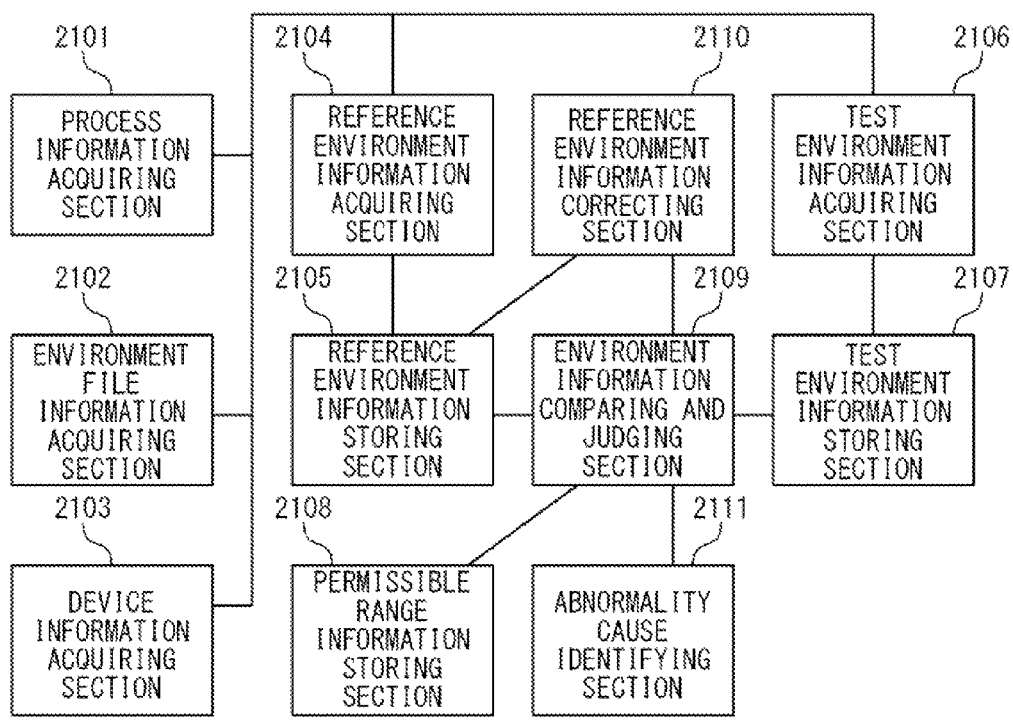
FIG. 32 is a block diagram showing a configuration of a fault cause discovering device of Patent Literature 1.
Figure 33A:
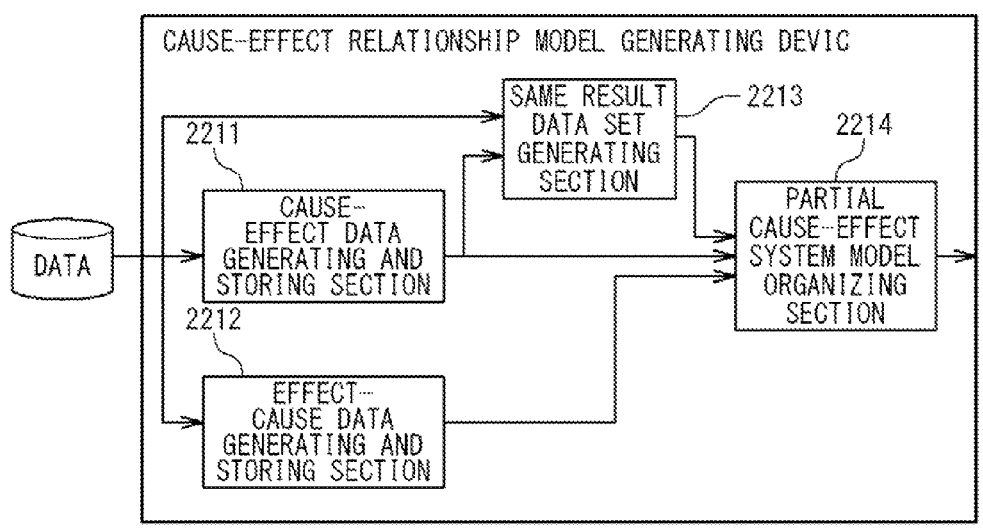
FIG. 33A is a block diagram showing a cause-effect relationship model generating device of Patent Literature 2.
Figure 33B:
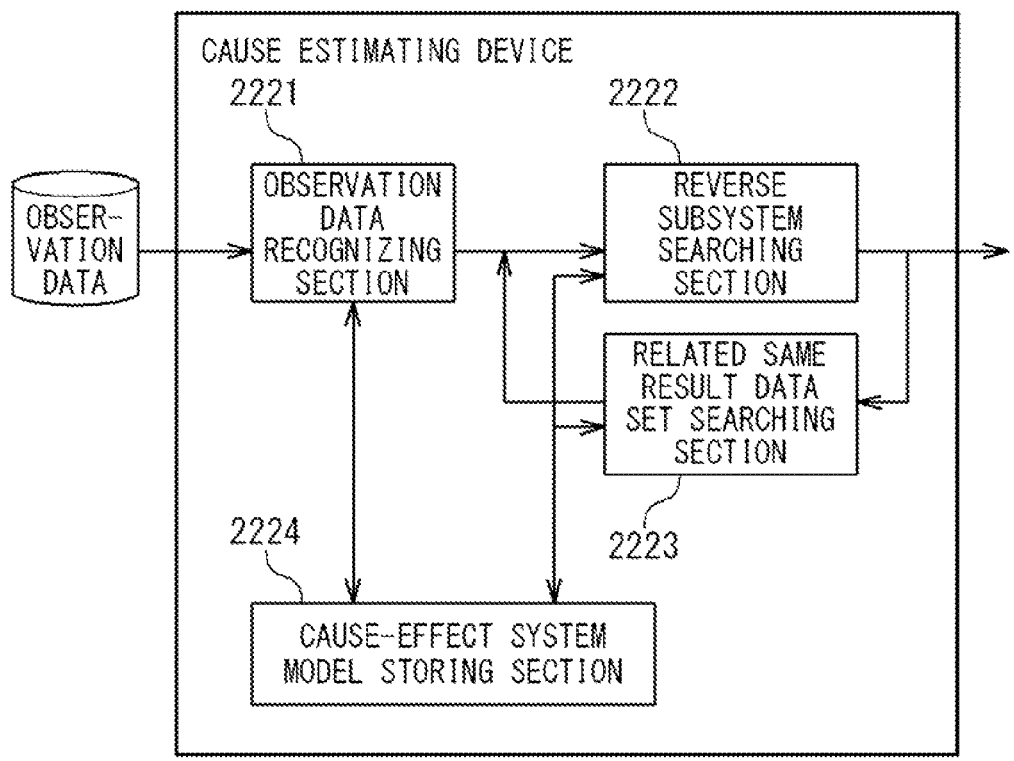
FIG. 33B is a block diagram showing a cause estimating device of Patent Literature 2.
Figure 33C:
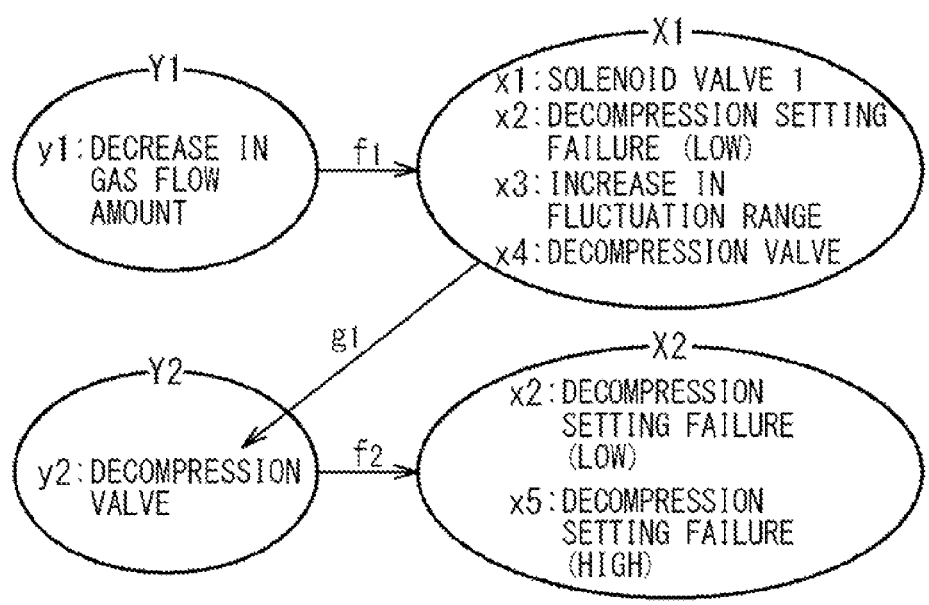
FIG. 33C is a schematic diagram showing a cause-effect system model of Patent Literature 2.

The filtering module 335 extracts the sequence of the fault s, of which the total of the probabilities $v_{s(t),m(t)}$(t) is high, from the divided plurality of fault derivation sequences as a likelihood derivation sequence. Then, the filtering module 335 estimates a start state of the extracted derivation sequence as a root cause (fault cause). In addition, the remaining events which are not deleted are considered to be events derived from the fault cause. The filtering module 335 further displays these analysis results on the result display section 340. Details of the display contents will be mentioned later (FIG. 31).

2. CONFIGURATION OF EXTENDED VITERBI CALCULATING SECTION

Figure 2:
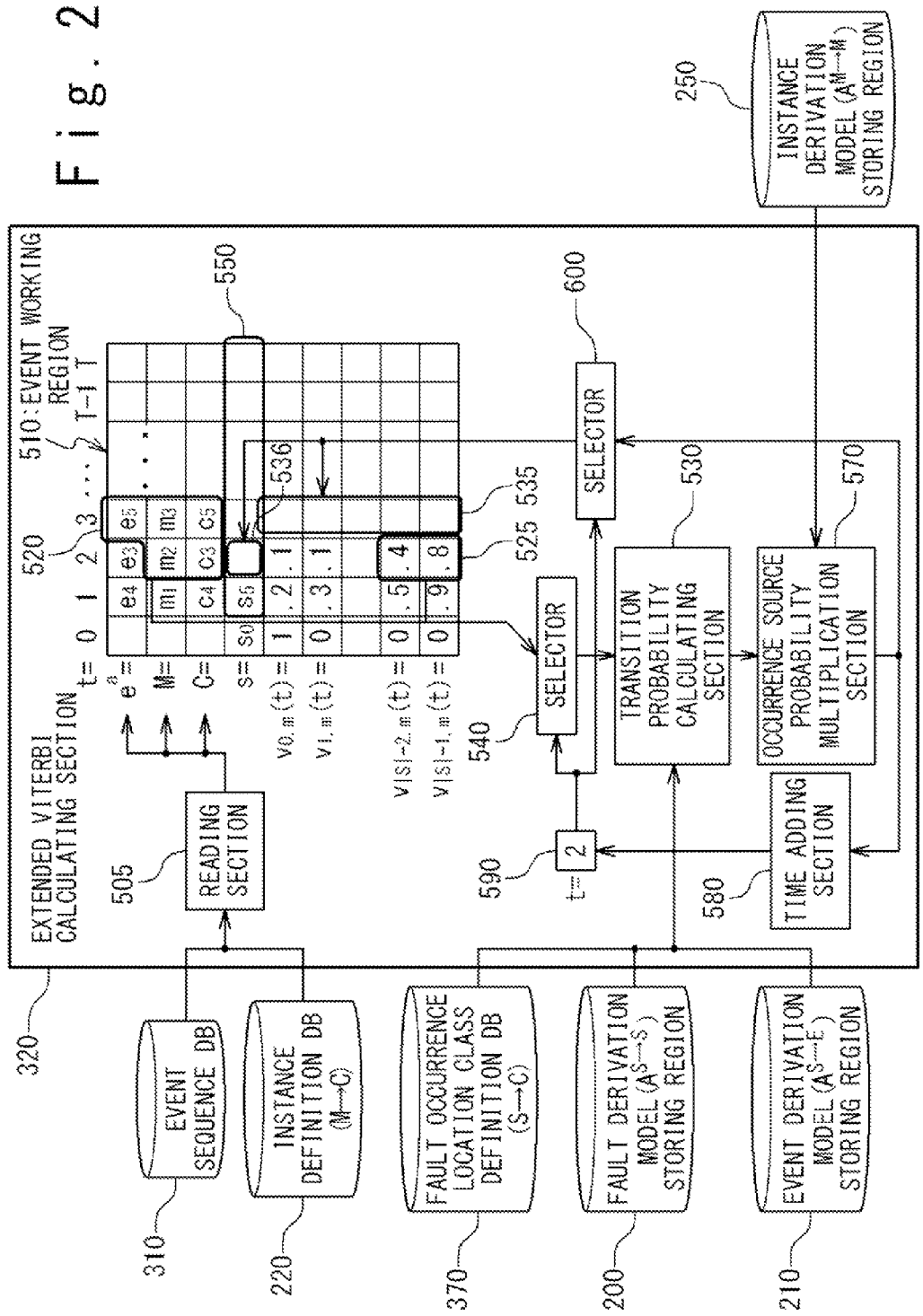
FIG. 2 is a block diagram showing a configuration of an extended Viterbi calculating section according to the exemplary embodiment of the present invention.

Next, the extended Viterbi calculating section according to the exemplary embodiment of the present invention will be described. FIG. 2 is a block diagram showing a configuration of an extended Viterbi calculating section according to the exemplary embodiment of the present invention. The extended Viterbi calculating section 320 includes a reading section 505, an event working region 510, a selector 540, a transition probability calculating section 530, an occurrence source probability multiplication section 570, a time adding section 580, a time counter 590 and a selector 600.

The event working region 510 includes a region $e^a$ where an event e(t) for analysis is stored, a region M where information of an event occurrence device m(t) as a device that the event occurs is stored, a region C where an class c(t) of the event occurrence device is stored, a region s where a fault cause s(t) is stored and a region $v_{s,m}$(t) where a probability $v_{s(t),m(t)}$(t) is stored, in each time t. Here, an event stored in the region $e^a$ is also referred to as the event $e^a$. As described later, in each region, information will be stored according to an operation of the extended Viterbi calculating section 320.

Here, in $v_{0,m}$(t) to $v_{|S|-1,m}$(t), 0 to |S|-1 indicate faults (fault states) $s_0$ to $s_{|S|-1}$. These faults (fault states) $s_0$ to $s_{|S|-1}$ are given from the fault derivation model $A^{S \to S}$. In addition, m indicates an event occurrence device m corresponding to $s_0$ to $s_{|S|-1}$. As the initial setting, s(0)=$s_0$, $v_{0,m}$(0)=1, $v_{1,m}$(0) to $v_{|S|-1,m}$(0)=0 may be stored.

The reading section 505 reads an event sequence (e(t), t=0, ..., T) from the event sequence DB 310 and stores it in predetermined regions in the event working region 510. That is, in information of the event sequence, the event (t) is stored in the region $e^a$ where an event for analysis is stored and information of the event occurrence device m(t) is stored in the region M where information of an event occurrence device is stored, in each time t. The reading section 505 refers to the instance definition DB 220, acquires a class c(t) of the event occurrence device m(t) and stores the class in the region C where a class of the event occurrence device is stored.

The selector 540 extracts and outputs $e^a$(t+1), m(t), m(t+1), c(t), c(t+1) and $v_{s,m}$(t) in the event working region 510 based on the time t indicated by the time counter 590. The time counter 590 stores, for example, t=0 as an initial setting value.

Here, $v_{s,m}$(t) includes |S| number of elements of $v_{0,m}$(t) to $v_{|S|-1,m}$(t) (|S| number of elements of a vector) at the time t. In addition, $v_{s,m}$(t) includes values of $v_{s,m}$(t), which are extracted from $v_{0,m}$(t) to $v_{|S|-1,m}$(t) and only belongs to the event occurrence devices m(t) having an identical class c(t), based on the class c(t) of the event occurrence device m(t). The remains of $v_{s,m}$(t) are "0". As a result, the values can possibility. Consequently, as compared with a case that all values of $v_{0,m}$(t) to $v_{|S|-1,m}$(t) are extracted and a calculation as described later is performed using the all values, a calculation amount of this case can be dramatically reduced.

The transition probability calculating section 530 receives $e^a$(t+1), m(t), m(t+1), c(t), c(t+1) and $v_{s,m}$(t), and calculates a following recurrence equation (3) with reference to the fault occurrence location class definition $h_{S \to C}$:S→C, the fault derivation model $A^{S \to S}$ and the event derivation model $A^{S \to E}$ The transition probability calculating section 530 calculates a probability P(u|s) which is a probability that a fault u in a device m(t+1) of a class c(t+1) at the time (t+1) is derived from a fault s occurring in a device m(t) of a class c(t) at the time t. Here, the fault u is u∈{s∈S|$h_{S \to C}$(s)=c(t+1)}. That is, the fault u is selected from a plurality of faults s (faults that the device class c(t+1) can take) corresponding to the class c(t+1) of the device m(t+1) by the correspondence relationship $h_{S \to C}$:S→C.

The probability P(u|s) is calculated using the following formula (3) with respect to the above plurality of faults s.

$$P(u|s) = A^{S \to E}[e^a(t+1), u] \cdot \max_s \{A^{S \to S}[u,s] \cdot v_{s,m}(t)\} \quad (3)$$

Here, $A^{S \to S}$[u,s] indicates the fault derivation model (the matrix of |S| rows and |S| columns). The $\max_s\{A^{S \to S}[u,s] \cdot v_{s,m}(t)\}$ indicates the maximum of elements of the result (a vector with |S| number of elements) of $A^{S \to S}[u,s] \cdot v_{s,m}(t)$. $A^{S \to E}[e^a(t+1), u]$ indicates $e^a$(t+1)-th row (a vector with |S| number of elements) of the event derivation model. Consequently, P(u|s) can be obtained as a form of α (constant)× $A^{S \to E}[e^a(t+1), u]$ (a vector with |S| number of elements).

The occurrence source probability multiplication section 570 receives P(u|s) and obtains the probability $v_{u,m(t+1)}$(t+1) which is a probability that a fault u in a device m(t+1) of a class c(t+1) occurs (is derived) from a fault s occurring in a device m(t) of a class c(t) with reference to the instance derivation model $A^{M \to M}$.

Here, it is assumed that a probability P(m(t+1)|m(t)) and a probability of P(u|s) are independent from each other. The probability P(m(t+1)|m(t)) is a probability (fault transition probability of each device) that, from an event derived from an arbitrary fault s in a device m of a class c, an arbitrary event e' of a plurality of events possibly derived from an arbitrary fault s' in another device m' of another class c' is derived. The probability of P(u|s) is a probability (fault transition probability) of derivation in each of kinds of faults. Consequently, even if devices which are monitoring objects in the system increase, the calculation amount does not severely increase (increase directly with the square) unless classes of devices increase.

In this case, $v_{u,m(t+1)}$(t+1) is indicated by a recurrence equation (4).

$$v_{u,m(t+1)}(t+1) = P(m(t+1) \cap u \mid m(t) \cap s) \quad (4)$$
$$= P(m(t+1) \mid m(t)) \cdot P(u \mid s)$$
$$= A^{M \to M}[m(t+1), m(t)] \cdot P(u \mid s)$$

Here, $A^{M \to M}[m(t+1),m(t)]$ indicates a matrix element [m(t+1),m(t)] (constant) of the instance derivation model. According to this, $v_{u,m(t+1)}(t+1)$ can be obtained as a form of β (constant)×P(u|s) (a vector with |S| number of elements).

The occurrence source probability multiplication section 570 stores $v_{u,m(t+1)}(t+1)$ and a fault s in which the maximum of $v_{u,m(t+1)}(t+1)$ is taken in a region 535 ($v_{s,m}(t+1)$) and a region 536 (s(t)) of the event working region 510 where the selector 600 specifies.

The time adding section 580 advances the value of the counter 590 by one, and finishes the process when the counter value becomes equal to or more than the maximum T of the time of the event working region 510. Then, the time adding section 580 writes results of $e^a$, s, $v_{s,m}(t)$ with respect to t=0 to T of the event working region 510 in the cause estimation result DB 330 while relating them with each other. As a result, a transition sequence can be obtained as a sequence in which $v_{u,m(t)}(t)$ of the maximum value in each t is arranged from t=0 to t=T.

3(1). CONFIGURATION OF EXTENDED BAUM-WELCH CALCULATING SECTION

Figure 3:
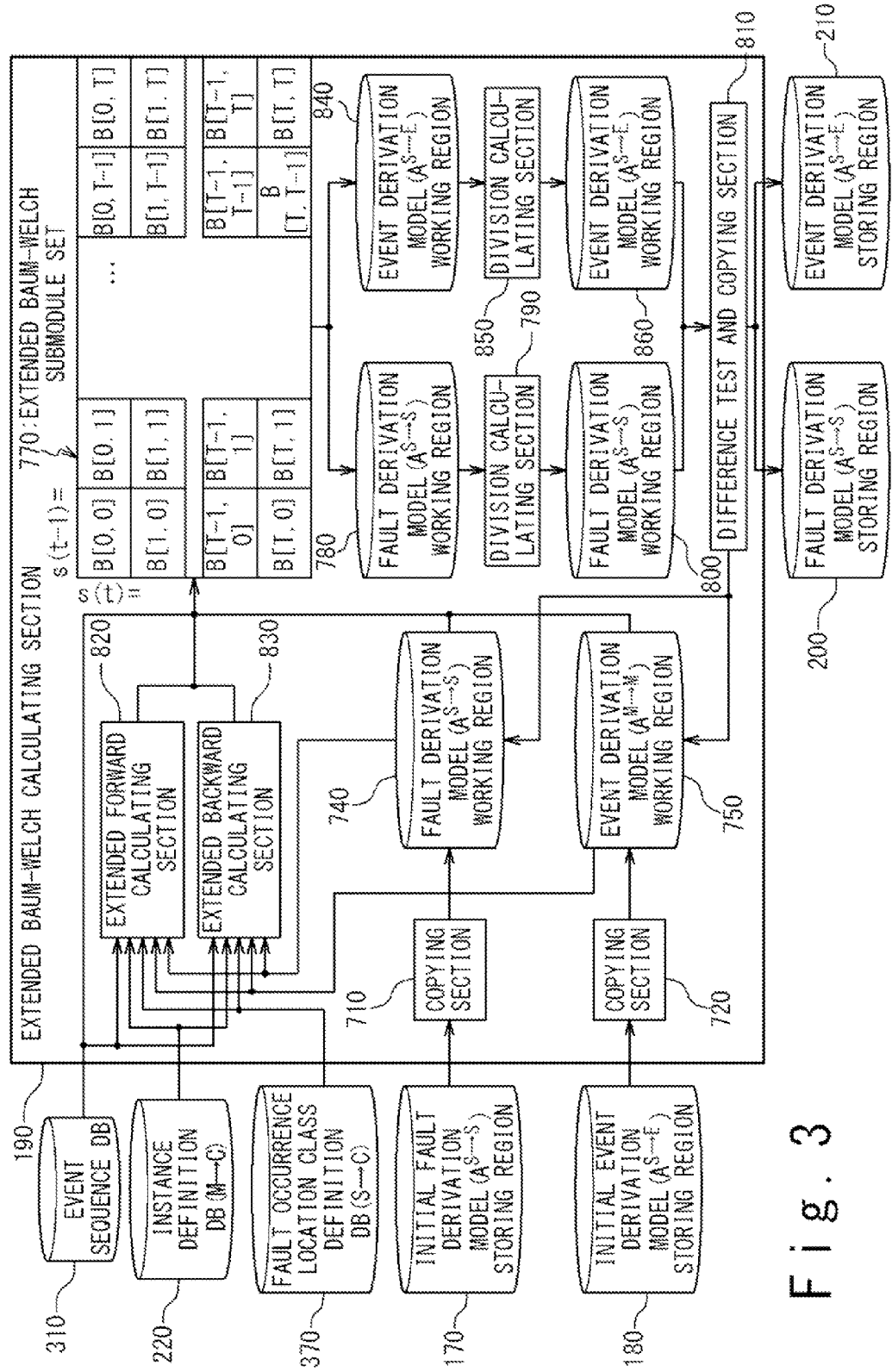
FIG. 3 is a block diagram showing a configuration of an extended Baum-Welch calculating section according to the exemplary embodiment of the present invention.

Next, a configuration of the extended Baum-Welch calculating section according to the exemplary embodiment of the present invention will be described. FIG. 3 is a block diagram showing a configuration of the extended Baum-Welch calculating section according to the exemplary embodiment of the present invention. The extended Baum-Welch calculating section 190 includes: a copying section 710, a copying section 720, a fault derivation model working region 740, an event derivation model working region 750, an extended Baum-Welch submodule set 770, a fault derivation model working region 780, a division calculating section 790, a fault derivation model working region 800, a difference test and copying section 810, an event derivation model working region 840, a division calculating section 850, an event derivation model working region 860, an extended forward calculating section 820 and an extended backward calculating section 830.

The copying section 710 copies the initial fault derivation model $A^{S \to S}$ stored in the initial fault derivation model storing region 170 into the fault derivation model working region 740. The copying section 720 copies the initial event derivation model $A^{S \to E}$ stored in the initial event derivation model storing region 180 into the event derivation model working region 750.

The extended forward calculating section 820 receives an event sequence (e(t), t=0, ..., T) stored in the event sequence DB 310 as an input. Then, with reference to the instance definition DB 220, the fault occurrence location class definition DB 370, the fault derivation model working region 740 and the event derivation model working region 750, when the events e(0), ..., e(T) are given, the extended forward calculating section 820 calculates a probability $f_s(t)$ which is a probability that a state of a fault will be s at the time t (an occurrence probability of the fault s at the time t obtained by calculating in the order of time from the t=0 (start time, start state)) for all s∈S and all time range of t=0, ..., T. The probability $f_s(t)$ is output as $f_{si}(t)$ to the extended Baum-Welch submodule set 770. The detail of the extended forward calculating section 820 will be described later.

The extended backward calculating section 830 receives an event sequence (e(t), t=0, ..., T) stored in the event sequence DB 310 as an input. Then, with reference to the instance definition DB 220, the fault occurrence location class definition DB 370, the fault derivation model working region 740 and the event derivation model working region 750, when the events e(0), ..., e(T) are given, the extended backward calculating section 830 calculates a probability $b_s(t)$ which is a probability that a state of a fault is s at the time t (an occurrence probability of the fault s at the time t obtained by calculating in the reverse order of time from the t=T (end time, end state)) for all s∈S and all time range of t=0, ..., T. The probability $b_s(t)$ is output as $b_{sj}(t)$ to the extended Baum-Welch submodule set 770. The detail of the extended backward calculating section 830 will be described later.

Extended Baum-Welch submodules B[j,i] configuring the extended Baum-Welch submodule set 770 receive $f_{si}(t)$ stored in the extended forward calculating section 820 and $b_{sj}(t)$ stored in the extended backward calculating section 830. Then, with reference to the fault derivation model working region 740 and the event derivation model working region 750, the extended Baum-Welch submodule B[j,i] calculates a transition probability $A^{S \to S}[j,i]$ from a fault $s_i$ to a fault $s_j$. In addition, the extended Baum-Welch submodule B[i,i] corresponding to a diagonal element calculates an occurrence probability $A^{S \to E}[j,i]$ from a fault $s_i$ to an event $e_j$. Then, the extended Baum-Welch submodule set 770 stores the transition probability $A^{S \to S}[j,i]$ as a fault derivation model $A^{S \to S}$ in the fault derivation model working region 780, and stores the occurrence probability $A^{S \to E}[j,i]$ as an event derivation model $A^{S \to E}$ in the event derivation model working region 840. The detail of the extended Baum-Welch submodule set 770 will be described later.

The division calculating section 790 receives the fault derivation model $A^{S \to S}$ stored in the fault derivation model working region 780. Then, the division calculating section 790 calculates a following equation (5) for all $s_i$, $s_j$∈S to normalize the fault derivation model $A^{S \to S}$. After that, the division calculating section 790 stores the normalized fault derivation model $A^{S \to S}$ in the fault derivation model working region 800.

[Equation 2]

$$A^{S \to S}[j, i] := \frac{A^{S \to S}[j, i]}{\sum_k A^{S \to S}[k, i]} \quad (5)$$

Similarly, the division calculating section 850 receives the event derivation model $A^{S \to E}$ stored in the event derivation model working region 840. Then, the division calculating section 850 calculates a following equation (6) for all $s_i$∈S, $e_j$∈E to normalize the event derivation model $A^{S \to E}$. After that, the division calculating section 850 stores the normalized event derivation model $A^{S \to E}$ in the event derivation model working region 860.

[Equation 3]

$$A^{S \to E}[j, i] := \frac{A^{S \to E}[j, i]}{\sum_k A^{S \to E}[k, i]} \quad (6)$$

The difference test and copying section 810 compares the fault derivation model $A^{S \to S}$ stored in the fault derivation model working region 800 with the fault derivation model $A^{S \to S}$ stored in the fault derivation model working region 740. Similarly, the difference test and copying section 810 compares the event derivation model $A^{S \to E}$ stored in the event derivation model working region 860 with the event derivation model $A^{S \to E}$ stored in the event derivation model working region 750. Then, in both of the fault derivation model $A^{S \to S}$ and the event derivation model $A^{S \to E}$, if the differences are sufficiently small (within a predetermined acceptable range), the difference test and copying section 810 judges that they converge to solutions to be obtained. The difference test and copying section 810 stores the fault derivation model $A^{S \to S}$ stored in the fault derivation model working region 800 and the event derivation model $A^{S \to E}$ stored in the event derivation model working region 860 to the fault derivation model storing region 200 and the event derivation model storing region 210, respectively. On the other hand, in any of the fault derivation model $A^{S \to S}$ and the event derivation model $A^{S \to E}$, if the difference is large (beyond the predetermined acceptable range), the difference test and copying section 810 stores the fault derivation model $A^{S \to S}$ stored in the fault derivation model working region 800 and the event derivation model $A^{S \to E}$ stored in the event derivation model working region 860 to the fault derivation model working region 740 and the event derivation model working region 750, respectively.

3(2). CONFIGURATION OF EXTENDED BAUM-WELCH SUBMODULE SET

Figure 4:
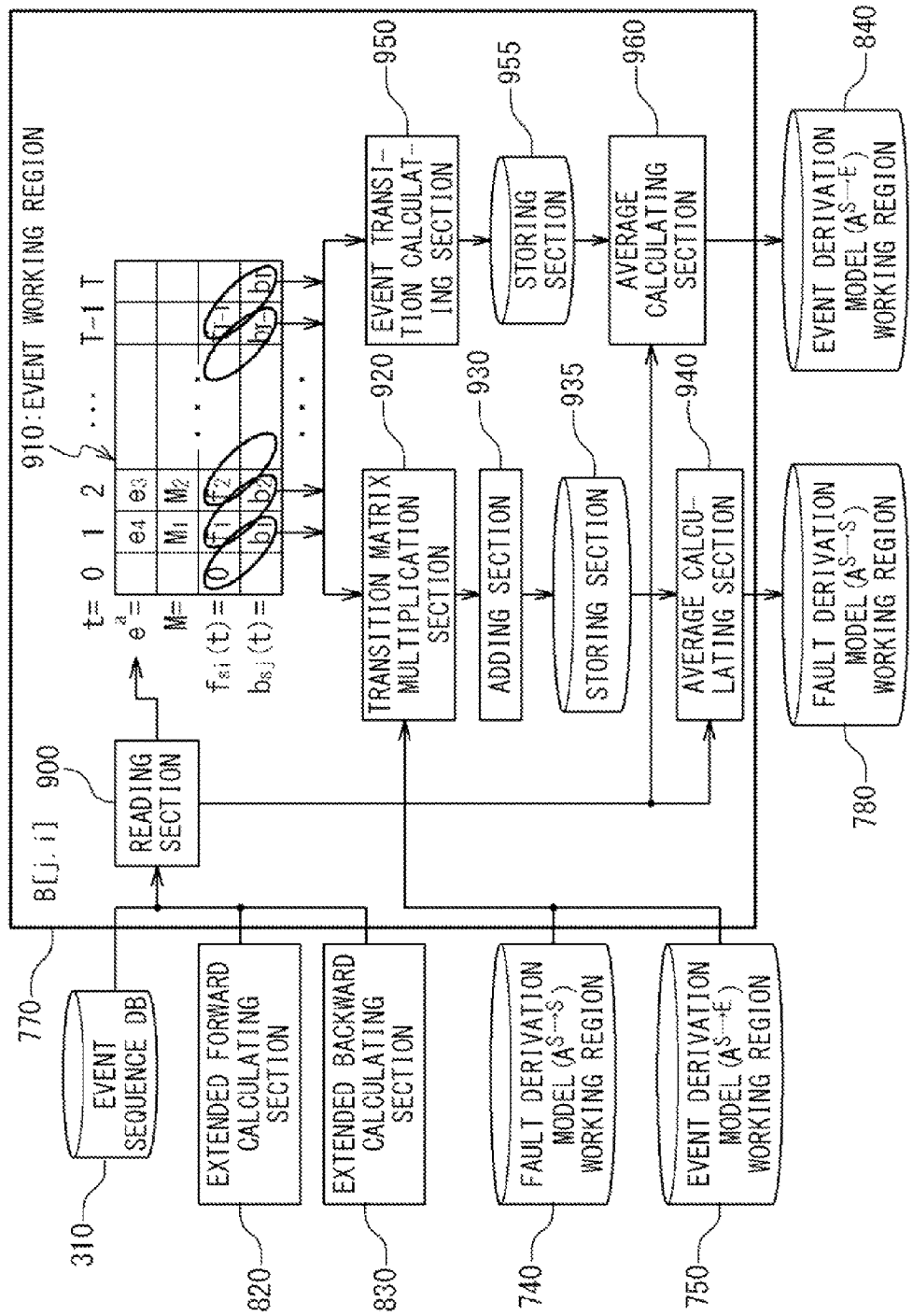
FIG. 4 is a block diagram showing a configuration of a set of extended Baum-Welch submodules according to the exemplary embodiment of the present invention.

Next, a configuration of the extended Baum-Welch submodule set according to the exemplary embodiment of the present invention. FIG. 4 is a block diagram showing a configuration of the extended Baum-Welch submodule set according to the exemplary embodiment of the present invention. With reference to FIG. 4, the extended Baum-Welch submodule B[j,i] as one element of the extended Baum-Welch submodule set 770 includes: a reading section 900, an event working region 910, a transition matrix multiplication section 920, a adding section 930, a storing section 935, an average calculating section 940, an event transition calculating section 950, a storing section 955 and an average calculating section 960.

The vent working region 910 has a region $e^a$ storing an event e(t) for analysis, a region M storing an event occurrence device (occurrence location) m(t), a region $f_{si}(t)$ storing a probability $f_{si}(t)$ which is a probability that a state of a fault will be si at the time t when the event e(t) is given and a region $b_{sj}(t)$ storing a probability $b_{sj}(t)$ which is a probability that a state of a fault is sj at the time t when the event e(t) is given, in each time t. Here, information stored in the region $e^a$ is also referred to as $e^a$.

The reading section 900 reads an event sequence (e(t), t=0, ..., T) from the event sequence DB 310 and stores it in the region ea of the event working region 910 in each time t. In addition, the reading section 900 reads $f_{si}(t)$ (t=0, ..., T-1) from the extended forward calculating section 820 and stores it in the region $f_{si}(t)$ of the event working region 910 in each time t. Similarly, the reading section 900 reads $b_{sj}(t+1)$ (t=0, ..., T-1) from the extended backward calculating section 830 and stores it in the region $b_{sj}(t+1)$ of the event working region 910 in each time t.

The transition matrix multiplication section 920 receives $f_{si}(t)$ and $b_{sj}(t+1)$ of the event working region 910. Then, with reference to the fault derivation model $A^{S \to S}[j,i]$ stored in the fault derivation model working region 740 and the event derivation model $A^{S \to E}[e^a(t),i]$ stored in the event derivation model working region 750, the transition matrix multiplication section 920 calculates a probability that a state is $s_i$ and an event $e^a(t)$ occurs at the time t and a state is $s_j$ at the time t+1, with respect to all t=0 to T-1, by using a following equation (7).

$$A^{S \to S}[j,i](t)=b_{sj}(t+1) \cdot A^{S \to E}[e^a(t),i] \cdot A^{S \to E}[e^a(t),i] \cdot f_{si}(t) \quad (7)$$

The adding section 930 adds all $A^{S \to S}[j,i](t)$ from t=0 to T-1 calculated by the transition matrix multiplication section 920 using the equation (7), by using a following equation (8) with respect to the time t. The adding section 930 calculates a calculation result $A^{S \to S}[j,i]$ to additionally stores it to the storing section 935.

[Equation 4]

$$A^{S \to S}[j,i] = \sum_{t=0}^{T-1} A^{S \to S}[j,i](t) \quad (8)$$
$$= \sum_{t=0}^{T-1} b_{sj}(t+1) A^{S \to E}[e^a(t),i] A^{S \to E}[e^a(t),i] f_{si}(t)$$

$A^{S \to S}[j,i]$ stored in the storing section 935 is calculated every event sequence (event region). Therefore, in the storing section 935, a plurality of $A^{S \to S}[j,i]$ exists.

The average calculating section 940 adds all of the plurality of $A^{S \to S}[j,i]$, each of which is calculated every event sequence, stored in the storing section 935, and then divides it by the number of the event sequences to average it. After that, the average calculating section 940 stores the averaged $A^{S \to S}[j,i]$ in a region corresponding to $A^{S \to S}[j,i]$ of the fault derivation model working region 780.

The event transition calculating section 950 operates only for diagonal elements of the extended Baum-Welch submodule B[i,i]. The event transition calculating section 950, in BUM, in a case of j==j, with reference to the event working region 910, calculates a probability that an event $e_j$ occurs by the fault $s_i$. That is, the event transition calculating section 950 calculates a following equation (9) and additionally stores a result in the storing section 955.

[Equation 5]

$$A^{S \to E}[j,i] = \Sigma_{\{t|e^a(t)=e_j\}} b_{si}(t+1) f_{si}(t) \quad (9)$$

$A^{S \to E}[j,i]$ stored in the storing section 955 is calculated every event sequence (event region). Therefore, in the storing section 955, a plurality of $A^{S \to E}[j,i]$ exists.

The average calculating section 960 adds all of the plurality of $A^{S \to E}[j,i]$, each of which is calculated every event sequence, stored in the storing section 955, and then divides it by the number of the event sequences to average it. After that, the average calculating section 960 stores the averaged $A^{S \to E}[j,i]$ in a region corresponding to $A^{S \to E}[j,i]$ of the event derivation model working region 840.

3(3). CONFIGURATION OF EXTENDED FORWARD CALCULATING SECTION

Figure 5:
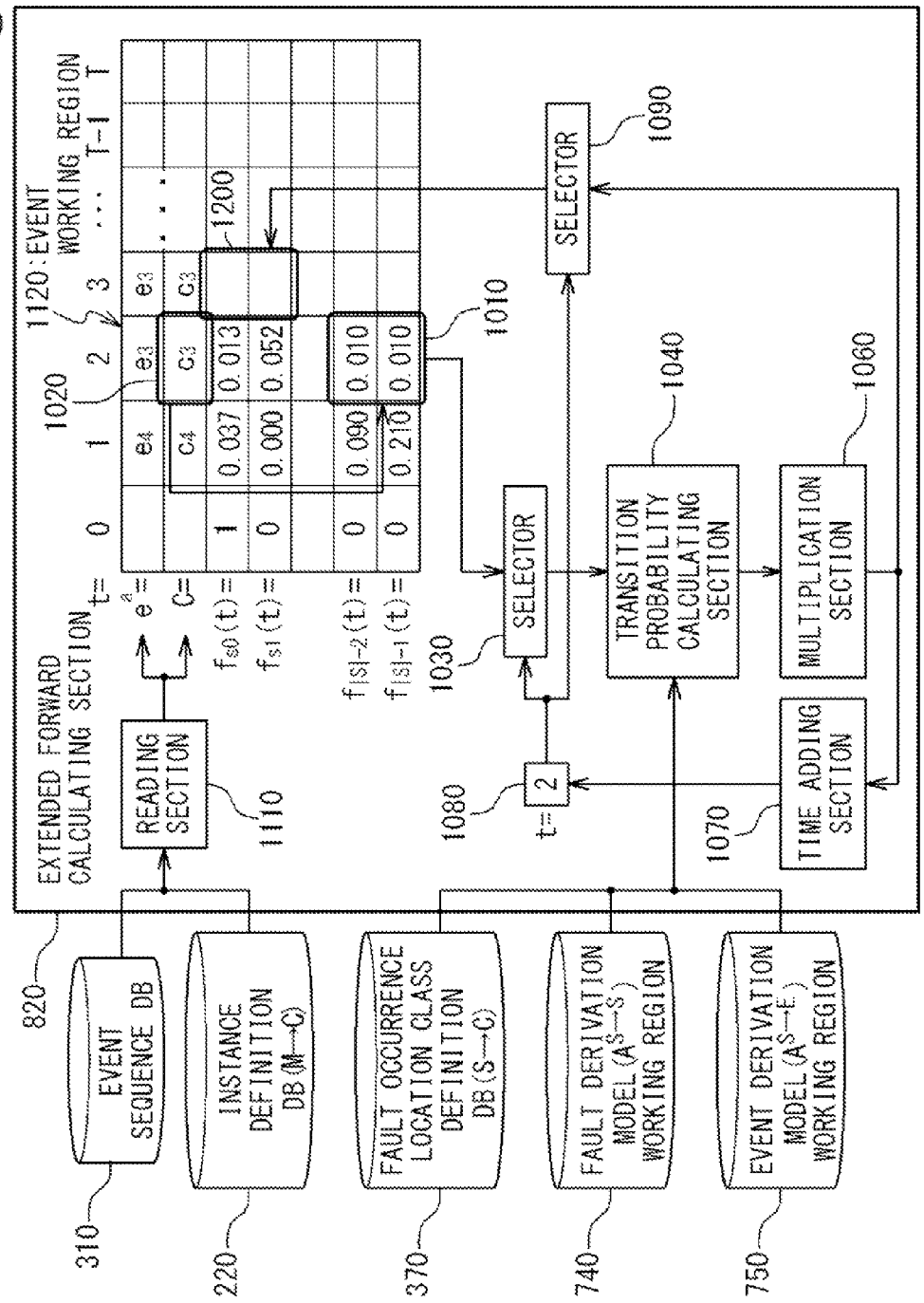
FIG. 5 is a block diagram showing a configuration of an extended forward calculating section according to the exemplary embodiment of the present invention.

Next, a configuration of the extended forward calculating section according to the exemplary embodiment of the present invention will be described. FIG. 5 is a block diagram showing the configuration of the extended forward calculating section according to the exemplary embodiment of the present invention. The extended forward calculating section 820 includes a reading section 1110, an event working region 1120, a selector 1030, a transition probability calculating section 1040, a multiplication section 1060, a time adding section 1070, a time counter 1080 and a selector 1090.

The event working region 1120 has a region $e^a$ storing an event e(t) for analysis, a region C storing a class c(t) of an event occurrence device and a region $f_s(t)$ storing a probability $f_s(t)$ which is probability that a state of a fault will be s at the time t when the event e(t) is given, in each time t. Here, information stored in the region $e^a$ is also referred to as $e^a$. As described later, information is stored in each region according to an operation of the extended forward calculating section 820.

Here, in $f_{s0}(t)$ to $f_{|S|-1}(t)$ as $f_s(t)$, s0 to |S|−1 indicate faults (states) $s_0$ to $s_{|S|-1}$. These faults (states) $s_0$ to $s_{|S|-1}$ are given from the fault derivation model $A^{S \to S}$. As an initial setting, for example, $f_{s0}(0)=1$, $f_{s1},(0)$ to $f_{|S|-1}(0)=0$ are stored.

The reading section 1110 reads an event sequence (e(t), t=0, . . . , T) from the event sequence DB 310 and stores the event e(t) in the region $e^a$ of the event working region 1120 in each time t. In addition, with reference to the instance definition DB 220, the reading section 1110 obtains a class c(t) of an event occurrence device m(t) and stores it in the region C of the event working region 1120 in each time t.

The selector 1030 extracts $f_s(t)$, $e^a(t+1)$, c(t), c(t+1) in the event working region 1120 based on the time t indicated by the time counter 1080 and outputs them. The time counter 1080 stores, for example, t=0 as an initial setting. Here, $f_s(t)$ is a value of $f_s(t)$ which has the same class c(t) as that of the event occurrence device, and is extracted from $f_{s0}(t)$ to $f_{|S|-1}(t)$ (a vector with |S| number of elements) at the time t. That is, f(t) corresponds to the fault s satisfying $s \in S | h_{S \to C}(s)=c(t)$. Consequently, only $f_s(t)$ which has extremely high possibility can be substantially narrowed from $f_{s0}(t)$ to $f_{|S|-1}(t)$. As a result, as compared with a case that all values of $f_{s0}(t)$ to $f_{|S|-1}(t)$ are extracted and the later calculations are carried out on them, the calculation amount can be dramatically reduced.

The transition probability calculating section 1040 receives $f_s(t)$, $e^a(t+1)$, c(t), c(t+1). Then, with reference to the fault occurrence location class definition (the fault occurrence location class definition DB 370), the fault derivation model $A^{S \to S}$ (the fault derivation model working region 740) and the event derivation model $A^{S \to E}$ (the event derivation model working region 750), the transition probability calculating section 1040 calculates a following equation (10) in each fault $u \in \{s \in S | h_{S \to C}(s) = c(t+1)\}$. Here, the fault u is selected from a plurality of faults s (faults that the device class c(t+1) can take) each related to a class c(t+1) of a device m(t) by a corresponding relationship $h_{S \to C}: S \to C$. The equation (10) is calculated for each of the plurality of faults s.

[Equation 6]

$$\sum_{\{s|h_{S \to C}(s)=c(t)\}} A^{S \to S}[u, s] f_s(t) \qquad (10)$$

This value indicates an occurrence probability $f_u(t+1)$ of a fault u at the time t+1, which can be obtained by calculating in the order of time t from the time t=0. Here, since $A^{S \to S}[u,s]$, which is the fault derivation model (a matrix of |S| rows and |S| columns), is calculated every u (every row), it is handled as a matrix of one row and |S| columns every row. In addition, $f_s(t)$ is a numerical value. Σ is a result obtained by multiplying $f_s(t)$ by a value of the s-th column in $A^{S \to S}[u,s]$ (in this case, a matrix of one row and |S| columns as mentioned above) in each $f_s(t)$ and adding the results for all $f_s(t)$. Consequently, in each u, a solution of the equation (10) can be obtained as a numerical value.

The multiplication section 1060 receives the result of the transition probability calculating section 1040. Then, with reference to the event derivation model $A^{S \to E}$ (event derivation model working region 750), the multiplication section 1060 calculates $f_u(t+1)$ by using a recurrence equation (11) every above u.

[Equation 7]

$$f_u(t+1) = A^{S \to E}[e^a(t+1), u] \sum_{\{s|h_{S \to C}(s)=c(t)\}} A^{S \to S}[u, s] f_s(t) \qquad (11)$$

This probability $f_u(t+1)$ indicates an occurrence probability of a fault u at the time t+1, which can be obtained by giving an event e(t) and calculating in the order of time t from the time t=0. Here, since $A^{S \to E}[e^a(t+1),u]$, which is the event derivation model, is specified such that the row and the column are $e^a(t+1)$ and u, it is a numerical value. Consequently, in each u, $f_u(t+1)$ can be obtained as a numerical value.

The multiplication section 1060 stores the calculation result in the region $f_s(t)$ where the selector 1090 specifies. Here, in only $\{s \in S | f_{S \to C}(s)=c(t+1)\}$, the result is stored. In other regions, "0"s are stored.

The time adding section 1070 advances the value of the time counter 1080 by one, in response to the output of the multiplication section 1060, and finishes the process when the time counter 1080 becomes equal to or more than the maximum T of the time of the event working region 1120.

3(4). CONFIGURATION OF EXTENDED BACKWARD CALCULATING SECTION

Figure 6:
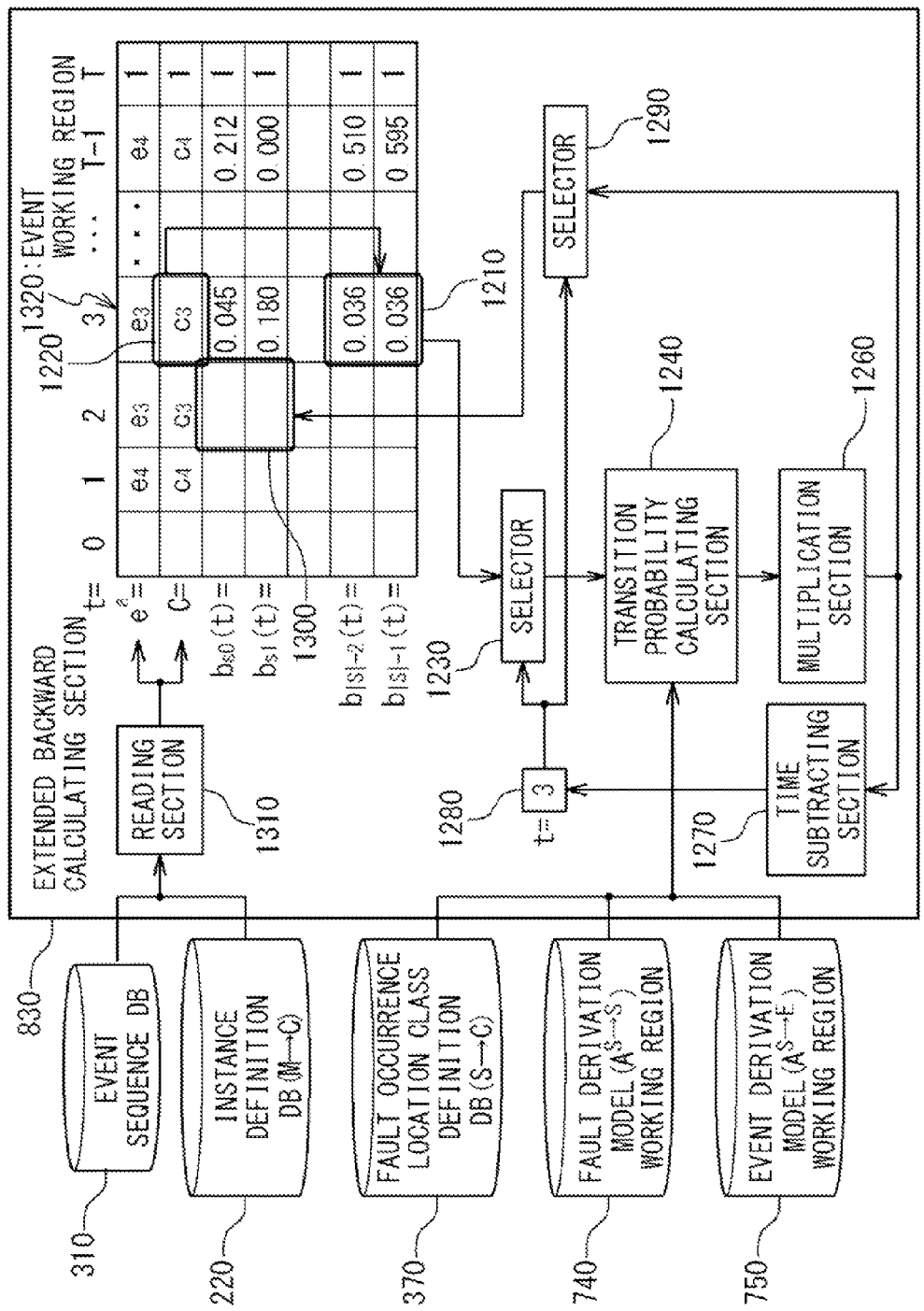
FIG. 6 is a block diagram showing a configuration of an extended backward calculating section according to the exemplary embodiment of the present invention.

Next, a configuration of the extended backward calculating section according to the exemplary embodiment of the present invention will be described. FIG. 6 is a block diagram showing a configuration of an extended backward calculating section according to the exemplary embodiment of the present invention. The extended backward calculating section 830 includes a reading section 1310, an event working region 1320, a selector 1230, a transition probability calculating section 1240, a multiplication section 1260, a time subtracting section 1270, a counter 1280 and a selector 1290.

The event working region 1320 has a region $e^a$ storing an event e(t) for analysis, a region C storing a class c(t) of an event occurrence device and a region $b_s(t)$ storing a probability $b_s(t)$ which is probability that a state of a fault is s at the time t when the event e(t) is given, in each time t. Here, information stored in the region $e^a$ is also referred to as $e^a$. As described later, information is stored in each region according to an operation of the extended backward calculating section 830.

Here, in $b_{s0}(t)$ to $b_{|S|-1}(t)$ as $b_s(t)$, s0 to |S|−1 indicate faults (states) $s_0$ to $s_{|S|-1}$. These faults (states) $s_0$ to $s_{|S|-1}$ are given from the fault derivation model $A^{S \to S}$. As an initial setting, for example, $b_{s0}(T)$ to $b_{|S|-1}(T)=1$ are stored.

The reading section 1310 reads an event sequence (e(t), t=0, . . . , T) from the event sequence DB 310 and stores the event e(t) in the region $e^a$ of the event working region 1320 in each time t. In addition, with reference to the instance definition DB 220, the reading section 1310 obtains a class c(t) of an event occurrence device m(t) and stores it in the region C of the event working region 1120 in each time t.

The selector 1230 extracts $b_s(t)$, $e^a(t-1)$, c(t), c(t-1) in the event working region 1320 based on the time t indicated by the time counter 1280 and outputs them. The time counter 1280 stores, for example, t=T as an initial setting. Here, $b_s(t)$ is a value of $b_s(t)$ which has the same class c(t) as that of the event occurrence device, and is extracted from $b_{s0}(t)$ to $b_{|S|-}$ $i(t)$ (a vector with |S| number of elements) at the time t. That is, $b_s(t)$ corresponds to the fault s satisfying $s \in S | h_{S \to C}(s) = c(t)$. Consequently, only $b_s(t)$ which has extremely high possibility can be substantially narrowed from $b_{s0}(t)$ to $b_{|S|-1}(t)$. As a result, as compared with a case that all values of $b_{s0}(t)$ to $b_{|S|-1}(t)$ are extracted and the later calculations are carried out on them, the calculation amount can be dramatically reduced.

The transition probability calculating section 1240 receives $b_s(t)$, $e^a(t-1)$, $c(t)$, $c(t-1)$. Then, with reference to the fault occurrence location class definition (the fault occurrence location class definition DB 370), the fault derivation model $A^{S \to S}$ (the fault derivation model working region 740) and the event derivation model $A^{S \to E}$ (the event derivation model working region 750), the transition probability calculating section 1240 calculates a following equation (12) in each fault $u \in \{s \in S | h_{S \to C}(s) = c(t-1)\}$. Here, the fault u is selected from a plurality of faults s (faults that the device class $c(t-1)$ can take) each related to a class $c(t-1)$ of a device $m(t-1)$ by a corresponding relationship $h_{S \to C}: S \to C$. The equation (12) is calculated for each of the plurality of faults s.

[Equation 8]

$$\sum_{\{s|h_{S \to C}(s)=c(t)\}} A^{S \to S}[s, u] b_s(t) \quad (12)$$

This value indicates an occurrence probability $b_u(t-1)$ of a fault u at the time t−1, which can be obtained by calculating in the reverse order of time t from the time t=T (end time). Here, since $A^{S \to S}[s,u]$, which is the fault derivation model (a matrix of |S| rows and |S| columns), is calculated every u (every column), it is handled as a matrix of |S| rows and one column every column. In addition, $b_s(t)$ is a numerical value. Σ is a result obtained by multiplying $b_s(t)$ by a value of the s-th row in $A^{S \to S}[s,u]$ (in this case, a matrix of |S| rows and one column as mentioned above) in each $b_s(t)$ and adding the results for all $b_s(t)$. Consequently, in each u, a solution of the equation (12) can be obtained as a numerical value.

The multiplication section 1260 receives the result of the transition probability calculating section 1240. Then, with reference to the event derivation model $A^{S \to E}$ (event derivation model working region 750), the multiplication section 1260 calculates $b_u(t-1)$ by using a recurrence equation (13) every above u.

[Equation 9]

$$b_u(t-1) = A^{S \to E}[e^a(t-1), u] \sum_{\{s|h_{S \to C}(s)=c(t)\}} A^{S \to S}[s, u] b_s(t) \quad (13)$$

This probability $b_u(t-1)$ indicates an occurrence probability of a fault u at the time t−1, which can be obtained by giving an event $e(t)$ and calculating in the reverse order of time t from the time t=T (end time). Here, since $A^{S \to E}[e^a(t-1),u]$, which is the event derivation model, is specified such that the row and the column are $e^a(t-1)$ and u, it is a numerical value. Consequently, in each u, $b_u(t-1)$ can be obtained as a numerical value.

The multiplication section 1260 stores the calculation result in the region $b_s(t)$ where the selector 1290 specifies. Here, in only $\{s \in S | b_{S \to C}(s) = c(t-1)\}$, the result is stored. In other regions, "0"s are stored.

The time adding section 1270 advances the value of the time counter 1280 by one, in response to the output of the multiplication section 1260, and finishes the process when the time counter 1280 becomes equal to or less than 0.

4. CONFIGURATION OF INSTANCE DERIVATION PROBABILITY CALCULATING SECTION

Figure 7:
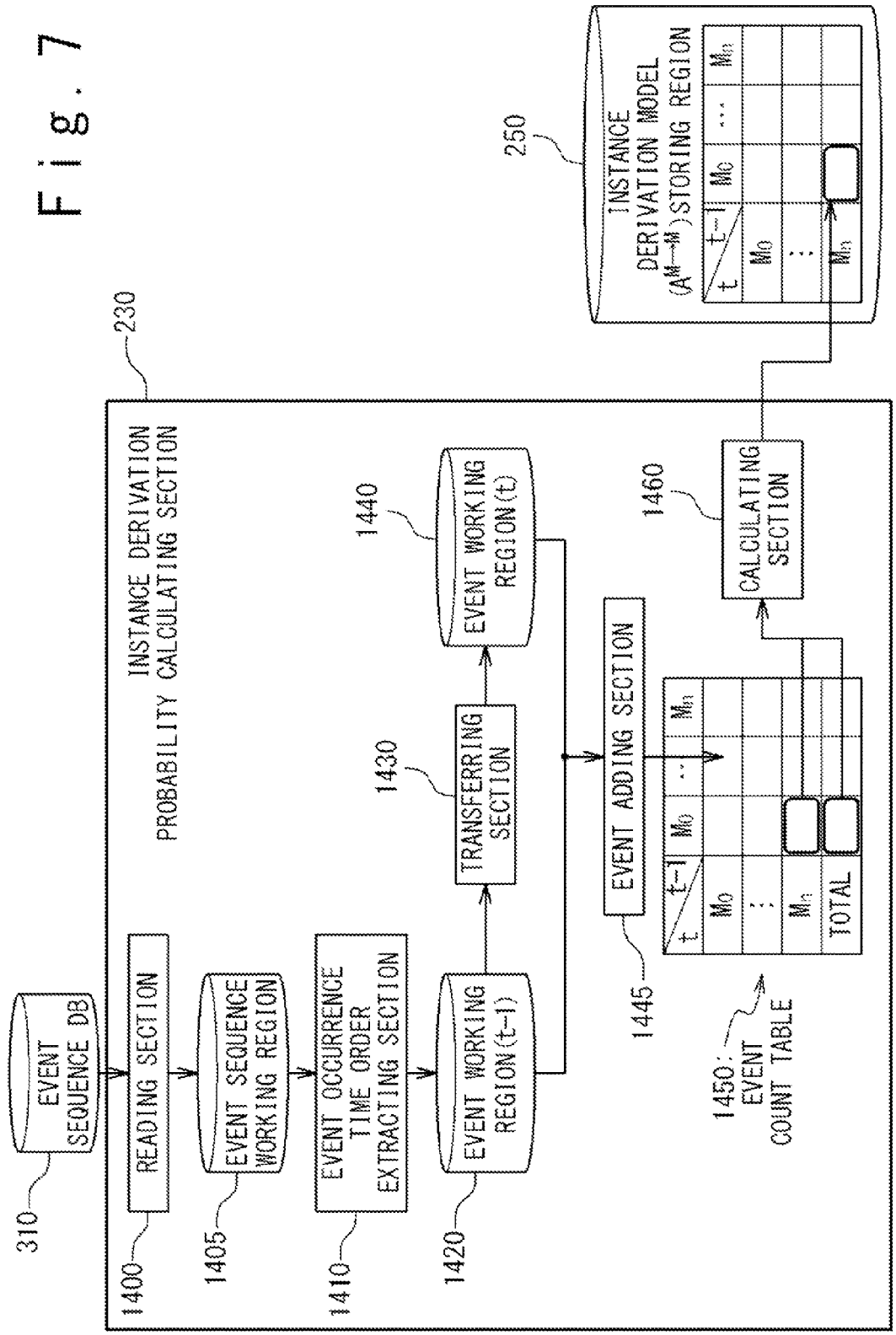
FIG. 7 is a block diagram showing a configuration of an instance derivation probability calculating section according to the exemplary embodiment of the present invention.

Next, a configuration of the instance derivation probability calculating section according to the exemplary embodiment of the present invention will be described. FIG. 7 is a block diagram showing the configuration of the instance derivation probability calculating section according to the exemplary embodiment of the present invention. The instance derivation probability calculating section 230 includes a reading section 1400, an event sequence working region 1405, an event occurrence time order extracting section 1410, an event working region 1420, a transferring section 1430, an event working region 1440, an event count table 1450 and a calculating section 1460.

The reading section 1400 reads an event sequence ($e(t)$, t=0, . . . , T) from the event sequence DB 310 and stores it in the event sequence working region 1405 in each time t.

The event occurrence time order extracting section 1410 extracts events (t) within a specified time range in the events (0 stored in the event sequence working region 1405 and store them in the event working region (t−1) 1420.

The transferring section 1430 transfers the events (t) stored in the event working region (t−1) 1420 to the event working region (t) 1440.

The event adding section 1445 acquires occurrence locations $M_t(=m(t))$ and $M_{t-1}(=m(t-1))$ of events $e_t(=e(t))$ and $e_{t-1}(=e(t-1))$ stored in the event working region (t) 1440 and the event working region (t−1) 1420, respectively. Then, the event adding section 1445 increases counts of the entries of the event count table 1450. In each entry, when an event occurs in the occurrence location $M_{t-1}$, at the time t−1, if any event occurs in the occurrence location $M_t$ at the time t, "1" is added in the location ($M_t$, $M_{t-1}$). In addition, at that time, total columns of the $M_{t-1}$ columns of the event count table 1450 are calculated if necessary.

Suppose that the number of occurrence times which is indicated by an entry ($M_i$, $M_j$) of the event count table 1450 is $c(M_i, M_j)$, the calculating section 1460 performs a following calculation. That is, the calculating section 1460 calculates an occurrence probability of $M_j$ under the situation that an event occurs in $M_i$, which can be obtained by dividing $c(M_i, M_j)$ by the total $\Sigma_t c(M_i, M_j)$ (the total column of the $M_{t-1}$ column). The calculating section 1460 stores it in ($M_i$, $M_j$) of the instance derivation model in the instance derivation model storing region 250.

5. OPERATION OF FAULT CAUSE ESTIMATING SYSTEM (FAULT CAUSE ESTIMATING METHOD AND FAULT CAUSE ESTIMATING PROGRAM)

Figure 8:
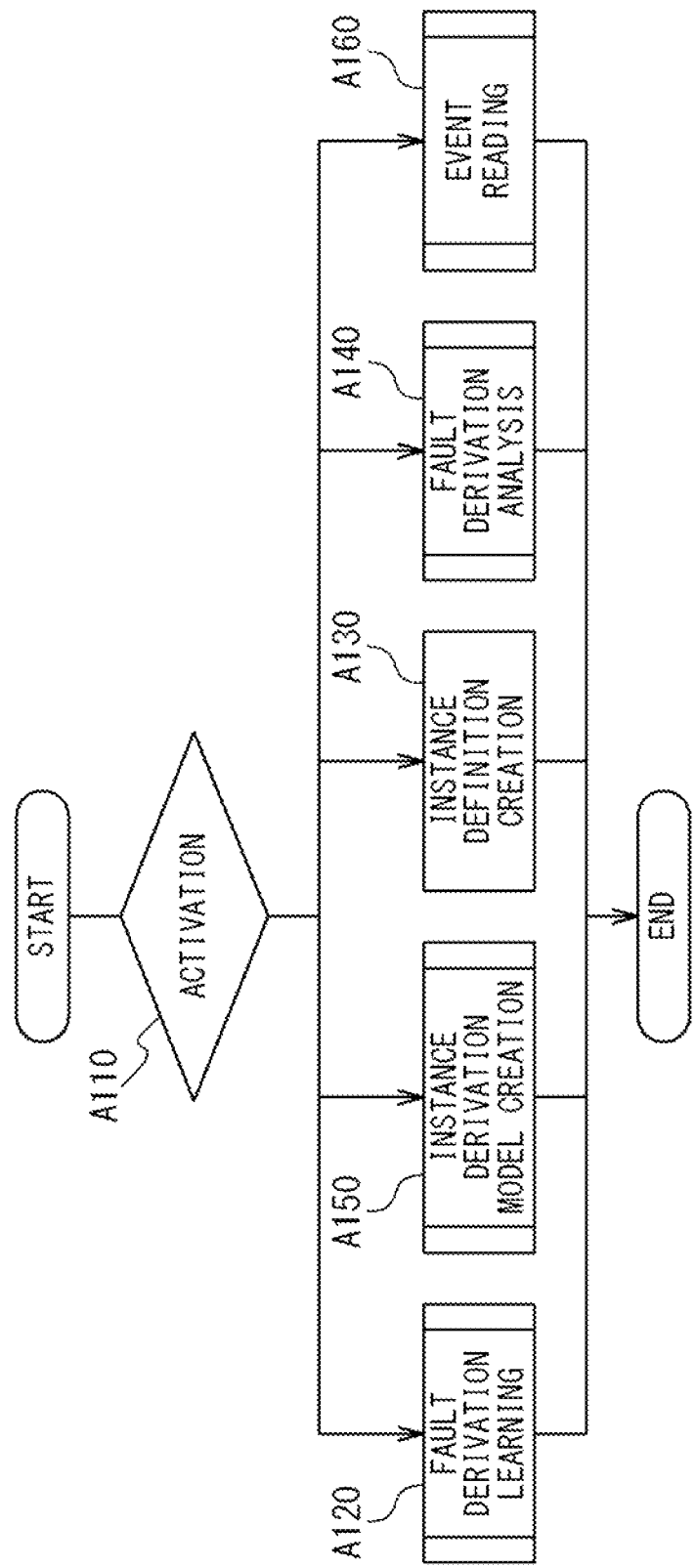
FIG. 8 is a flowchart showing an operation of the fault cause estimating system according to the exemplary embodiment of the present invention.

Next, an operation of the fault cause estimating system (fault cause estimating method and fault cause estimating program) according to the exemplary embodiment of the present invention will be described. FIG. 8 is a flowchart showing the operation of the fault cause estimating system (fault cause estimating method and fault cause estimating program) according to the exemplary embodiment of the present invention.

First, based on an input of a user, the fault cause estimating system selects a function to be activated (Step A110). That is, the fault cause estimating system selects one of a fault derivation learning function (Step A 120), an instance derivation learning function (Step A 150), a function of the configuration DB reading section 360 (Step A 130), a fault derivation analysis function (Step A140), and an event reading function (Step A160). Then, the fault cause estimating system carries out the selected process, and after that, the operation is finished. The fault cause estimating system may continuously select and carry out another function if necessary.

Here, the fault derivation learning function (Step A 120) is a process for creating a fault derivation model $A^{S \to S}$ and an event derivation model $A^{S \to E}$. The function of the instance derivation probability calculating section 230 (Step A150) is a process for creating an instance derivation model $A^{M \to M}$. The function of the configuration DB reading section 360 (Step A130) is a process for creating an instance definition. The fault derivation analysis function (Step A 140) is a process for analyzing a derivation relationship among the read event sequence to estimate a cause of the events. The event reading function (Step A 160) is a process for reading an event sequence which occurs in a managed object device 260.

Typically, the following procedure is considered. That is, first, one of the function of the configuration DB reading section 360 (Step A130) and the fault derivation learning function (Step A 120) is carried out. Then, the function of the instance derivation probability calculating section 230 (Step A 150), the event reading function (Step A 160) and the fault derivation analysis function (Step A 140) are carried out in this order. In this case, a step which has been already finished and a step which is not necessary to do may be skipped without being carried out. For example, if the function of the configuration DB reading section 360 (Step A130) has been already finished, or if the instance definition DB 220 has been already given, the procedure can skip the step A 130 and start from the fault derivation learning function (Step A 120). If the fault derivation model $A^{S \to S}$, the event derivation model $A^{S \to E}$ and the instance derivation model $A^{M \to M}$ have been already created, the procedure may start from the event reading function (Step A160). The order for carrying out the respective steps is not limited to the above example, and may be changed properly as long as technical contradiction does not occur.

6. OPERATION REGARDING FAULT DERIVATION LEARNING (STEP A120)

Figure 9:
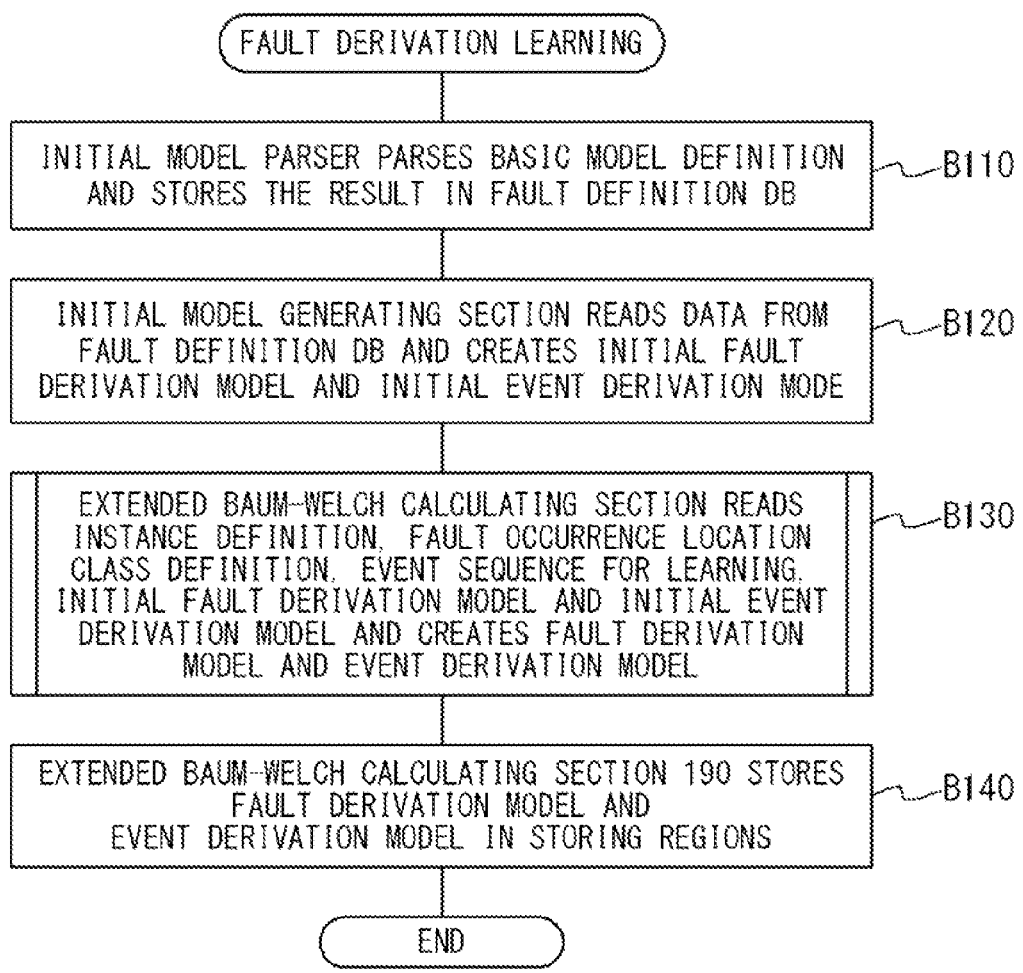
FIG. 9 is a flowchart showing an operation concerned with fault derivation learning included in the operation of the fault cause estimating system according to the exemplary embodiment of the present invention.

Next, an operation regarding the fault derivation learning in the operation of the fault cause estimating system according to the exemplary embodiment of the present invention will be described with reference to FIGS. 1 and 9. FIG. 9 is a flowchart showing the operation concerned with the fault derivation learning in the operation of the fault cause estimating system according to the exemplary embodiment of the present invention.

At first, the initial model parser 140 parses the basic model definition 130 and stores the result of the parsing in the fault definition DB 150 (Step B110). Next, the initial model generating section 160 reads data from the fault definition DB 150 and creates an initial fault derivation model $A^{S \to S}$ and an initial event derivation model $A^{S \to E}$ by using the equations (1) and (2). The initial model generating section 160 stores the initial fault derivation model $A^{S \to S}$ and the initial event derivation model $A^{S \to E}$ in the initial fault derivation model storing region 170 and the initial event derivation model storing region 180, respectively (Step B120).

After that, the extended Baum-Welch calculating section 190 reads the initial fault derivation model $A^{S \to S}$ and the initial event derivation model $A^{S \to E}$ in the initial fault derivation model storing region 170 and the initial event derivation model storing region 180, respectively. In addition, the extended Baum-Welch calculating section 190 reads an instance definition from the instance definition DB 220, reads a fault occurrence location class definition from the fault occurrence location class definition DB 370, and reads an event sequence for learning from the event sequence DB 310. Then, the extended Baum-Welch calculating section 190 applies the extended Baum-Welch algorithm according to the present invention in order to calculate a fault derivation model $A^{S \to S}$ and an event derivation model $A^{S \to E}$ (Step B130). The calculating method is described later. The extended Baum-Welch calculating section 190 stores the calculated the fault derivation model $A^{S \to S}$ and the event derivation model $A^{S \to E}$ in the fault derivation model storing region 200 and the event derivation model storing region 210, respectively (Step B140). After the above process is performed, the operation is finished.

Based on the present fault derivation learning, by applying the extended Baum-Welch algorithm according to the present invention to the initial fault derivation model $A^{S \to S}$ and the initial event derivation model $A^{S \to E}$ created from the basic model and the event sequence for learning, the fault derivation model $A^{S \to E}$ and the event derivation model $A^{S \to E}$ can be created (estimated). These fault derivation model $A^{S \to S}$ and the event derivation model $A^{S \to E}$ are applied as a part of the extended HMM according to the present invention for the extended Viterbi algorithm according to the present invention in the extended Viterbi calculating section 320 described later.

7. OPERATION REGARDING INSTANCE DERIVATION LEARNING (STEP A150)

Figure 10:
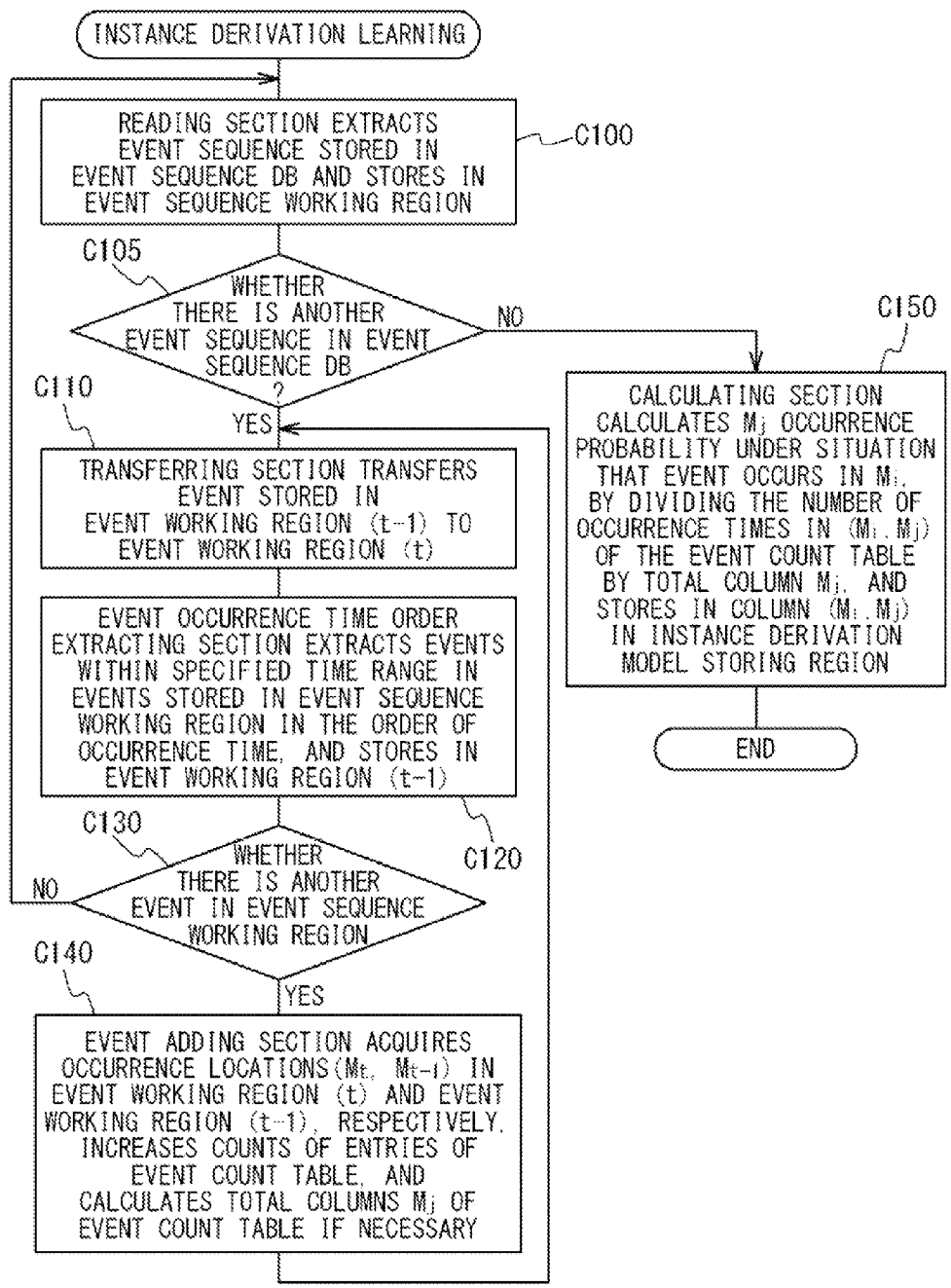
FIG. 10 is a flowchart showing an operation concerned with instance derivation learning included in the operation of the fault cause estimating system according to the exemplary embodiment of the present invention.

Next, an operation regarding the instance derivation learning in the operation of the fault cause estimating system according to the exemplary embodiment of the present invention will be described with reference to FIGS. 1 and 10. FIG. 10 is a flowchart showing the operation concerned with the instance derivation learning in the operation of the fault cause estimating system according to the exemplary embodiment of the present invention.

First, The instance derivation probability calculating section 230 applies the forward algorithm according to the present invention to create an instance derivation model $A^{M \to M}$. Specifically, the reading section 1400 extracts an event sequence stored in the event sequence DB 310 and stores it in the event sequence working region 1405 (Step C100). At that time, the reading section 1400 checks whether or not there is another event sequence in the event sequence DB 310 (Step C105).

If there is another event sequence in the event sequence DB 310 (Step C105: Yes), the following process is carried out.

First, transferring section 1430 transfers the event stored in the event working region (t−1) 1420 to the event working region (t) 1440 (Step C110). Next, the event occurrence time order extracting section 1410 extracts events within the specified time range in the events stored in the event sequence working region 1405 in the order of the occurrence time, and stores them in the event working region (t−1) 1420 (Step C120).

At that time, the event occurrence time order extracting section 1410 checks whether or not there is another event sequence in the event sequence working region 1405 (Step C130).

If there is another event sequence in the event sequence working region 1405 (Step C130: Yes), the following process is carried out.

First, the event adding section 1445 acquires occurrence locations($M_i$, $M_{t-1}$) in the event working region (t) 1440 and the event working region (t−1) 1420, respectively. Then, the event adding section 1445 increases counts of the entries of the event count table 1450. In addition, at that time, total columns of the event count table 1450 are calculated if necessary (Step C140).

If there is no event sequence in the event sequence working region 1405 (Step C130: No), in order to acquire a new event sequence, the procedure goes back to the step C110.

If there is no event sequence in the event sequence DB 310 (Step C105: No), the following process is carried out.

The calculating section 1460 calculates an occurrence probability of $M_j$ under the situation that an event occurs in $M_i$, which can be obtained by dividing the number of occurrence times indicated by an entry ($M_i,M_j$) of the event count table 1450 by the total value indicated at the total column $M_j$. The calculating section 1460 stores it in the column ($M_i,M_j$) of the instance derivation model in the instance derivation model storing region 250 (Step C150). After the above process is carried out, the operation is finished.

Based on the present instance derivation learning, by applying the forward algorithm according to the present invention to the event sequence for learning, the instance derivation model $A^{M \to M}$ can be created (estimated). This instance derivation model $A^{M \to M}$ is applied as a part of the extended HMM according to the present invention for the extended Viterbi algorithm according to the present invention in the extended Viterbi calculating section 320 described later.

8. OPERATION REGARDING EVENT READING (STEP A160)

Figure 11:
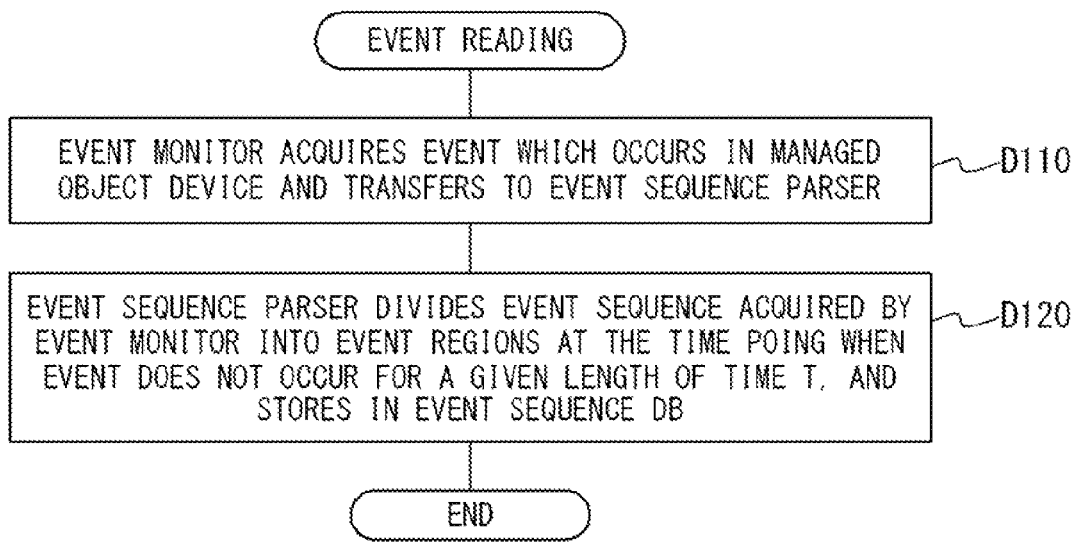
FIG. 11 is a flowchart showing an operation concerned with event reading included in the operation of the fault cause estimating system according to the exemplary embodiment of the present invention.

Next, an operation regarding the event reading in the operation of the fault cause estimating system according to the exemplary embodiment of the present invention will be described with reference to FIGS. 1 and 11. FIG. 11 is a flowchart showing the operation concerned with the event reading in the operation of the fault cause estimating system according to the exemplary embodiment of the present invention.

First, the event monitor 270 acquires an event which occurs in the managed object device 260 and transfers it to the event sequence parser 300 (Step D110). The event sequence is exemplified as an event sequence for leaning obtained during a test operation of the managed object device 260 and an event sequence obtained by the event monitor 270 during actually monitoring the managed object device 260. Next, the event sequence parser 300 divides the event sequence acquired by the event monitor, as described later (FIG. 18), into event sequences referred to as event regions at the time point when an event does not occur for a given length of time T, and then stores them in the event sequence DB 310 (Step D120). After the above process is carried out, the operation is finished.

Based on the present event reading, in the cased of reading the event sequence for learning, the event sequence for learning which is applied for the above fault derivation learning or the above instance derivation learning can be provided. In addition, in the case of reading the event sequence during monitoring, the fault derivation analysis described later can be carried out.

9. OPERATION REGARDING FAULT DERIVATION ANALYSIS (STEP A140)

Figure 12:
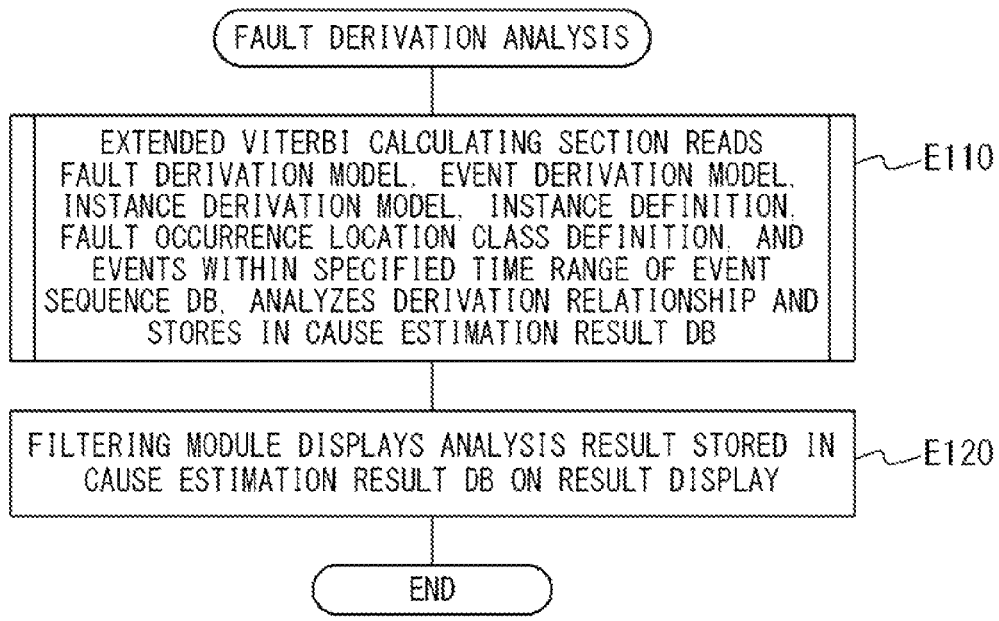
FIG. 12 is a flowchart showing an operation concerned with fault derivation analysis included in the operation of the fault cause estimating system according to the exemplary embodiment of the present invention.

Next, an operation regarding the fault derivation analysis in the operation of the fault cause estimating system according to the exemplary embodiment of the present invention will be described with reference to FIGS. 1 and 12. FIG. 12 is a flowchart showing the operation concerned with the fault derivation analysis in the operation of the fault cause estimating system according to the exemplary embodiment of the present invention.

The extended Viterbi calculating section 320 reads the fault derivation model $A^{S \to S}$ in the fault derivation model storing region 200, the event derivation model $A^{S \to E}$ in the event derivation model storing region 210 and the instance derivation model $A^{M \to M}$ in the instance derivation model storing region 250. In addition, the extended Viterbi calculating section 320 reads the instance definition in the instance definition DB 220, the fault occurrence location class definition in the fault occurrence location class definition DB 370 and the event sequence e(t) within the specified time range of the event sequence DB 310. Then, the extended Viterbi calculating section 320 analyzes the derivation relationship and calculates a fault occurrence sequence (s(t), (t=0, . . . , T)) and a probability $v_{s(t),m(t)}(t)$ of occurrence of the fault s(t) at the device m(t), for each time t. The calculated result is stored in the cause estimation result DB 330 (Step E110).

Next, the filtering module 335 displays the analysis result stored in the cause estimation result DB 330 on the result display section 340. In addition, the filtering module 335 divides the fault derivation sequence (s(t), (t=0, . . . , T)) under a predetermined condition (ex. divides it at a place with a transition probability lower than a certain probability). Then, the filtering module 335 extracts the sequence of the fault s, of which the total of the probabilities $v_{s(t),m(t)}(t)$ is high, from the divided plurality of fault derivation sequences as a likelihood derivation sequence. Then, the filtering module 335 estimates a start state of the extracted derivation sequence as a root cause (fault cause). The filtering module 335 further displays these analysis results on the result display section 340 (Step E120). Details of the method of calculating will be mentioned later. After the above process is carried out, the operation is finished.

Based on the fault derivation analysis, by applying the extended Viterbi algorithm to the fault derivation model $A^{S \to S}$, the event derivation model $A^{S \to E}$, the instance derivation model $A^{M \to M}$ and the observed event sequence (output sequence), the maximum likelihood path of the fault sequence (state sequence) can be estimated. Consequently, the fault cause of the managed object device 260 can be estimated.

10. OPERATION REGARDING EXTENDED VITERBI CALCULATING SECTION (DETAIL OF FAULT DERIVATION ANALYSIS)

Figure 13:
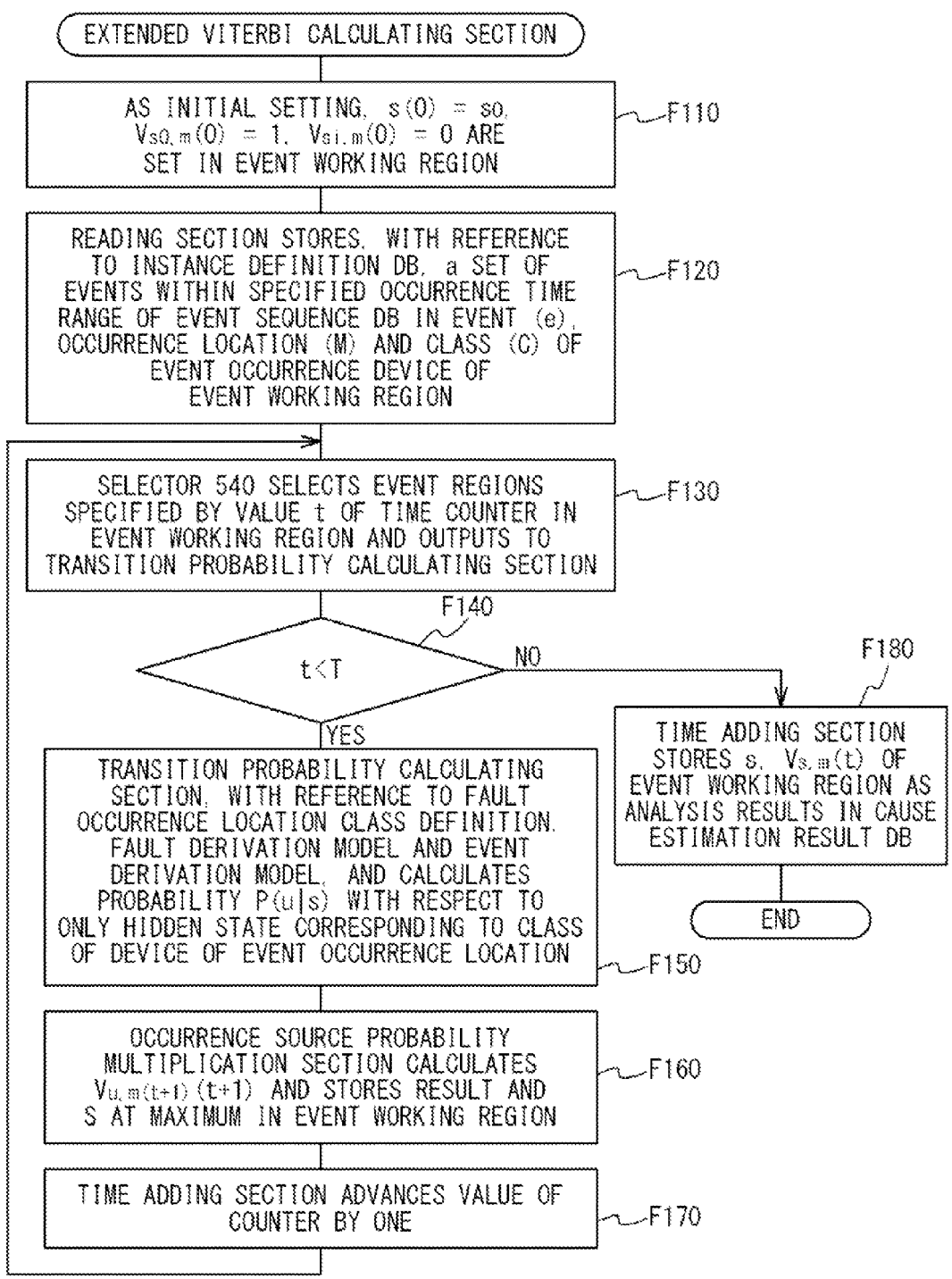
FIG. 13 is a flowchart showing an operation concerned with the extended Viterbi calculating section included in the operation of the fault cause estimating system according to the exemplary embodiment of the present invention.

Next, an operation regarding the extended Viterbi calculating section in the operation of the fault cause estimating system according to the exemplary embodiment of the present invention will be described with reference to FIGS. 2 and 13. FIG. 13 is a flowchart showing the operation concerned with the extended Viterbi calculating section in the operation of the fault cause estimating system according to the exemplary embodiment of the present invention.

First, as the initial setting, $s(0)=s_0$, $v_{0,m}(0)=1$, $v_{1,m}(0)$ to $v_{|S|-1,m}(0)=0$ are set in the event working region 510 (Step F110). Here, $s_0$ indicates a normal state. In addition, $s_t! = s_0$.

Next, the reading section 505 stores, with reference to the instance definition DB 220, a set of events within the specified occurrence time range in the event sequence DB 310 in the event ($e^a$), the occurrence location (M) and the class (C) of the event occurrence device in each time t (Step F120).

Next, the selector 540 selects the event regions specified by the value t of the time counter 590 in the event working region 510, and outputs them to the transition probability calculating section 530 (Step F130). Specifically, based on the time t, the selector 540 outputs the value of $v_{s,m}(t)$, $e^a(t+1)$, m(t), m(t+1), c(t), c(t+1). In the example of FIG. 2, the values in the regions 520 and 525 specified by the time=2, that is, $e^a(3)=e_3$, $m(2)=m_2$, $m(3)=m_3$, $c(2)=c_3$, $c(3)=c_5$, $v_{s,m}(2)=v_{|S|-2,m}(2)=0.4$ and $v_{|S|-1,m}(2)=0.8$ are output. Here, as $v_{s,m}(2)$, based on the class $c(2)=c_3$ of the occurrence device $m(2)=m_2$ of $e^a(2)=e_3$, $v_{|S|-2,m}(2)$ and $v_{|S|-1,m}(2)$ are selected from $v_{0,m}(2)$ to $v_{|S|-1,m}(2)$ as possible $v_{s,m}(2)$, and then they are output. The other $v_{s,m}(2)$ are set to "0". Consequently, as compared with a case that all values of $v_{0,m}(t)$ to $v_{|S|-1,m}(t)$ are extracted and a calculation as described later is performed using the all values, a calculation amount of this case can be dramatically reduced.

If the value t of the time counter 590 is less than the maximum time T of the event working region 510 (Step F140: Yes), the following process is carried out.

The transition probability calculating section 530 receives $e^a(t+1)$, m(t), m(t+1), c(t), c(t+1) and $v_{s,m}(t)$ as the inputs, with reference to the fault occurrence location class definition, the fault derivation model $A^{S \to S}$ and the event derivation model $A^{S \to E}$, and calculates a probability P(u|s) of the occurrence of the fault u at the time (t+1) with respect to only a hidden state corresponding to the class of the device of the event occurrence location, using the above equation (3) (Step F150). In the example of FIG. 2, the respective values are u=s(3), s=s(2), $v_{s,m}(2)=(0, 0, \ldots, 0.4, 0.8)$, and the equation (3) is as follows.

$$P(s(3) | s(2)) = A^{S \to E}[e^a(3), s(3)]\max_s \{A^{S \to S}[s(3), s(2)] \cdot v_{s,m}(2)\}$$
$$= A^{S \to E}[e_5, s(3)]\max_s \{A^{S \to S}[s(3), s(2)] \cdot (0, 0, \ldots, 0.4, 0.8)\}$$
$$= \alpha \times A^{S \to E}[e_5, s(3)]$$

Here, s(3) and s(2) are not yet determined and may be $s_0$ to $s_{|S|-1}$, here.

Consequently, P(u|s) can be obtained, which has the form (a vector with |S| number of elements) of $\alpha$ (constant)$\times A^{S \to E}[e^a(t+1),u]=\alpha \times A^{S \to E}[e_5,s(3)]$.

Next, the occurrence source probability multiplication section 570 receives P(u|s) as the input and calculates the probability $v_{u,m(t+1)}(t+1)$ which is a probability that the fault u in the device m(t+1) occurs, by using the above equation (4), with reference to the instance derivation model $A^{M+M}$. Here, it is assumed that a fault transition probability of each device and a fault transition probability of each fault kind are independent from each other. In the example of FIG. 2, the respective values are $m(2)=m_2$, $m(3)=m_3$ and the equation (4) is as follows.

$$v_{u,m(3)}(3) = A^{M \to M}[m(3), m(2)] \cdot P(s(3) | s(2))$$
$$= A^{M \to M}[m_3, m_2] \cdot \alpha \times A^{S \to E}[e_5, s(3)]$$
$$= \beta \times \alpha \times A^{S \to E}[e_5, s(3)]$$

Here, s(3) is shown above. Consequently, $v_{u,m(3)}(3)$ can be obtained, which has the form (a vector with |S| number of elements) of $\beta$ (constant)$\times$P(u|s).

The occurrence source probability multiplication section 570 detects $v_{u,m(t+1)}(t+1)$ and the fault s(t) in which the maximum of $v_{u,m(t+1)}(t+1)$ is taken. Then, the occurrence source probability multiplication section 570 stores the respective values in the regions specified by the selector 600 in the event working region 510 (Step F160). Here, it is only necessary for the faults u to be faults that the device class indicated by c(t+1) can take. In the example of FIG. 2, in the event working region 510, $v_{u,m(3)}(3)$ is stored in the region 535 specified by the selector 600, the s at which the value is the maximum in $v_{u,m(3)}(3)$ is stored in the region 536 as s(2).

Next, the time adding section 580 advances the value of the counter 590 by one (Step F170). Then, the procedure goes back to the step F130. As described above, by resolving the recurrence equations (3) and (4), $e^a$, s, $V_{s,m}(t)$ can be obtained for t=T.

If the value t of the time counter 590 is equal to or more than the maximum time T of the event working region 510 (Step F140: No), the time adding section 580 stores the results of $e^a$, s, $V_{s,m}(t)$ as the analysis results with respect to t=0 to T in the event working region 510 in the cause estimation result DB 330 while relating them with each other (Step F180). After above process is carried out, the operation is finished.

Based on the operation regarding the present extended Viterbi algorithm, the extended Viterbi calculating section 320 can estimate the derivation sequence (s(t), (t=0, . . . , T); state sequence) of the fault s, the occurrence probability ($v_{s(t),m(t)}(t)$, (t=0, . . . , T); state transition probability) of each fault s(t) in each time t. Consequently, the fault cause of the managed object device 260 can be estimated.

11(1). OPERATION REGARDING EXTENDED BAUM-WELCH CALCULATING SECTION (REGARDING FAULT DERIVATION LEARNING)

Figure 14A:
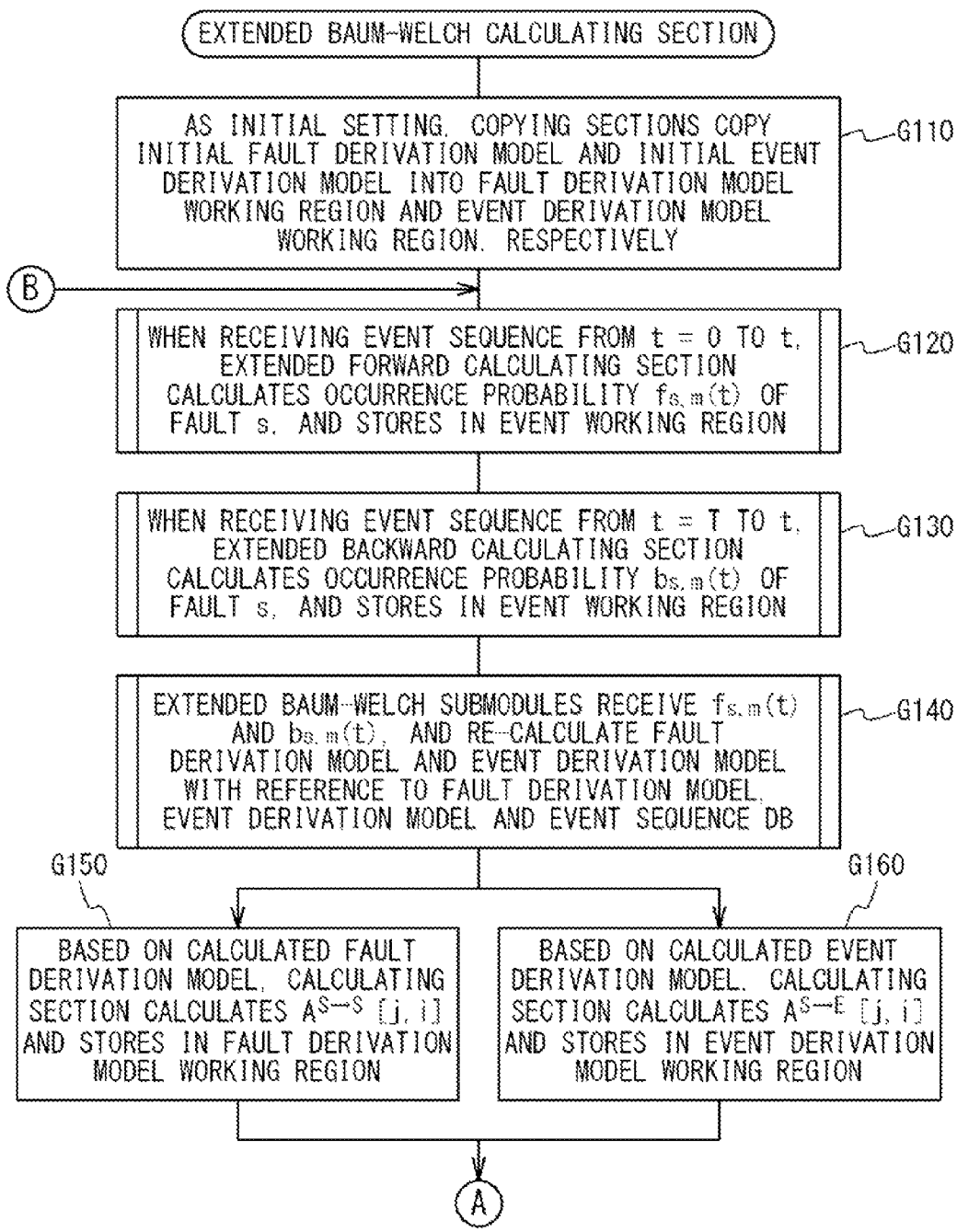
FIG. 14A is a flowchart showing an operation concerned with the extended Baum-Welch calculating section included in the operation of the fault cause estimating system according to the exemplary embodiment of the present invention.
Figure 14B:
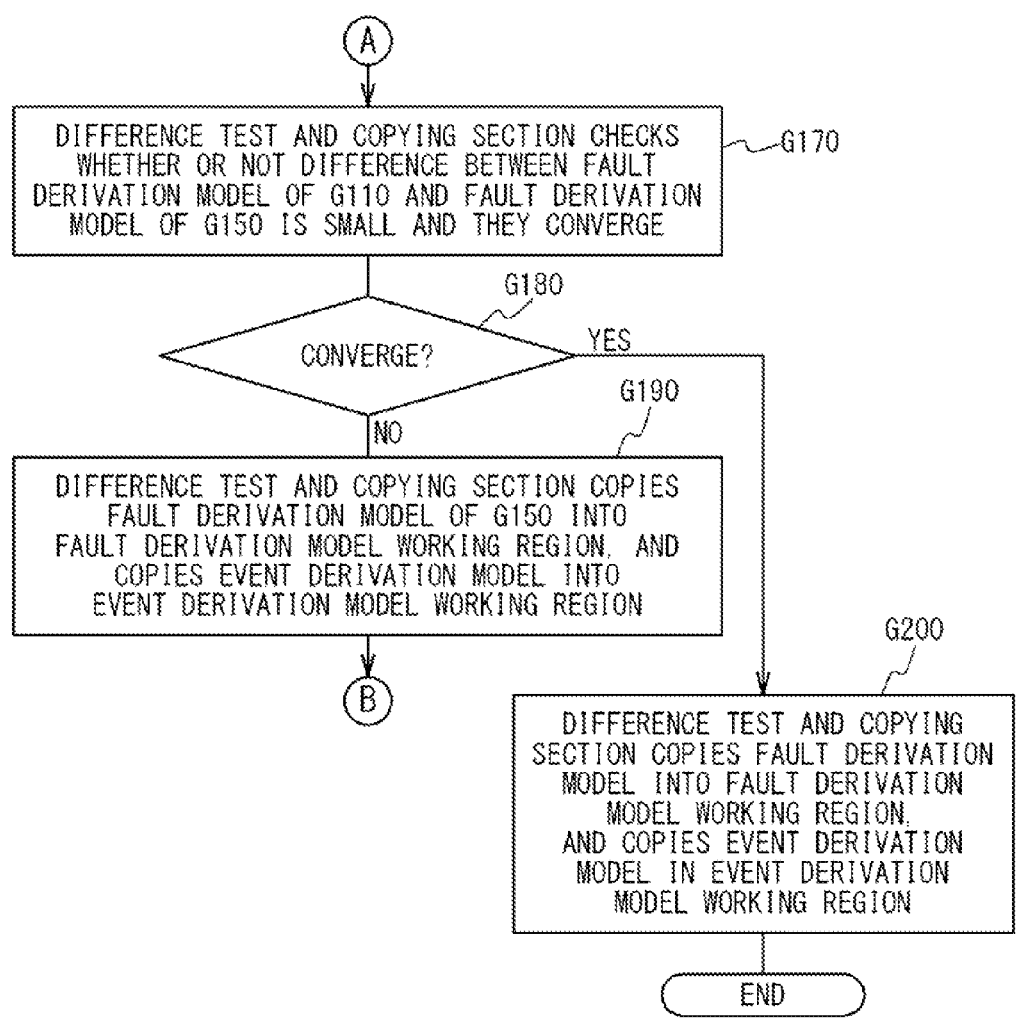
FIG. 14B is a flowchart showing the operation concerned with the extended Baum-Welch calculating section included in the operation of the fault cause estimating system according to the exemplary embodiment of the present invention.

Next, an operation regarding the extended Baum-Welch calculating section in the operation of the fault cause estimating system according to the exemplary embodiment of the present invention will be described with reference to FIGS. 3, 14A and 14B. FIGS. 14A and 14B are flowcharts showing the operation concerned with the extended Baum-Welch calculating section in the operation of the fault cause estimating system according to the exemplary embodiment of the present invention.

First, as the initial setting, the copying section 710 and the copying section 720 copy the initial fault derivation model storing region 170 and the initial event derivation model storing region 180 into the fault derivation model working region 740 and the event derivation model working region 750, respectively (Step G110).

Next, when receiving an event sequence from t=0 to t−1 stored in the event sequence DB 310, the extended forward calculating section 820 calculates an occurrence probability $f_{s,m}(t)$ of the fault s, with reference to the instance definition DB 220, the fault occurrence location class definition DB 370, the fault derivation model working region 740 and the event derivation model working region 750. Then, the extended forward calculating section 820 stores the calculated occurrence probability $f_{s,m}(t)$ of the fault s in the event working region 1120 inside the extended forward calculating section 820 (Step G120).

Next, when receiving an event sequence from t=T to t−1 stored in the event sequence DB 310, the extended backward calculating section 830 calculates an occurrence probability $b_{s,m}(t)$ of the fault s, with reference to the instance definition DB 220, the fault occurrence location class definition DB 370, the fault derivation model working region 740 and the event derivation model working region 750. Then, the extended backward calculating section 830 stores the calculated occurrence probability $b_{s,m}(t)$ of the fault s in the event working region 1320 inside the extended backward calculating section 830 (Step G130).

Next, the extended Baum-Welch submodules 770 receive $f_s(t)$ stored in the extended forward calculating section 820 and $b_s(t)$ stored in the extended backward calculating section 830. Then, with reference to the fault derivation model working region 740, the event derivation model working region 750 and the event sequence DB 310, the extended Baum-Welch submodules 770 calculate the fault derivation model $A^{S \to S}[j,i]$ and the event derivation model $A^{S \to E}[j,i]$ by using the above equations (8) and (9) (Step G140). The extended Baum-Welch submodules 770 store the fault derivation model $A^{S \to S}$ and the event derivation model $A^{S \to E}$ in the fault derivation model working region 780 and the event derivation model working region 840, respectively.

Next, based on the fault derivation model $A^{S \to S}[j,i]$ in the fault derivation model working region 780, the division calculating section 790 normalizes the fault derivation model $A^{S \to S}$ by using the above equation (5) and stores the normalized fault derivation model $A^{S \to S}$ in the fault derivation model working region 800 (Step G150).

In parallel, based on the event derivation model $A^{S \to E}[j,i]$ in the event derivation model working region 840, the division calculating section 850 normalizes the event derivation model $A^{S \to E}$ by using the equation (6) and stores the normalized event derivation model $A^{S \to E}$ in the event derivation model working region 860 (Step G160).

Next, the difference test and copying section 810 compares the fault derivation model $A^{S \to S}$ stored in the fault derivation model working region 800 with the fault derivation model $A^{S \to S}$ stored in the fault derivation model working region 740 to check whether or not the difference between them is small and they converge. Similarly, the difference test and copying section 810 compares the event derivation model $A^{S \to E}$ stored in the event derivation model working region 860 with the event derivation model $A^{S \to E}$ stored in the event derivation model working region 750 to check whether or not the difference between them is small and they converge (Step G170).

In any of the fault derivation model $A^{S \to S}$ and the event derivation model $A^{S \to E}$, if the difference is large (beyond a predetermined acceptable range) (Step G180: No), the difference test and copying section 810 copies the fault derivation model $A^{S \to S}$ stored in the fault derivation model working region 800 and the event derivation model $A^{S \to E}$ stored in the event derivation model working region 860 into the fault derivation model working region 740 and the event derivation model working region 750, respectively (Step G190). Then, the procedure goes back to the step G120.

In both of the fault derivation model $A^{S \to S}$ and the event derivation model $A^{S \to E}$, if the differences are sufficiently small (within the predetermined acceptable range) (Step G180: Yes), the difference test and copying section 810 judges that they converge to solutions to be obtained. The difference test and copying section 810 copies the fault derivation model $A^{S \to S}$ stored in the fault derivation model working region 800 and the event derivation model $A^{S \to E}$ stored in the fault derivation model working region 860 into the fault derivation model storing region 200 and the event derivation model storing region 210, respectively (Step G200). The above process is carried out and the operation is finished.

Based on the operation regarding the extended Baum-Welch calculating algorithm, the fault derivation model $A^{S \to S}$ and the event derivation model $A^{S \to E}$ used for the above extended Viterbi algorithm can be created.

11(2) OPERATION REGARDING THE EXTENDED BAUM-WELCH SUBMODULE

Figure 15A:
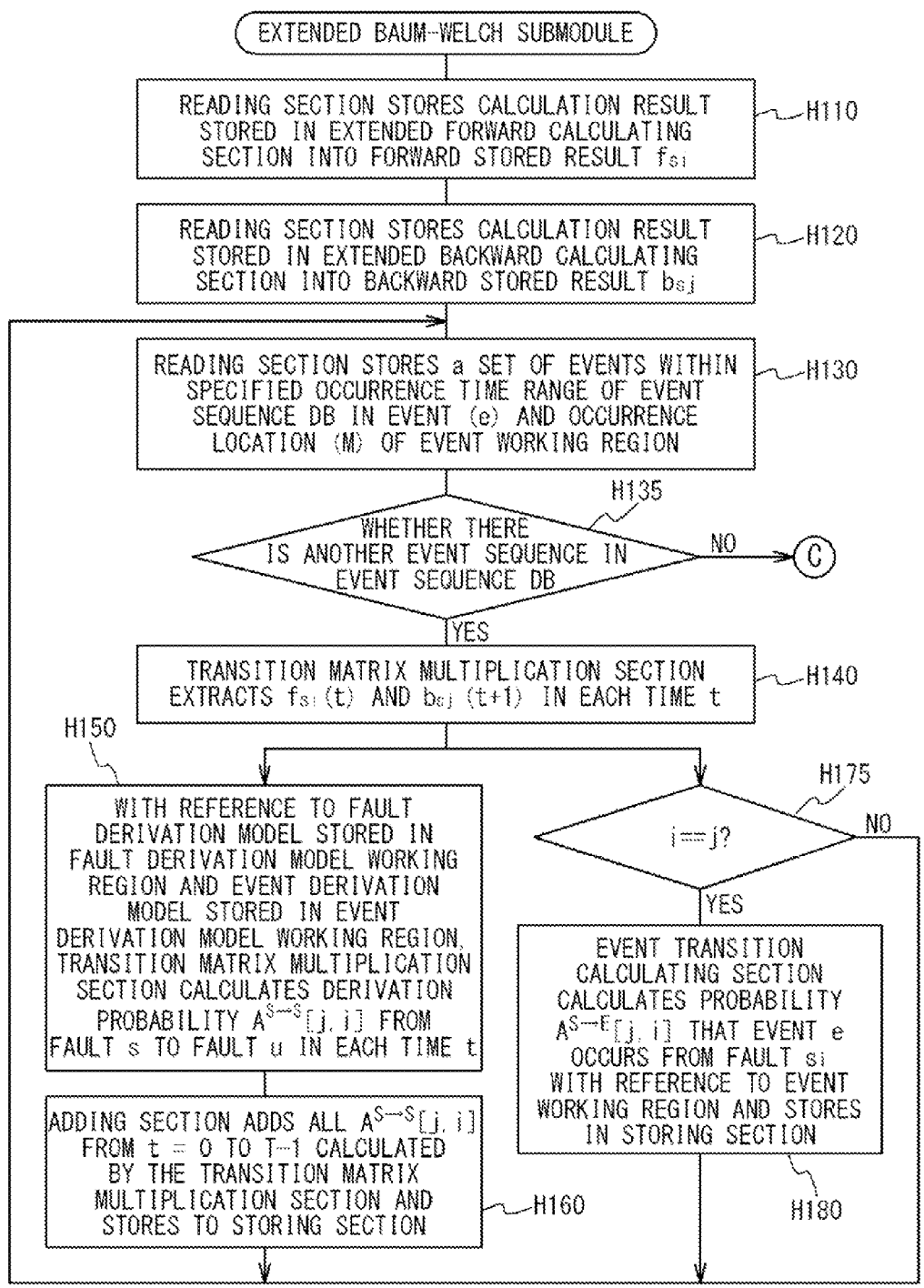
FIG. 15A is a flowchart showing an operation concerned with an extended Baum-Welch submodule included in the operation of the fault cause estimating system according to the exemplary embodiment of the present invention.
Figure 15B:
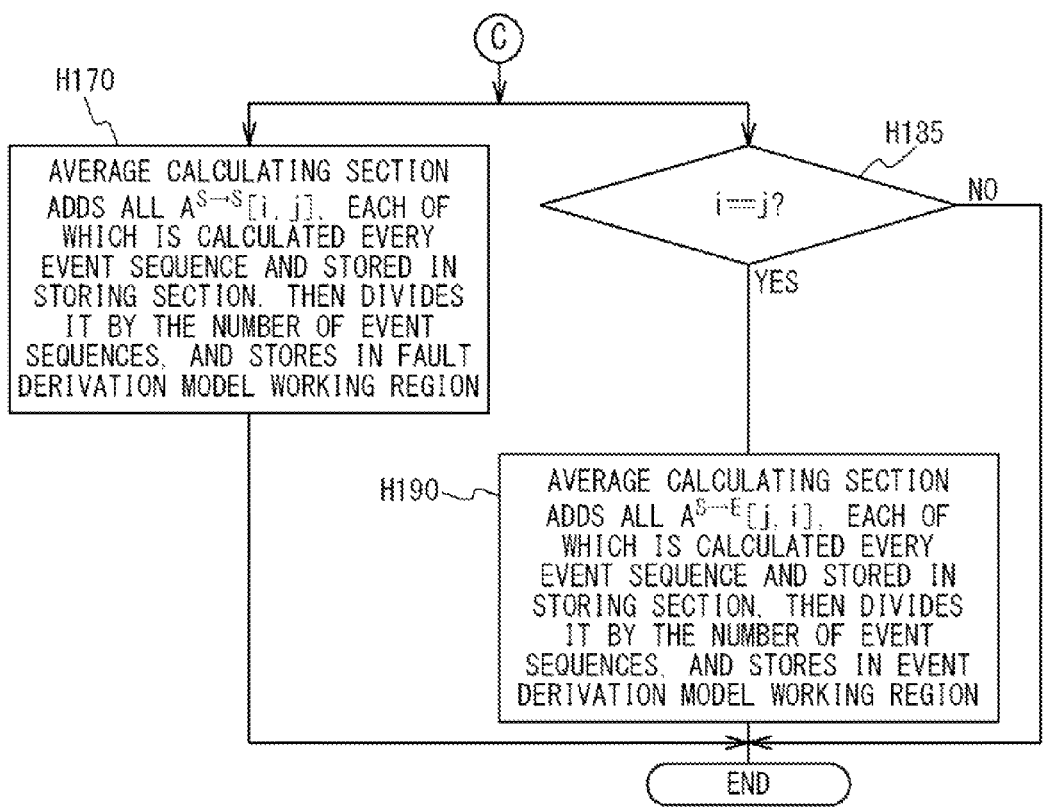
FIG. 15B is a flowchart showing the operation concerned with the extended Baum-Welch submodule included in the operation of the fault cause estimating system according to the exemplary embodiment of the present invention.

Next, an operation regarding the extended Baum-Welch submodule B[j,i] in the operation of the fault cause estimating system according to the exemplary embodiment of the present invention will be described with reference to FIGS. 4, 15A and 15B. FIGS. 15A and 15B are flowcharts showing the operation concerned with the extended Baum-Welch submodule B[j,i] in the operation of the fault cause estimating system according to the exemplary embodiment of the present invention.

The reading section 900 stores the calculation result stored in the extended forward calculating section 820 in the forward stored result $f_{si}(t)$ (Step H110). Similarly, the reading section 900 stores the calculation result stored in the extended backward calculating section 830 in the backward stored result $b_{sj}(t)$ (Step H120).

Next, the reading section 900 stores a set of events within the specified occurrence time range of the event sequence DB 310 in the event ($e^a$) and the occurrence location (M) of the event working region 910 (Step H130).

Next, the reading section 900 checks whether or not there is another event sequence in the event sequence DB 310 when storing the step H130 (Step H135).

If there is the other event sequence (Step H135: Yes), the following process is carried out.

The transition matrix multiplication section 920 extracts $f_{si}(t)$ and $b_{sj}(t+1)$ of the event working region 910 (Step H140). Then, with reference to the fault derivation model $A^{S \to S}[j,i]$ stored in the fault derivation model working region 740 and the event derivation model $A^{S \to E}[e^a(t),i]$ stored in the event derivation model working region 750, the transition matrix multiplication section 920 calculates a derivation probability $A^{S \to S}[j,i](t)$ from the fault si to the fault sj in each time t, with respect to all t=0 to T−1, by using the above equation (7) (Step H150).

Next, the adding section 930 adds all $A^{S \to S}[j,i](t)$ from t=0 to T−1 calculated by the transition matrix multiplication section 920 by using the above equation (8) and stores it to the storing section 935 (Step H160).

In parallel to the steps H150 and H160, following steps H175 and H180 are carried out. That is, first, B[j,i] is checked whether or not i==j is true (B[j,i] is a diagonal element) (Step H175).

If i!=j (B[j,i] is not a diagonal element) (Step H175: No), the step H180 is skipped.

If i==j (B[0] is a diagonal element) (Step H175: Yes), the step H180 is carried out. In the case of i==j, the event transition calculating section 950 calculates a probability $A^{S \to E}[j,i]$ that an event $e_j$ occurs by the fault $s_i$ by using the above equation (9), with reference to the event working region 910 and stores the result in the storing section 955 (Step H180). After the steps H160, H175 and H180 are finished, the procedure goes back to the step H130.

When the reading section 900 storing the step H130, if there is no event sequence in the event sequence DB 310 (Step H135: No), the average calculating section 940 adds all $A^{S \to S}$[i,j], each of which is calculated every event sequence, stored in the storing section 935, and then divides it by the number of the event sequences to average it. After that, the average calculating section 940 stores it in the fault derivation model working region 780 (Step H170).

In parallel to the step H170, following steps H185 is carried out. That is, first, B[j,i] is checked whether or not i==j is true (B[j,i] is a diagonal element) (Step H185).

If i!=j (B[j,i] is not a diagonal element) (Step H185: No), the step H190 is skipped.

If i==j (B[j,i] is a diagonal element) (Step H185: Yes), the step H190 is carried out. In the case of i=j, average calculating section 960 adds all $A^{S \to E}[j,i]$, each of which is calculated every event sequence, stored in the storing section 955, and then divides it by the number of the event sequences to average it. After that, the average calculating section 960 stores it in the event derivation model working region 840 (Step H190).

11(3). OPERATION REGARDING EXTENDED FORWARD CALCULATING SECTION

Figure 16:
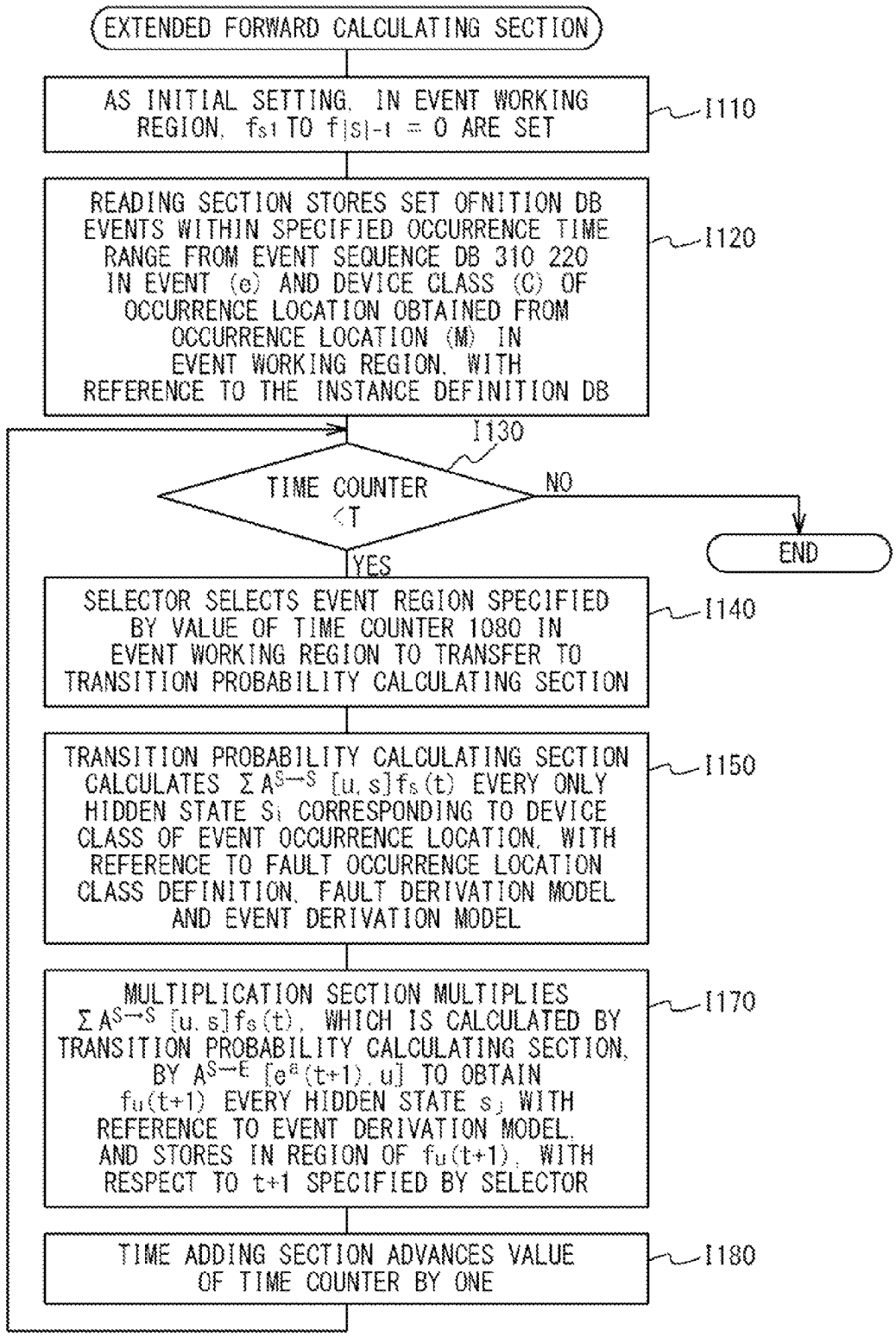
FIG. 16 is a flowchart showing an operation concerned with the extended forward calculating section included in the operation of the fault cause estimating system according to the exemplary embodiment of the present invention.

Next, an operation regarding the extended forward calculating section in the operation of the fault cause estimating system according to the exemplary embodiment of the present invention will be described with reference to FIGS. 5 and 16. FIG. 16 is a flowchart showing the operation concerned with the extended forward calculating section included in the operation of the fault cause estimating system according to the exemplary embodiment of the present invention.

First, as the initial setting, in the event working region 1120, $f_{s0}(0)=1$, $f_{s1}(0)$ to $f_{|S|-1}(0)=0$ are substituted (Step I110).

Next, the reading section 1110 reads the set of events within the specified occurrence time range from the event sequence DB 310. Then, with reference to the instance definition DB 220, the reading section 1110 stores the read set of events in the event ($e^a$) and the device class (C) of the event occurrence location obtained from the occurrence location (M) in the event working region 1120 in each time (t) (Step I120).

Next, the time counter 1080 checks whether or not the time is smaller than the maximum time T of the event sequence (Step I130).

If the time of the time counter 1080 is smaller than the maximum time T of the event sequence (Step I130: Yes), a following process is carried out.

First, the selector 1030 selects the event region specified by the value of the time counter 1080 in the event working region 1110 to transfer to the transition probability calculating section 1040 (Step I140). Particularly, the selector 1030 selects $e^a(t+1)$, c(t), c(t+1), $f_s(t)$ (here, which corresponds to the fault s occurring at the same class of c(t) in $f_{s0}(t)$ to $f_{|S|-1}(0)$) to output to the transition probability calculating section 1040. In the example of FIG. 5, $e^a(3)=e_3$, $c(2)=c_3$, $c(3)=c_3$, $f_s(2)=f_{|S|-2}(2)=s_6$ and $f_{|S|-1}(2)=s_6$ specified by the time t=2 are output. Here, the selector 1030 extracts $f_{|S|-2}(2)$ and $f_{|S|-1}(2)$ (region 1010) as the possible $f_s(2)$ from $f_{s0}(2)$ to $f_{|S|-1}(2)$ based on the class of $c(2)=c_3$ (region 1020) of the occurrence device of $e(2)=e_3$ and outputs them. As a result, as compared with extracting all values of $f_{s0}(t)$ to $f_{|S|-1}(t)$ and performing the later calculation, the calculation amount can be sufficiently reduced.

The transition probability calculating section 1040 calculates $\Sigma A^{S \to S}[u,s]f_s(t)$ every only hidden state u corresponding to the device class of the event occurrence location, with reference to the fault occurrence location class definition (the fault occurrence location class definition DB 370), the fault derivation model $A^{S \to S}$ (the fault derivation model working region 740) and the event derivation model $A^{S \to E}$ (the event derivation model working region 750) (Step I150). Particularly, in each fault $u \in \{s \in S | hS \to C(s) = c(t+1)\}$, the above equation (10) is calculated. In the example of FIG. 5, in the case of $c(2)=c_3$ of the fault u, if faults related to it are |S|−2 and |S|−1, because of $f_{|S|-2}(2)=s_6$ and $f_{|S|-1}(2)=s_6$, the equation (10) is as follows, resulting in a numerical value.

$$\Sigma_s A^{S \to S}[u,s]f_s(2)=[u,|S|-2] \times f_{|S|-2}(2)+[u,|S|-1] \times f_{|S|-1} \quad (2)$$

Next, the multiplication section 1060 multiplies $\Sigma A^{S \to S}[u,s]f_s(t)$, which is calculated by the transition probability calculating section 1040, by $A^{S \to E}[e^a(t+1),u]$ to obtain $f_u(t+1)$ every hidden state u with reference to the event derivation model $A^{S \to E}$ (event derivation model working region 750). Here, it is not necessary to calculate it for the hidden state u which does not satisfy the C(t+1). Particularly, the multiplication section 1060 receives the calculation result of the transition probability calculating section 1040 and calculates the above-mentioned recurrence equation (11) with reference to the event derivation model $A^{S \to E}$. In the example of FIG. 5, for a certain fault u, the equation is as follows, resulting in a numerical value.

$$f_u(t+1)=A^{S \to E}[e(3),u] \cdot ([u,|S|-2] \times f_{|S|-2}(2)+[u,|S|-1] \times f_{|S|-1}(2))$$

Then, the multiplication section 1060 stores the calculation result in the region of $f_u(t+1)$, with respect to t+1 specified by the selector 1090 (Step I170). Here, in only $\{s \in S | f_{S \to C}(s)=c(t+1)\}$, the calculation result is stored. Particularly, if the faults related to $c(3)=c_3$ are s0 and s1, in the only region 1200 which is the region of $f_s(3)$ specified by the selector 1090 and which stores the related $f_{s0}(3)$ and $f_{s1}(3)$, the multiplication section 1060 stores the calculation results of $f_{s0}(3)$ and $f_{s1}(3)$.

Next, the time adding section 1070 advances the value of the time counter 1080 by one, in response to the output of the multiplication section 1060 (Step I180). Then, the procedure goes back to the step 1130.

If the time of the time counter 1080 is equal to or larger than the maximum time T of the event sequence (Step I130: No), the process is finished. Here, $f_s(t)$ (t=0 to T−1) obtained according to this, that is, each of $f_{s0}(t)$ to $f_{|S|-1}(t)$ (t=0 to T−1) is output as $f_{si}(t)$ (t=0 to T−1, i=0 to |S|−1)) to the extended Baum-Welch submodule set 770.

11(4). OPERATION REGARDING EXTENDED BACKWARD CALCULATING SECTION

Figure 17:
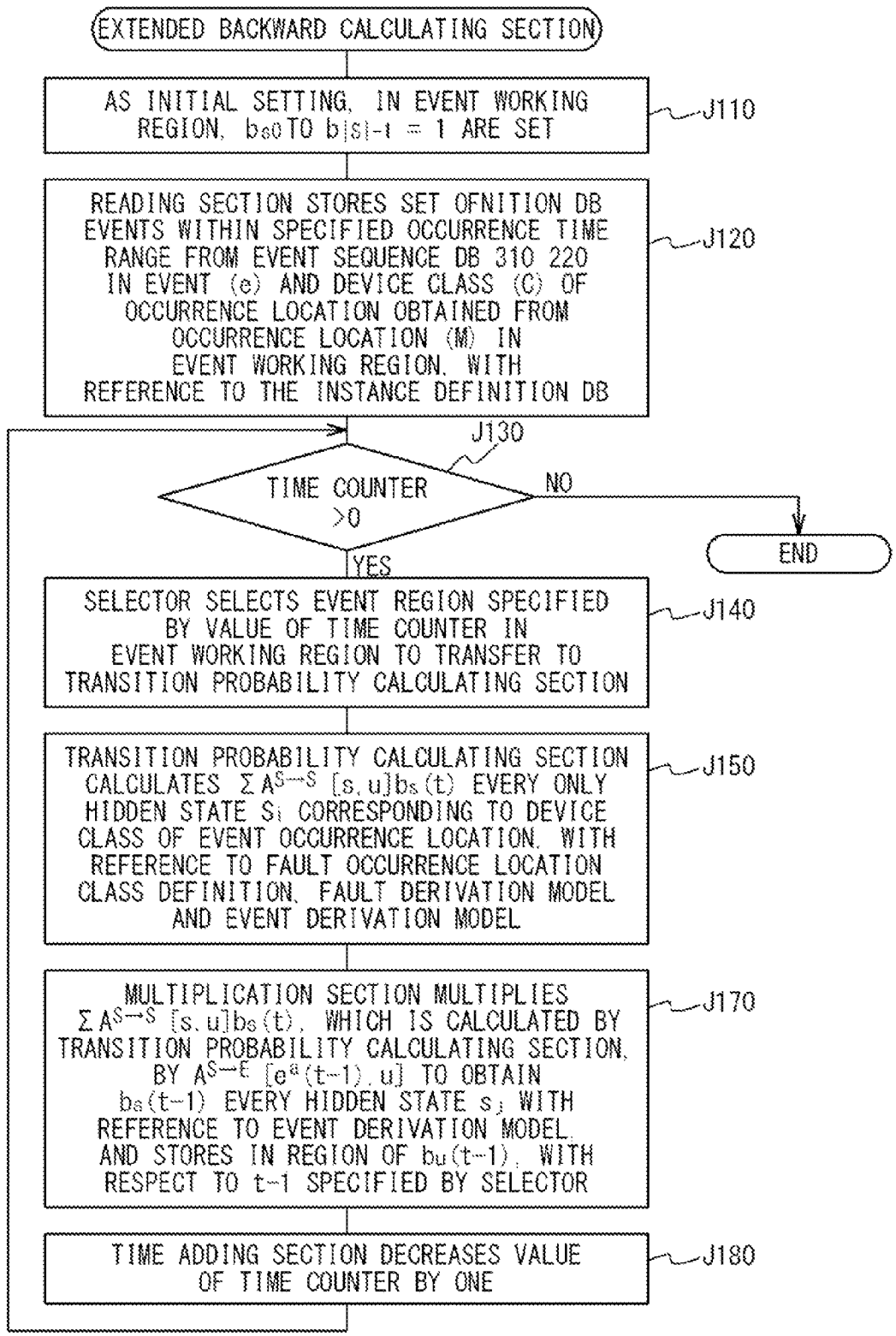
FIG. 17 is a flowchart showing an operation concerned with the extended backward calculating section included in the operation of the fault cause estimating system according to the exemplary embodiment of the present invention.

Next, an operation regarding the extended backward calculating section in the operation of the fault cause estimating system according to the exemplary embodiment of the present invention will be described with reference to FIGS. 6 and 17. FIG. 17 is a flowchart showing the operation concerned with the extended backward calculating section included in the operation of the fault cause estimating system according to the exemplary embodiment of the present invention.

First, as the initial setting, in the event working region 1320, $b_{s0}(T)$ to =1 are substituted (Step J110).

Next, the reading section 1310 reads the set of events within the specified occurrence time range from the event sequence DB 310. Then, with reference to the instance definition DB 220, the reading section 1310 stores the read set of events in the event ($e^a$) and the device class (C) of the event occurrence location obtained from the occurrence location (M) in the event working region 1320 in each time (t) (Step J120).

Next, the time counter 1280 checks whether or not the time is larger than 0 (Step J130).

If the time of the time counter 1280 is larger than 0 (Step J130: Yes), a following process is carried out.

First, the selector 1230 selects the event region specified by the value of the time counter 1280 in the event working region 1310 to transfer to the transition probability calculating section 1240 (Step J140). Particularly, the selector 1230 selects $e^a(t-1)$, $c(t)$, $c(t-1)$, $b_s(t)$ (here, which corresponds to the fault s occurring at the same class of $c(t)$ in $b_{s0}(t)$ to $b_{|S|-1}(0)$ to output to the transition probability calculating section 1240. In the example of FIG. 6, $e^a(3)=e_3$, $c(3)=c_3$, $c(2)=c_3$, $b_s(3)=b_{|S|-2}(3)=s_6$ and $b_{|S|-1}(3)=s_6$ specified by the time t=3 are output. Here, the selector 1230 extracts $b_{|S|-2}(3)$ and $b_{|S|-1}(3)$ (region 1210) as the possible $b_s(3)$ from $b_{s0}(3)$ to $b_{|S|-1}(3)$ based on the class of $c(3)=c_3$ (region 1220) of the occurrence device of $e(3)=e_3$ and outputs them. As a result, as compared with extracting all values of $b_{s0}(t)$ to $b_{|S|-1}(t)$ and performing the later calculation, the calculation amount can be sufficiently reduced.

Next, the transition probability calculating section 1240 calculates $\Sigma A^{S \to S}[s,u]b_s(t)$ every only hidden state u corresponding to the device class of the event occurrence location, with reference to the fault occurrence location class definition (the fault occurrence location class definition DB 370), the fault derivation model $A^{S \to S}$ (the fault derivation model working region 740) and the event derivation model $A^{S \to E}$ (the event derivation model working region 750) (Step J150). Particularly, in each of the fault $u \in \{s \in S | h_{S \to C}(s)=c(t-1)\}$, the above equation (12) is calculated. In the example of FIG. 6, in the case of $c(3)=c_3$ of the fault u, if faults related to it are $|S|-2$ and $|S|-1$, because of $b_{|S|-2}(3)=s_6$ and $b_{|S|-1}(3)=s_6$, the equation (12) is as follows, resulting in a numerical value.

$$\Sigma_s A^{S \to S}[s,u]b_s(3)=[|S|-2,u] \times b_{|S|-2}(3)+[|S|-1,u] \times b_{|S|-1}(3)$$

Next, the multiplication section 1260 multiplies $\Sigma A^{S \to S}[s,u]b_s(t)$, which is calculated by the transition probability calculating section 1240, by $A^{S \to E}[e^a(t-1),u]$ to obtain $b_u(t-1)$ every hidden state u with reference to the event derivation model $A^{S \to E}$ (event derivation model working region 750). Here, it is not necessary to calculate it for the hidden state u which does not satisfy the $C(t-1)$. Particularly, the multiplication section 1260 receives the calculation result of the transition probability calculating section 1240 and calculates the above-mentioned recurrence equation (13) with reference to the event derivation model $A^{S \to E}$. In the example of FIG. 6, for a certain fault u, the equation is as follows, resulting in a numerical value.

$$b_u(t-1)=A^{S \to E}[e(2),u] \cdot ([|S|-2,u] \times b_{|S|-2}(3)+[|S|-1,u] \times b_{|S|-1}(3))$$

Then, the multiplication section 1260 stores the calculation result in the region of $b_u(t-1)$ with respect to t−1 specified by the selector 1290 (Step J170). Here, in only $\{s \in S | b_{S \to C}(s)=c(t-1)\}$, the calculation result is stored. Particularly, if the faults related to $c(2)=c_3$ are s0 and s1, in the only region 1300 which is the region of $b_s(2)$ specified by the selector 1290 and which stores the related $b_{s0}(2)$ and $b_{s1}(2)$, the multiplication section 1260 stores the calculation results $b_{s0}(2)$ and $b_{s1}(2)$.

Next, the time adding section 1270 decreases the value of the time counter 1280 by one, in response to the output of the multiplication section 1260 (Step J180). Then, the procedure goes back to the step J180.

If the time of the time counter 1280 is equal to or less than 0 (Step J130: No), the process is finished. Here, $b_s(t)$ (t=1 to T) obtained according to this, that is, each of $b_{s0}(t)$ to $b_{|S|-1}(t)$ (t=1 to T) is output as $b_{sj}(t)$(t=1 to T, j=0 to $|S|-1$)) to the extended Baum-Welch submodule set 770.

Incidentally, even though the extended Baum-Welch calculating section is used in the above exemplary embodiment, the present invention is not limited to that example. For example, the extended Baum-Welch calculating section may be replaced by a general Baum-Welch calculating section which is disclosed in, for example; Frederick Jelinek, "Statistical Methods for Speech Recognition (Language, Speech, and Communication)", Section 9.3; and the patent literature 3. Even in this case, the effects which are the same as those of the above exemplary embodiment can be obtained.

12. OPERATION OF EVENT SEQUENCE PARSER

FIG. 18 is a view showing an operation of the event sequence parser of the fault cause estimating system according to the exemplary embodiment of the present invention.

The event sequence parser 300 divides the acquired event sequence under a predetermined condition to be a plurality of event sequences. This figure shows the situation of the division of the event sequence. The event sequence parser 300 divides the event sequence if an event occurrence interval is longer than the predetermined time T0. Particularly, for example, when there is an event sequence (e(0), ..., e(t)), if the time interval between the occurrence time of the event e(i) and the occurrence time of the event e(i+1) is longer than the predetermined time T0, the event sequence parser 300 divides the event sequence (e(0), ..., e(t)) into an event region R0 (e(0), ..., e(i)), an event region R1 (e(i+1), ..., e(j)), an event region R1 (e(j+1), ..., e(k)) and the like. This means that the event occurrence interval in the event region is equal to or shorter than the threshold value T0 and the event occurrence interval between the event regions is longer than the threshold value T0. Here, the event e(i) is not an event type (event class) but an event itself. Regarding the event sequence for learning, one event region is used for the event sequence for learning, and the learning is carried out, of which number of times is equal to the number of event regions.

13. PRINCIPLE OF CAUSE ESTIMATION OF EXTENDED VITERBI ALGORITHM

Figure 19:
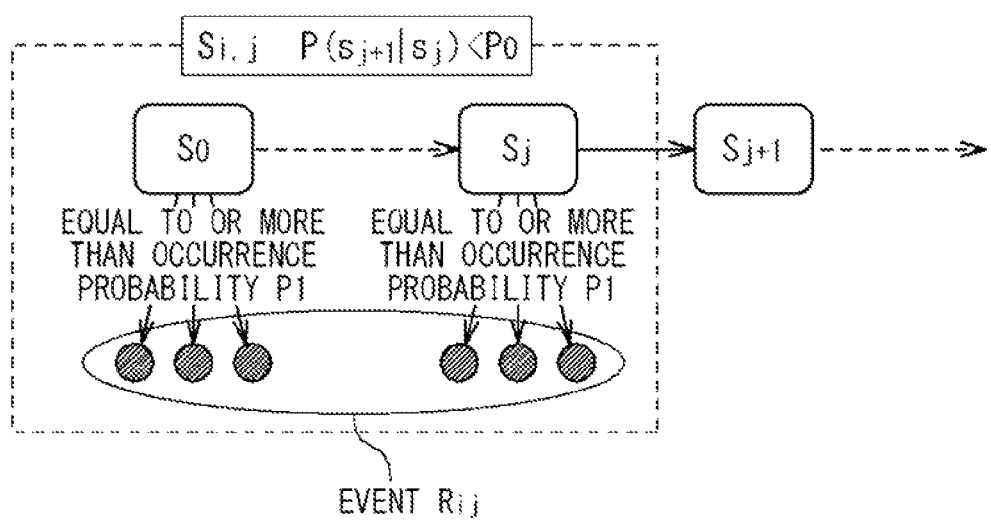
FIG. 19 is a view showing an operation of a filtering module of the fault cause estimating system according to the exemplary embodiment of the present invention.

FIG. 19 is a view showing a principle of cause estimation of the extended Viterbi calculating section of the fault cause estimating system according to the exemplary embodiment of the present invention.

The principle for estimating the fault cause from the event sequence obtained in the actual operation of the managed object device 260 is shown below.

First, the event sequence is divided into event regions Ri (by the event sequence parser 300).

Then, by applying an event region Ri to the model created (by the extended Baum-Welch calculating section 190) based on the learning, a hidden state sequence, which has the highest transition probability, $S_i=(s_i)=\mathrm{argmax}_{\{si\}}\mathrm{Pr}(Ri)$ can be obtained (by the extended Viterbi calculating section 320).

Next, $S_i$ is divided into $S_{i,j}$ at positions of transitions s, each of which a probability is low ($<P_0$). That is, $S_i$ is divided into $S_{i,1}, S_{i,2}, \ldots, S_{i,j}, \ldots$. Here, in the above-obtained $S_i=(s_0, \ldots, s_k)$, $\mathrm{Pr}(s_{k+1}|s_k)>P_0$ and $s_k \in S_{i,j} \Rightarrow s_{k+1} \in S_{i,j}$ are satisfied.

Next, in $S_{i,j}=(s_0, \ldots, s_n)$, only elements with the event occurrence probability P1 or more are deemed to be event correlation objects $E_{i,j}$. Here, $e \in R_i$ and $s \in S_{i,j}$ and $Pr(e|S_{i,j}) > P1 \Rightarrow e \in R_{i,j}$ are satisfied. At this time, the set of $R_{i,j}$ and the set of sequences $S_{i,j}$ are created. Then, $s_0$ in the sequence $S_{i,j} = (s_0, \ldots, s_n)$ is deemed to be a root cause (fault cause) and $R_{i,j}$ is deemed to be a set of the events derived from the $s_0$ (by the filtering module 335).

14. EXAMPLE

Next, the exemplary embodiment of the present invention will be described with a specific example.

14(1). CONFIGURATION

Figure 20:
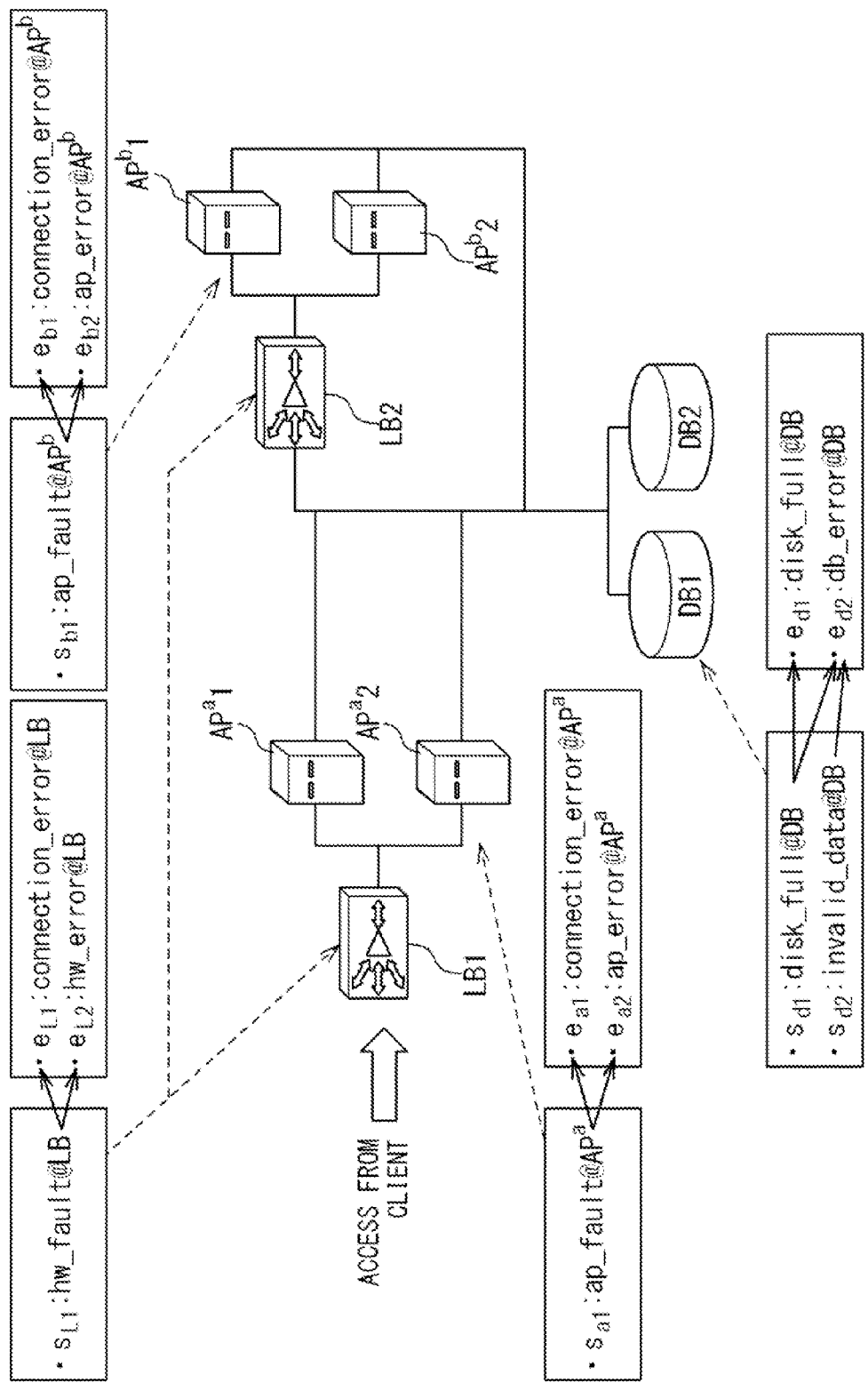
FIG. 20 is a block diagram showing a configuration of a managed object device of a fault cause estimating system according to an example of the present invention.

FIG. 20 is a block diagram showing a configuration of a managed object device (system) of the fault cause estimating system according to an example of the present invention.

An LB1 is a load balancer and allocates requests from a client to application servers AP$^a$1 and AP$^a$2.

An LB2 is a load balancer and allocates requests from the application servers AP$^a$1 and AP$^a$2 to application servers AP$^b$1 and AP$^b$2 which performs sup processes.

The application servers AP$^a$1 and AP$^a$2 provide services based on user requests.

The application servers AP$^b$1 and AP$^b$2 provide services based on user requests.

Databases DB1 and DB2 are duplicated databases such as RAID0. The databases DB1 and DB2 respond to reading and writing requests from the application servers AP$^a$1, AP$^a$2, AP$^b$1 and AP$^b$2.

Events occurring in each device type will be described.

Suppose that the following two kinds of events occur in the load balancer LB.
    connection_error@LB($e_{1,1}$)
    hw_error@LB($e_{1,2}$)

Suppose that the following two kinds of events occur in the application servers AP$^a$.
    connection_error@AP$^a$($e_{a1}$)
    ap_error@AP$^a$($e_{a2}$)

Suppose that the following two kinds of events occur in the application servers AP$^b$.
    connection_error@AP$^b$($e_{b1}$)
    ap_error@AP$^b$($e_{b1}$)

Suppose that the following two kinds of events occur in the database DB.
    disk_full@DB($e_{d1}$)
    db_error@DB($e_{d2}$)

Faults occurring in each device class will be described.

Suppose that the following fault occurs in the load balancer LB.
    hw_fault@LB($s_{L1}$)

Suppose that the following fault occurs in the application servers AP$^a$.
    ap_fault@AP$^a$($s_{a1}$)

Suppose that the following fault occurs in the application servers AP$^b$.
    ap_fault@AP$^b$($s_{b1}$)

Suppose that the following faults occur in the database DB.
    disk_full@DB($s_{d1}$)
    invalid_data@DB($s_{d2}$)

In addition, it is known that these faults cause the following events.
    hw_fault@LB($s_{L1}$)
        connection_error@LB($e_L$))
        hw_error@LB($e_{L2}$)
    ap_fault@AP$^a$($s_{a1}$)
        connection_error@AP$^a$($e_{a1}$)
        ap_error@AP$^a$($e_{a2}$)
    a_fault@AP$^b$($s_{b1}$)
        connection_error@AP$^b$($e_{b1}$)
        ap_error@AP$^b$($e_{b2}$)
    disk_full@DB($s_{d1}$)
        disk_full@DB($e_{d1}$)
        db_error@DB($e_{d2}$)
    invalid_data@DB($s_{d2}$)
        db_error@DB($e_{d2}$)

FIG. 21 is a view showing a basic model definition of the fault cause estimating system according to the exemplary embodiment of the present invention. In this figure, the above faults are described as the basic model definition. The basic model definition is described, for example, as the text file shown in this figure. The paragraph starting from [states] defines a set S of fault causes. Here, five fault causes (ex.: "ap_fault@AP$^a$") are defined, and each of them is related to an occurrence device class (ex.: "AP$^b$"). The paragraph starting from [observations] defines a set E of events. Here, event names (ex.: "connection_error@AP$^a$") are defined, and each of them is related to an occurrence cause (ex.: "ap_fault@AP$^a$").

14(2). OPERATION

Next, an operation of the specific example regarding the procedure of the fault derivation learning as the step A 120 of FIG. 8 will be described.

The initial model parser 140 parses the basic model definition 130 of FIG. 21 and stores the result of the parsing in the fault definition DB 150 (Step B 110 in FIG. 9).

Here, an example of the result to be stored in the fault definition DB 150 is shown in FIG. 27, and an example of the result to be stored in the fault occurrence location class definition database (DB) 370 is shown in FIG. 28.

Next, the initial model generating section 160 reads data from the fault definition DB 150 and creates an initial fault derivation model and an initial event derivation model to store in the initial fault derivation model storing region 170 and the initial event derivation model storing region 180, respectively (Step B120 in FIG. 9).

An example of the initial fault derivation model of the present example is shown in FIG. 22, and an example of the initial event derivation model of the present example is shown in FIG. 23. That is, in FIG. 22, the initial setting of the transition probability that a fault (S) derives from a fault (S) is described in the table. In FIG. 23, the initial setting of the transition probability that an event (E) derives from a fault (S) is described in the table. Here, "e" indicates an event, "s" indicates a fault, a suffix "0" indicates a normal state, a suffix "a1" indicates "AP$^a$1", a suffix "a2" indicates "AP$^a$2", a suffix "b1" indicates "AP$^b$1", a suffix "b2" indicates "AP$^b$2", a suffix "L1" indicates "LB1", a suffix "L2" indicates "LB2", a suffix "d1" indicates "DB1", a suffix "d2" indicates "DB2". These symbols are the same those in FIGS. 22 to 28.

Next, the extended Baum-Welch calculating section 190 reads the initial fault derivation model and the initial event derivation model in the initial fault derivation model storing region 170 and the initial event derivation model storing region 180, respectively. Then, the extended Baum-Welch calculating section 190 creates an fault derivation model and an event derivation model to store in the fault derivation model storing region 200 and the event derivation model storing region 210, respectively (Step B130 in FIG. 130).

An example of the fault derivation model in the present example is shown in FIG. 24, and an example of the event derivation model in the present example is shown in FIG. 25. That is, in FIG. 24, the transition probability that a fault (S) derives from a fault (S) is described in the table. In FIG. 25, the transition probability that an event (E) derives from a fault (S) is described in the table.

Next, with respect to the above example, an example of the instance derivation model, which is the result of the instance derivation probability calculating section 230 at the step A150 in FIG. 8, is shown in FIG. 26. Based on the procedure of FIG. 10, the time order of the occurrence devices of the events is recorded and the proportion is indicated by using the transition probability matrix $A^{M \to M}$ as shown in FIG. 26.

That is, in FIG. 26, the transition probability that when an event (including a state of no-fault) occurs in an device, the event derives to an device is indicated in the table.

Next, with respect to the above example, an example of the instance definition indicated at the step A130 in FIG. 8 is shown in FIG. 29.

That is, in FIG. 29, the relationship between the device (M) and the class (class, C) is indicated.

Next, with respect to the above example, an operation of the example of the procedure of the fault learning at the step A140 in FIG. 8 will be described.

Here, suppose that the db_error@DB($e_{d2}$) occurs in the DB1, and then, the connection_error@$AP^a$($e_{a1}$) occurs in the $AP^a2$. At this time, the result of the step E110 in FIG. 12, namely, the result in FIG. 30 can be obtained. As shown in the row s, the transition relationship is analyzed that the fault is made transition from $s_{d2}$ to $s_{a1}$. In this case, the transition probability is 0.02%. If this probability is higher than the threshold $P_0$, the transition relationship from $s_{d2}$ to $s_{a1}$ can be estimated. That is, it turns out that the invalid_data@DB occurring in the DB1 is made transition to the ap_fault@$AP^a$ occurring in the $AP^a2$ and that the root cause is the invalid_data@DB occurring in the DB1. This is interpreted as meaning that the application operating in the $AP^a2$ cannot access the database because of the data error in the DB and this causes the occurrence of the connection_error@$AP^a$.

FIG. 31 is a view showing an example of a display result at the display result section of the fault cause estimating system according to the example of the present invention. In the display screen 340a of the display result section 340, the analysis content of the "40th Event Region" 341 in a plurality of event regions is displayed. That is, as the dependent fault cause chain (cause→derivation cause) 342, the state=thread_error 343 as the fault state and the events 344 derived from it, and the state=My_SQL_is_stopped 345 as the fault state and the events 346 derived from it, are shown, respectively.

In the above exemplary embodiment, the extended Baum-Welch calculating section estimates the transition relationship of the fault cause based on the event sequence as similar to the patent literature 3. Consequently, for the fault of which the transition relationship of the fault is un-known, the occurrence probability of the fault which is made transition can be calculated and the fault cause analysis can be performed. Therefore, by using the mechanism similar to that of the patent literature 3, without describing rules of the transition relationship by hand, the fault cause can be estimated.

In addition, the extended Viterbi calculating section does not calculate the transition relationship of the fault between devices and faults for each device. It is assumed that the derivation relationship for each device kind (class) and the event transition relationship for each device are stochastically independent from each other. Then, the extended Viterbi calculating section calculates both of them independently and multiplies one of the obtained probabilities by the other. By independently calculating, the calculation amount can be reduced.

In addition, the extended Baum-Welch calculating section and the extended Viterbi calculating section, with respect to a device which is a fault occurrence source described in the event, acquires the device class from the instance definition and retrieves only hidden states related to the device class. As a result, the process speed can be improved better than that of the patent literature 3.

That is, it is supposed that a set of the device classes is C, a set of the fault kinds in all of the devices is S, a set of the events is E and a set of all of the devices is M. Both of the learning time and the process time are $O(|S|^2|M|^2/|C|^2)$ in the patent literature 3. On the other hand, in the present invention, both of the learning time and the process time are $O(|S|^2)$. Consequently, the object of the present invention can be solved.

A first effect is that, with respect to a transition fault, the cause analysis can be performed and thus the fault cause estimation can be executed even for the fault whose transition relationship is not known. The reason is that, by previously giving existing events as learning log, the transition relationship of the fault can be estimated, thereby automatically enabling to create the fault derivation model and thus estimate the fault cause.

A second effect is that, with respect to the transition fault, the cause analysis can be performed without describing the rule regarding the transition relationship of the fault by hand. The reason is that, by previously giving existing events as learning log, the transition relationship of the fault can be estimated, thereby automatically enabling to create the fault derivation model and thus estimate the fault cause.

A third effect is that, with respect to the transition fault, the cause analysis can be performed for a large scale managed object system. The reason is that, by independently calculating the fault derivation probability for each device class and the fault derivation relationship for each device, the calculation amount can be reduced.

According to the present invention, the system may be applied to a fault monitoring system for a network and a computer system. In addition, it may be applied to a fault finding system for a built-in system.

The program and the data structure of the present invention may be recorded in a computer-readable recording medium, and may be read to an information processing device from the recording medium.

The present invention may be described as shown below, but may not be limited to the contents.

A fault cause estimating system of the present invention includes: an instance definition database configured to store an instance definition which defines a correspondence relationship between a plurality of devices as managed objects and classes of the plurality of devices; a fault occurrence location class definition database configured to store a fault occurrence location class definition which defines a correspondence relationship between a plurality of faults possibly occurring in the plurality of devices and classes of the plurality of devices; an event sequence database configured to store an event sequence for fault cause estimation in which a plurality of events having occurred in the plurality of devices under monitoring are arranged in order of time of occurrence; a first storage section configured to store a fault derivation model which shows a fault transition probability concerned with combinations of the classes of the plurality of devices and faults at the classes of the plurality of devices; a second storage section configured to store an event derivation model which shows an event transition probability concerned with combinations of faults at the plurality of devices and events derived from the faults at the plurality of devices; a third storage section configured to store an instance derivation model which shows an occurrence device transition probability concerned with an occurrence device at which a fault occurs among the plurality of devices; an extended Viterbi calculating section configured to independently obtain a first transition probability between a plurality of faults at the classes of the plurality of devices and a second transition probability between the plurality of devices, based on: the instance definition, the fault occurrence location class definition, the fault derivation model, the event derivation model, the instance derivation model and the event sequence for fault cause estimation, and estimates a fault state transition sequence and a fault state transition probability which show a fault transition sequence and a fault transition probability which correspond to the event sequence for fault cause estimation, by multiplying the first transition probability and the second transition probability; and a filtering module configured to estimate a fault which is a root cause of an event occurring at a managed object, based on the fault state transition sequence and fault state transition probability.

In the fault cause estimating system, the extended Viterbi calculating section may calculate the fault state transition probability as a transition probability from a first fault in a first occurrence device at a first time to a second fault in a second occurrence device at a second time included in the event sequence for fault cause estimation, based on: the first transition probability which is calculated based on the fault state transition probability corresponding to a first class of the first occurrence device at the first time, the fault transition probability from the first fault to the second fault and the event transition probability of the second fault; and the second transition probability which is the occurrence device transition probability from the first occurrence device to the second occurrence device.

The fault cause estimating system may further include: a fault definition database configured to store a basic model definition which defines a correspondence relationship between a plurality of events possibly occurring in the plurality of devices and a plurality of fault causing the plurality % of events; an initial model generating section configured to create an initial fault derivation model indicating a derivation relationship between the plurality of faults and an initial event derivation model indicating a derivation relationship between the plurality of faults and the plurality of events under a predetermined condition, based on the basic model definition; an extended Baum-Welch calculating section configured to calculate: based on the instance definition, the fault occurrence location class definition, the initial fault derivation model, the initial event derivation model and an event sequence for learning in which a plurality of events having occurred in a plurality of devices are arranged in order of time of occurrence; a forward probability of which a state starts from a start state at a start time and reaches a certain fault at a certain time in the event sequence for learning and a backward probability of which a state starts from an end state at an end time and reaches a certain fault at a certain time in the event sequence for learning, while narrowing down faults using classes of the plurality of devices, and create the fault derivation model and the event derivation model based on the forward probability and the backward probability; and an instance derivation probability calculating section configured to create the instance deviation model by calculating a transition probability from the occurrence device to the next occurrence device in the event sequence for learning.

In the fault cause estimating system, the extended Baum-Welch calculating section calculates the forward probability from a third fault in a third occurrence device at a third time to a fourth fault in a fourth occurrence device at a fourth time included in the event sequence for learning, based on the forward probability corresponding to a third class of the third occurrence device at the third time, the fault transition probability from the third fault to the fourth fault, the event transition probability at the fourth fault; calculates the backward probability from a sixth fault in a sixth occurrence device at a sixth time to a fifth fault in a fifth occurrence device at a fifth time included in the event sequence for learning, based on the backward probability corresponding to a sixth class of the sixth occurrence device at the sixth time, the fault transition probability from the sixth fault to the fifth fault, the event transition probability at the fifth fault; calculates the event derivation model based on the forward probability and the backward probability; calculates the fault derivation model based on the forward probability, the backward probability and the event transition probability at each time; and repeats the above calculations until the event transition probability and the fault transition probability converge to create the fault derivation model and the event derivation model.

In the fault cause estimating system, the extended Baum-Welch calculating section may be replaced with a Baum-Welch calculating section which executes a Baum-Welch algorithm.

In the fault cause estimating system, when a transition probability between two faults is smaller than a predetermined probability in the fault state transition sequence, the filtering module divides the fault state transition sequence at between the two faults, and estimates a lead fault in each divided fault state transition sequence as the fault which is the root cause.

In the fault cause estimating system, an occurrence time interval between two adjacent events in each of the event sequence for learning and the event sequence for fault cause estimation is equal to or less than a predetermined value.

A fault cause estimating method according to the present invention includes: based on: an instance definition which defines a correspondence relationship between a plurality of devices as managed objects and classes of the plurality of devices; a fault occurrence location class definition which defines a correspondence relationship between a plurality of faults possibly occurring in the plurality of devices and classes of the plurality of devices; a fault derivation model which shows a fault transition probability concerned with combinations of the classes of the plurality of devices and faults at the classes of the plurality of devices; an event derivation model which shows an event transition probability concerned with combinations of faults at the plurality of devices and events derived from the faults at the plurality of devices; an instance derivation model which shows an occurrence device transition probability concerned with an occurrence device at which a fault occurs among the plurality of devices; and an event sequence for fault cause estimation in which a plurality of events having occurred in the plurality of devices under monitoring are arranged in order of time of occurrence, independently obtaining a first transition probability between the plurality of faults at the classes of the plurality of devices, and a second transition probability between the plurality of devices, and estimating a fault state transition sequence and a fault state transition probability which show a fault transition sequence and a fault transition probability which correspond to the event sequence for fault cause estimation, by multiplying the first transition probability and the second transition probability; and estimating a fault which is a root cause of an event occurring at a managed object, based on the fault state transition sequence and the fault state transition probability.

In the fault cause estimating method, the step of estimating the fault state transition sequence and the fault state transition probability may include: calculating the fault state transition probability as a transition probability from a first fault in a first occurrence device at a first time to a second fault in a second occurrence device at a second time included in the event sequence for fault cause estimation, based on: the first transition probability which is calculated based on the fault state transition probability corresponding to a first class of the first occurrence device at the first time, the fault transition probability from the first fault to the second fault and the event transition probability of the second fault; and the second transition probability which is the occurrence device transition probability from the first occurrence device to the second occurrence device.

The fault cause estimating method may further include: based on a basic model definition which defines a correspondence relationship between a plurality of events possibly occurring in the plurality of devices and a plurality of fault causing the plurality of events, creating an initial fault derivation model indicating a derivation relationship between the plurality of faults and an initial event derivation model indicating a derivation relationship between the plurality of faults and the plurality of events under a predetermined condition; based on the instance definition, the fault occurrence location class definition, the initial fault derivation model, the initial event derivation model and an event sequence for learning in which a plurality of events having occurred in a plurality of devices are arranged in order of time of occurrence, calculating a forward probability of which a state starts from a start state at a start time and reaches a certain fault at a certain time in the event sequence for learning and a backward probability of which a state starts from an end state at an end time and reaches a certain fault at a certain time in the event sequence for learning, while narrowing down faults using classes of the plurality of devices, and creating the fault derivation model and the event derivation model based on the forward probability and the backward probability; and creating the instance deviation model by calculating a transition probability from the occurrence device to the next occurrence device in the event sequence for learning.

In the fault cause estimating method, the step of creating the fault derivation model and the event derivation model may include: calculating the forward probability from a third fault in a third occurrence device at a third time to a fourth fault in a fourth occurrence device at a fourth time included in the event sequence for learning, based on the forward probability corresponding to a third class of the third occurrence device at the third time, the fault transition probability from the third fault to the fourth fault, the event transition probability at the fourth fault; calculating the backward probability from a sixth fault in a sixth occurrence device at a sixth time to a fifth fault in a fifth occurrence device at a fifth time included in the event sequence for learning, based on the backward probability corresponding to a sixth class of the sixth occurrence device at the sixth time, the fault transition probability from the sixth fault to the fifth fault, the event transition probability at the fifth fault; calculating the event derivation model based on the forward probability and the backward probability; calculating the fault derivation model based on the forward probability, the backward probability and the event transition probability at each time; and repeating the above calculations until the event transition probability and the fault transition probability converge to create the fault derivation model and the event derivation model.

In the fault cause estimating method, the step of creating the fault derivation model and the event derivation model may be replaced with a step of executing a Baum-Welch algorithm.

In the fault cause estimating method, the step of estimating the fault which is the root cause may include: when a transition probability between two faults is smaller than a predetermined probability in the fault state transition sequence; dividing the fault state transition sequence at between the two faults; and estimating a lead fault in each divided fault state transition sequence as the fault which is the root cause.

In the fault cause estimating method, an occurrence time interval between two adjacent events in each of the event sequence for learning and the event sequence for fault cause estimation may be equal to or less than a predetermined value.

A program according to the present invention includes: reading an instance definition which defines correspondence relationship between a plurality of devices as managed objects and classes of the plurality of devices from an instance definition database; reading a fault occurrence location class definition which defines correspondence relationship between a plurality of faults possibly occurring in the plurality of devices and classes of the plurality of devices from a fault occurrence location class definition database; reading an event sequence for fault cause estimation in which a plurality of events having occurred in the plurality of devices under monitoring are arranged in order of time of occurrence from an event sequence database; reading a fault derivation model which shows a fault transition probability concerned with combinations of the classes of the plurality of devices and faults at the class of the plurality of devices from a first storage section; reading an event derivation model which shows an event transition probability concerned with combinations of faults at the plurality of devices and events derived from the faults at the plurality of devices from a second storage section; reading an instance derivation model which shows an occurrence device transition probability concerned with an occurrence device at which a fault occurs among the plurality of devices from a third storage section; an extended Viterbi calculating section independently obtaining a first transition probability among a plurality of faults at the classes of the plurality of devices, and a second transition probability among the plurality of devices based on: the read instance definition, fault occurrence location class definition, the read fault derivation model, the event derivation model, the instance derivation model and the read event sequence for fault cause estimation, and estimating a fault state transition sequence and a fault state transition probability which shows a fault transition sequence and a fault transition probability which correspond to the event sequence for fault cause estimation, by multiplying the first transition probability and the second transition probability; and a filtering module estimating a fault which is a root cause of an event occurring at a managed object, based on the fault state transition sequence and the fault state transition probability.

In the program, the step of estimating the fault state transition sequence and the fault state transition probability may include: the extended Viterbi calculating section calculating the fault state transition probability as a transition probability from a first fault in a first occurrence device at a first time to a second fault in a second occurrence device at a second time included in the event sequence for fault cause estimation, based on: the first transition probability which is calculated based on the fault state transition probability corresponding to a first class of the first occurrence device at the first time, the fault transition probability from the first fault to the second fault and the event transition probability of the second fault; and the second transition probability which is the occurrence device transition probability from the first occurrence device to the second occurrence device.

The program may further include: reading a basic model definition which defines a correspondence relationship between a plurality of events possibly occurring in the plurality of devices and a plurality of fault causing the plurality of events from a fault definition database; an initial model generating section creating an initial fault derivation model indicating a derivation relationship between the plurality of faults and an initial event derivation model indicating a derivation relationship between the plurality of faults and the plurality of events under a predetermined condition, based on the basic model definition; an extended Baum-Welch calculating section calculating: based on the instance definition, the fault occurrence location class definition, the initial fault derivation model, the initial event derivation model and an event sequence for learning in which a plurality of events having occurred in a plurality of devices are arranged in order of time of occurrence; a forward probability of which a state starts from a start state at a start time and reaches a certain fault at a certain time in the event sequence for learning and a backward probability of which a state starts from an end state at an end time and reaches a certain fault at a certain time in the event sequence for learning, while narrowing down faults using classes of the plurality of devices, and creating the fault derivation model and the event derivation model based on the forward probability and the backward probability; and an instance derivation probability calculating section creating the instance deviation model by calculating a transition probability from the occurrence device to the next occurrence device in the event sequence for learning.

In the program, the step of creating the fault derivation model and the event derivation model may include: the extended Baum-Welch calculating section calculating the forward probability from a third fault in a third occurrence device at a third time to a fourth fault in a fourth occurrence device at a fourth time included in the event sequence for learning, based on the forward probability corresponding to a third class of the third occurrence device at the third time, the fault transition probability from the third fault to the fourth fault, the event transition probability at the fourth fault; calculating the backward probability from a sixth fault in a sixth occurrence device at a sixth time to a fifth fault in a fifth occurrence device at a fifth time included in the event sequence for learning, based on the backward probability corresponding to a sixth class of the sixth occurrence device at the sixth time, the fault transition probability from the sixth fault to the fifth fault, the event transition probability at the fifth fault; calculating the event derivation model based on the forward probability and the backward probability; calculating the fault derivation model based on the forward probability, the backward probability and the event transition probability at each time; and repeating the above calculations until the event transition probability and the fault transition probability converge to create the fault derivation model and the event derivation model.

In the program, the step of creating the fault derivation model and the event derivation model may be replaced with a Baum-Welch calculating section executing a Baum-Welch algorithm.

In the program, the step of estimating the fault which is the root cause may include: when a transition probability between two faults is smaller than a predetermined probability in the fault state transition sequence, the filtering module dividing the fault state transition sequence at between the two faults; and estimating a lead fault in each divided fault state transition sequence as a fault which is the root cause.

In the program, an occurrence time interval between two adjacent events in each of the event sequence for learning and the event sequence for fault cause estimation is equal to or less than a predetermined value.

This application is based upon and claims the benefit of priority from Japanese patent application No. 2009-118271 filed on May 15, 2009, the disclosure of which is incorporated herein in its entirety by reference.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

The invention claimed is:
1. A fault cause estimating system comprising:
an instance definition database configured to store an instance definition which defines a correspondence relationship between a plurality of devices as managed objects and classes of the plurality of devices;
a fault occurrence location class definition database configured to store a fault occurrence location class definition which defines a correspondence relationship between a plurality of faults possibly occurring in the plurality of devices and classes of the plurality of devices;
an event sequence database configured to store an event sequence for fault cause estimation in which a plurality of events having occurred in the plurality of devices under monitoring are arranged in order of time of occurrence;
a first storage section configured to store a fault derivation model which shows a fault transition probability concerned with combinations of the classes of the plurality of devices and faults at the classes of the plurality of devices;
a second storage section configured to store an event derivation model which shows an event transition probability concerned with combinations of faults at the plurality of devices and events derived from the faults at the plurality of devices;
a third storage section configured to store an instance derivation model which shows an occurrence device transition probability concerned with an occurrence device at which a fault occurs among the plurality of devices;
an extended Viterbi calculating section configured to independently obtain a first transition probability between a plurality of faults at the classes of the plurality of devices and a second transition probability between the plurality of devices, based on: the instance definition, the fault occurrence location class definition, the fault derivation model, the event derivation model, the instance derivation model and the event sequence for fault cause estimation, and estimates a fault state transition sequence and a fault state transition probability which show a fault transition sequence and a fault transition probability which correspond to the event sequence for fault cause estimation, by multiplying the first transition probability and the second transition probability; and a filtering module configured to estimate a fault which is a root cause of an event occurring at a managed object, based on the fault state transition sequence and fault state transition probability.

2. The fault cause estimating system according to claim 1, wherein the extended Viterbi calculating section calculates the fault state transition probability as a transition probability from a first fault in a first occurrence device at a first time to a second fault in a second occurrence device at a second time included in the event sequence for fault cause estimation, based on: the first transition probability which is calculated based on the fault state transition probability corresponding to a first class of the first occurrence device at the first time, the fault transition probability from the first fault to the second fault and the event transition probability of the second fault; and the second transition probability which is the occurrence device transition probability from the first occurrence device to the second occurrence device.

3. The fault cause estimating system according to claim 1, further comprising:
 a fault definition database configured to store a basic model definition which defines a correspondence relationship between a plurality of events possibly occurring in the plurality of devices and a plurality of fault causing the plurality of events;
 an initial model generating section configured to create an initial fault derivation model indicating a derivation relationship between the plurality of faults and an initial event derivation model indicating a derivation relationship between the plurality of faults and the plurality of events under a predetermined condition, based on the basic model definition;
 an extended Baum-Welch calculating section configured to calculate: based on the instance definition, the fault occurrence location class definition, the initial fault derivation model, the initial event derivation model and an event sequence for learning in which a plurality of events having occurred in a plurality of devices are arranged in order of time of occurrence; a forward probability of which a state starts from a start state at a start time and reaches a certain fault at a certain time in the event sequence for learning and a backward probability of which a state starts from an end state at an end time and reaches a certain fault at a certain time in the event sequence for learning, while narrowing down faults using classes of the plurality of devices, and create the fault derivation model and the event derivation model based on the forward probability and the backward probability; and
 an instance derivation probability calculating section configured to create the instance deviation model by calculating a transition probability from the occurrence device to the next occurrence device in the event sequence for learning.

4. The fault cause estimating system according to claim 3, wherein the extended Baum-Welch calculating section calculates, the forward probability from a third fault in a third occurrence device at a third time to a fourth fault in a fourth occurrence device at a fourth time included in the event sequence for learning, based on the forward probability corresponding to a third class of the third occurrence device at the third time, the fault transition probability from the third fault to the fourth fault, the event transition probability at the fourth fault; calculates the backward probability from a sixth fault in a sixth occurrence device at a sixth time to a fifth fault in a fifth occurrence device at a fifth time included in the event sequence for learning, based on the backward probability corresponding to a sixth class of the sixth occurrence device at the sixth time, the fault transition probability from the sixth fault to the fifth fault, the event transition probability at the fifth fault; calculates the event derivation model based on the forward probability and the backward probability; calculates the fault derivation model based on the forward probability, the backward probability and the event transition probability at each time; and repeats the above calculations until the event transition probability and the fault transition probability converge to create the fault derivation model and the event derivation model.

5. The fault cause estimating system according to claim 1, wherein the extended Baum-Welch calculating section is replaced with a Baum-Welch calculating section which executes a Baum-Welch algorithm.

6. The fault cause estimating system according to claim 1, wherein when a transition probability between two faults is smaller than a predetermined probability in the fault state transition sequence, the filtering module divides the fault state transition sequence at between the two faults, and estimates a lead fault in each divided fault state transition sequence as the fault which is the root cause.

7. The fault cause estimating system according to claim 1, wherein an occurrence time interval between two adjacent events in each of the event sequence for learning and the event sequence for fault cause estimation is equal to or less than a predetermined value.

8. A fault cause estimating method comprising:
 independently obtaining a first transition probability and a second transition probability, based on: an instance definition which defines a correspondence relationship between a plurality of devices as managed objects and classes of the plurality of devices; a fault occurrence location class definition which defines a correspondence relationship between a plurality of faults possibly occurring in the plurality of devices and classes of the plurality of devices; a fault derivation model which shows a fault transition probability concerned with combinations of the classes of the plurality of devices and faults at the classes of the plurality of devices; an event derivation model which shows an event transition probability concerned with combinations of faults at the plurality of devices and events derived from the faults at the plurality of devices; an instance derivation model which shows an occurrence device transition probability concerned with an occurrence device at which a fault occurs among the plurality of devices; and an event sequence for fault cause estimation in which a plurality of events having occurred in the plurality of devices under monitoring are arranged in order of time of occurrence, the first transition probability between the plurality of faults at the classes of the plurality of devices, and the second transition probability being a transition probability between the plurality of devices, and estimating a fault state transition sequence and a fault state transition probability which show a fault transition sequence and a fault transition probability which correspond to the event sequence for fault cause estimation, by multiplying the first transition probability and the second transition probability; and
 estimating a fault which is a root cause of an event occurring at a managed object, based on the fault state transition sequence and the fault state transition probability.

9. The fault cause estimating method according to claim 8, wherein the step of estimating the fault state transition sequence and the fault state transition probability includes:

calculating the fault state transition probability as a transition probability from a first fault in a first occurrence device at a first time to a second fault in a second occurrence device at a second time included in the event sequence for fault cause estimation, based on: the first transition probability which is calculated based on the fault state transition probability corresponding to a first class of the first occurrence device at the first time, the fault transition probability from the first fault to the second fault and the event transition probability of the second fault; and the second transition probability which is the occurrence device transition probability from the first occurrence device to the second occurrence device.

10. The fault cause estimating method according to claim 8, further comprising:

based on a basic model definition which defines a correspondence relationship between a plurality of events possibly occurring in the plurality of devices and a plurality of fault causing the plurality of events, creating an initial fault derivation model indicating a derivation relationship between the plurality of faults and an initial event derivation model indicating a derivation relationship between the plurality of faults and the plurality of events under a predetermined condition; based on the instance definition, the fault occurrence location class definition, the initial fault derivation model, the initial event derivation model and an event sequence for learning in which a plurality of events having occurred in a plurality of devices are arranged in order of time of occurrence, calculating a forward probability of which a state starts from a start state at a start time and reaches a certain fault at a certain time in the event sequence for learning and a backward probability of which a state starts from an end state at an end time and reaches a certain fault at a certain time in the event sequence for learning, while narrowing down faults using classes of the plurality of devices, and creating the fault derivation model and the event derivation model based on the forward probability and the backward probability; and creating the instance deviation model by calculating a transition probability from the occurrence device to the next occurrence device in the event sequence for learning.

11. The fault cause estimating method according to claim 10, wherein the step of creating the fault derivation model and the event derivation model includes:

calculating the forward probability from a third fault in a third occurrence device at a third time to a fourth fault in a fourth occurrence device at a fourth time included in the event sequence for learning, based on the forward probability corresponding to a third class of the third occurrence device at the third time, the fault transition probability from the third fault to the fourth fault, the event transition probability at the fourth fault;

calculating the backward probability from a sixth fault in a sixth occurrence device at a sixth time to a fifth fault in a fifth occurrence device at a fifth time included in the event sequence for learning, based on the backward probability corresponding to a sixth class of the sixth occurrence device at the sixth time, the fault transition probability from the sixth fault to the fifth fault, the event transition probability at the fifth fault;

calculating the event derivation model based on the forward probability and the backward probability;

calculating the fault derivation model based on the forward probability, the backward probability and the event transition probability at each time; and repeating the above calculations until the event transition probability and the fault transition probability converge to create the fault derivation model and the event derivation model.

12. The fault cause estimating method according to claim 8, wherein the step of creating the fault derivation model and the event derivation model is replaced with a step of executing a Baum-Welch algorithm.

13. The fault cause estimating method according to claim 8, wherein the step of estimating the fault which is the root cause includes:

when a transition probability between two faults is smaller than a predetermined probability in the fault state transition sequence, dividing the fault state transition sequence at between the two faults; and estimating a lead fault in each divided fault state transition sequence as the fault which is the root cause.

14. The fault cause estimating method according to claim 8, wherein an occurrence time interval between two adjacent events in each of the event sequence for learning and the event sequence for fault cause estimation is equal to or less than a predetermined value.

15. A non-transitory computer-readable recording medium including a computer-readable program comprising code that, when executed, causes a computer to perform a fault cause estimating method as the following:

reading an instance definition which defines correspondence relationship between a plurality of devices as managed objects and classes of the plurality of devices from an instance definition database;

reading a fault occurrence location class definition which defines correspondence relationship between a plurality of faults possibly occurring in the plurality of devices and classes of the plurality of devices from a fault occurrence location class definition database;

reading an event sequence for fault cause estimation in which a plurality of events having occurred in the plurality of devices under monitoring are arranged in order of time of occurrence from an event sequence database;

reading a fault derivation model which shows a fault transition probability concerned with combinations of the classes of the plurality of devices and faults at the class of the plurality of devices from a first storage section;

reading an event derivation model which shows an event transition probability concerned with combinations of faults at the plurality of devices and events derived from the faults at the plurality of devices from a second storage section;

reading an instance derivation model which shows an occurrence device transition probability concerned with an occurrence device at which a fault occurs among the plurality of devices from a third storage section;

an extended Viterbi calculating section independently obtaining a first transition probability among a plurality of faults at the classes of the plurality of devices, and a second transition probability among the plurality of devices based on: the read instance definition, fault occurrence location class definition, the read fault derivation model, the event derivation model, the instance derivation model and the read event sequence for fault cause estimation, and estimating a fault state transition sequence and a fault state transition probability which shows a fault transition sequence and a fault transition probability which correspond to the event sequence for fault cause estimation, by multiplying the first transition probability and the second transition probability; and a filtering module estimating a fault which is a root cause of an event occurring at a managed object, based on the fault state transition sequence and the fault state transition probability.

16. The non-transitory computer-readable recording medium according to claim 15, wherein the step of estimating the fault state transition sequence and the fault state transition probability includes:

the extended Viterbi calculating section calculating the fault state transition probability as a transition probability from a first fault in a first occurrence device at a first time to a second fault in a second occurrence device at a second time included in the event sequence for fault cause estimation, based on: the first transition probability which is calculated based on the fault state transition probability corresponding to a first class of the first occurrence device at the first time, the fault transition probability from the first fault to the second fault and the event transition probability of the second fault; and the second transition probability which is the occurrence device transition probability from the first occurrence device to the second occurrence device.

17. The non-transitory computer-readable recording medium according to claim 15, further comprising:

reading a basic model definition which defines a correspondence relationship between a plurality of events possibly occurring in the plurality of devices and a plurality of fault causing the plurality of events from a fault definition database;

an initial model generating section creating an initial fault derivation model indicating a derivation relationship between the plurality of faults and an initial event derivation model indicating a derivation relationship between the plurality of faults and the plurality of events under a predetermined condition, based on the basic model definition;

an extended Baum-Welch calculating section calculating: based on the instance definition, the fault occurrence location class definition, the initial fault derivation model, the initial event derivation model and an event sequence for learning in which a plurality of events having occurred in a plurality of devices are arranged in order of time of occurrence; a forward probability of which a state starts from a start state at a start time and reaches a certain fault at a certain time in the event sequence for learning and a backward probability of which a state starts from an end state at an end time and reaches a certain fault at a certain time in the event sequence for learning, while narrowing down faults using classes of the plurality of devices, and creating the fault derivation model and the event derivation model based on the forward probability and the backward probability; and an instance derivation probability calculating section creating the instance deviation model by calculating a transition probability from the occurrence device to the next occurrence device in the event sequence for learning.

18. The non-transitory computer-readable recording medium according to claim 17, wherein the step of creating the fault derivation model and the event derivation model includes:

the extended Baum-Welch calculating section calculating the forward probability from a third fault in a third occurrence device at a third time to a fourth fault in a fourth occurrence device at a fourth time included in the event sequence for learning, based on the forward probability corresponding to a third class of the third occurrence device at the third time, the fault transition probability from the third fault to the fourth fault, the event transition probability at the fourth fault;

calculating the backward probability from a sixth fault in a sixth occurrence device at a sixth time to a fifth fault in a fifth occurrence device at a fifth time included in the event sequence for learning, based on the backward probability corresponding to a sixth class of the sixth occurrence device at the sixth time, the fault transition probability from the sixth fault to the fifth fault, the event transition probability at the fifth fault;

calculating the event derivation model based on the forward probability and the backward probability;

calculating the fault derivation model based on the forward probability, the backward probability and the event transition probability at each time; and repeating the above calculations until the event transition probability and the fault transition probability converge to create the fault derivation model and the event derivation model.

19. The non-transitory computer-readable recording medium according to claim 15, wherein the step of creating the fault derivation model and the event derivation model is replaced with a Baum-Welch calculating section executing a Baum-Welch algorithm.

20. The non-transitory computer-readable recording medium according claim 15, wherein the step of estimating the fault which is the root cause includes:

when a transition probability between two faults is smaller than a predetermined probability in the fault state transition sequence, the filtering module dividing the fault state transition sequence at between the two faults; and estimating a lead fault in each divided fault state transition sequence as a fault which is the root cause.

21. The non-transitory computer-readable recording medium according to claim 15, wherein an occurrence time interval between two adjacent events in each of the event sequence for learning and the event sequence for fault cause estimation is equal to or less than a predetermined value.

* * * * *